US012628984B2

(12) United States Patent
Ciccone et al.

(10) Patent No.: US 12,628,984 B2
(45) Date of Patent: May 19, 2026

(54) FLAT TOP GAS GRILLS INCLUDING COOKING ENGINES CONFIGURED FOR OPTIMUM HEAT DISTRIBUTION

(71) Applicant: Weber-Stephen Products LLC, Palatine, IL (US)

(72) Inventors: John R. Ciccone, Itasca, IL (US); Joshua Lee, Palatine, IL (US); Douglas W. Masek, Palatine, IL (US); Curtis P. Menning, Palatine, IL (US); Mohammed Shoeb, Hoffman Estates, IL (US)

( * ) Notice: Subject to any disclaimer, the term of this patent is extended or adjusted under 35 U.S.C. 154(b) by 433 days.

(21) Appl. No.: 18/380,722

(22) Filed: Oct. 17, 2023

(65) Prior Publication Data

US 2025/0120544 A1      Apr. 17, 2025

(51) Int. Cl.
*A47J 37/06*          (2006.01)
*A47J 37/07*          (2006.01)

(52) U.S. Cl.
CPC ....... *A47J 37/0682* (2013.01); *A47J 37/0713* (2013.01)

(58) Field of Classification Search
CPC ................ F23L 9/00; F23L 9/06; F23D 14/10
See application file for complete search history.

(56) References Cited

U.S. PATENT DOCUMENTS

| | | | | |
|---|---|---|---|---|
| 1,614,746 A | * | 1/1927 | Lyon | F23D 14/10 |
| | | | | 126/41 R |
| 3,938,494 A | * | 2/1976 | Clark | A47J 37/0713 |
| | | | | 126/41 R |

| | | | | |
|---|---|---|---|---|
| 4,989,579 A | | 2/1991 | Murphy et al. | |
| 6,428,313 B1 | * | 8/2002 | Rodgers | F23D 14/10 |
| | | | | 126/41 R |
| 6,557,546 B1 | | 5/2003 | Gibbons | |
| 6,758,207 B1 | | 7/2004 | Hotard et al. | |

(Continued)

FOREIGN PATENT DOCUMENTS

| | | | |
|---|---|---|---|
| RU | 2157485 C1 | * | 10/2000 |
| WO | 1998044835 A1 | | 10/1998 |
| WO | 2010065155 A1 | | 6/2010 |

OTHER PUBLICATIONS

Australian Government, IP Australia, "Examination Report No. 1," issued in connection with Australian Patent Application No. 2023254906, dated Jan. 7, 2025, 3 pages.

(Continued)

*Primary Examiner* — Jorge A Pereiro
(74) *Attorney, Agent, or Firm* — Avantech Law, LLP

(57) ABSTRACT

Flat top gas grills including cooking engines configured for optimum heat distribution are disclosed. An example grill includes a cookbox, a griddle, and a plurality of burner tubes. The cookbox includes a bottom wall, a front wall, a rear wall, a right sidewall, and a left sidewall. The front wall, the rear wall, the right sidewall, and the left sidewall extend upwardly from the bottom wall. The cookbox further includes a plurality of air intake openings extending though the bottom wall. The griddle is disposed on or above the cookbox. The griddle includes a flat top cooking surface and an underside located opposite the flat top cooking surface. The burner tubes are disposed in the cookbox and located between the bottom wall of the cookbox and the underside of the griddle.

20 Claims, 30 Drawing Sheets

SECTION H-H

(56) References Cited

U.S. PATENT DOCUMENTS

| | | | |
|---|---|---|---|
| 7,210,475 B2 * | 5/2007 | Barnes | F24C 3/087 |
| | | | 126/39 R |
| 7,832,390 B2 | 11/2010 | Hsu et al. | |
| 8,074,563 B2 | 12/2011 | Bowles et al. | |
| 8,991,386 B2 | 3/2015 | Ahmed | |
| 9,492,032 B2 | 11/2016 | Chung | |
| D792,741 S * | 7/2017 | Chung | D7/407 |
| 9,709,281 B2 | 7/2017 | Ahmed | |
| 10,054,310 B2 | 8/2018 | Lirette et al. | |
| 10,190,777 B2 | 1/2019 | Ahmed | |
| 10,327,588 B2 | 6/2019 | Dahle et al. | |
| 10,327,589 B1 | 6/2019 | Dahle et al. | |
| 10,520,200 B1 * | 12/2019 | Straubel | A47J 37/079 |
| 10,588,461 B2 | 3/2020 | Dahle | |
| 10,660,473 B2 | 5/2020 | Dahle et al. | |
| 10,779,682 B2 | 9/2020 | Dahle et al. | |
| 10,863,862 B2 * | 12/2020 | Querejeta Andueza | |
| | | | F23D 14/28 |
| 10,888,193 B2 | 1/2021 | Dahle et al. | |
| 10,952,564 B2 | 3/2021 | Dahle et al. | |
| 10,959,572 B2 * | 3/2021 | Dahle | B65C 3/065 |
| 10,995,964 B2 | 5/2021 | Dahle | |
| D927,918 S | 8/2021 | Dahle et al. | |
| 11,116,360 B2 | 9/2021 | Dahle et al. | |
| 11,116,361 B2 | 9/2021 | Dahle et al. | |
| 11,197,580 B2 | 12/2021 | Dahle et al. | |
| 11,202,532 B2 | 12/2021 | Dahle et al. | |
| D940,496 S * | 1/2022 | Wang | D7/363 |
| 11,284,743 B2 | 3/2022 | Dahle et al. | |
| 11,311,147 B2 | 4/2022 | Dahle | |
| 11,607,079 B2 | 3/2023 | Dahle et al. | |
| 11,641,977 B2 | 5/2023 | Dahle et al. | |
| 11,700,971 B2 | 7/2023 | Dahle et al. | |
| 11,725,831 B2 | 8/2023 | Dahle | |
| 11,751,723 B2 | 9/2023 | Dahle et al. | |
| 11,759,050 B2 | 9/2023 | Dahle et al. | |
| 2002/0132198 A1 * | 9/2002 | O'Donnell | F24C 3/006 |
| | | | 431/354 |
| 2003/0213484 A1 * | 11/2003 | Alden | A47J 37/0713 |
| | | | 126/41 R |
| 2008/0081308 A1 * | 4/2008 | Witzel | F23D 14/62 |
| | | | 431/354 |
| 2009/0165774 A1 * | 7/2009 | Johnston | A47J 37/0713 |
| | | | 126/25 R |
| 2009/0202688 A1 * | 8/2009 | Best | A47J 37/0786 |
| | | | 426/240 |
| 2009/0205631 A1 * | 8/2009 | Tsung | F23D 14/045 |
| | | | 431/264 |
| 2009/0250048 A1 * | 10/2009 | Educate | F23D 14/46 |
| | | | 431/258 |
| 2009/0308264 A1 | 12/2009 | Estess et al. | |
| 2010/0095951 A1 * | 4/2010 | Ahmed | A47J 37/0713 |
| | | | 126/39 D |
| 2010/0175682 A1 * | 7/2010 | Erikson | A47J 37/0694 |
| | | | 126/25 R |
| 2010/0326417 A1 * | 12/2010 | Groth | A47J 37/0713 |
| | | | 126/25 R |
| 2012/0266856 A1 | 10/2012 | Zelek et al. | |
| 2012/0318256 A1 * | 12/2012 | Chilton | F24C 15/10 |
| | | | 99/422 |
| 2013/0087136 A1 * | 4/2013 | Ahmed | A47J 37/0713 |
| | | | 126/39 E |
| 2013/0228161 A1 | 9/2013 | Ahmed | |
| 2014/0144333 A1 * | 5/2014 | Ahmed | A47J 37/0786 |
| | | | 99/446 |
| 2016/0370012 A1 * | 12/2016 | Chung | F23D 14/105 |
| 2017/0251875 A1 | 9/2017 | Robinson | |
| 2017/0332838 A1 * | 11/2017 | Dahle | F24C 15/14 |
| 2017/0332839 A1 * | 11/2017 | Dahle | F24C 3/14 |
| 2018/0353005 A1 | 12/2018 | Lee et al. | |
| 2019/0075968 A1 * | 3/2019 | Koehn | A47J 37/0713 |
| 2019/0110641 A1 * | 4/2019 | Lee | A47J 37/0676 |
| 2019/0128538 A1 * | 5/2019 | Dahle | F24C 15/28 |
| 2019/0274477 A1 * | 9/2019 | Querejeta Andueza | |
| | | | F23N 1/007 |
| 2019/0293299 A1 | 9/2019 | Lee | |
| 2019/0365152 A1 * | 12/2019 | Dahle | A23B 4/052 |
| 2020/0093330 A1 * | 3/2020 | Dahle | F24C 15/18 |
| 2020/0253420 A1 * | 8/2020 | He | A47J 37/0754 |
| 2021/0007550 A1 | 1/2021 | Puertas et al. | |
| 2021/0244233 A1 * | 8/2021 | Bush, III | A47J 37/0682 |
| 2021/0302027 A1 * | 9/2021 | Dahle | A47J 37/0786 |
| 2021/0315416 A1 | 10/2021 | Fullmer et al. | |
| 2021/0353098 A1 | 11/2021 | Huang | |
| 2022/0022688 A1 * | 1/2022 | Barajas, Jr. | A47J 37/0786 |
| 2022/0133090 A1 * | 5/2022 | Shen | A47J 37/0704 |
| | | | 126/25 R |
| 2022/0299207 A1 | 9/2022 | Bennett | |
| 2022/0304504 A1 | 9/2022 | Simon et al. | |
| 2022/0304507 A1 * | 9/2022 | Simon | A47J 37/0786 |
| 2022/0338673 A1 | 10/2022 | Graham et al. | |
| 2022/0386813 A1 | 12/2022 | Graham et al. | |
| 2023/0000284 A1 | 1/2023 | Smith et al. | |
| 2023/0031340 A1 | 2/2023 | Dahle et al. | |
| 2023/0284829 A1 | 9/2023 | Dahle et al. | |
| 2023/0284830 A1 | 9/2023 | Smith | |
| 2023/0320527 A1 | 10/2023 | Dunker | |
| 2024/0138618 A1 * | 5/2024 | Smith | A47J 37/067 |
| 2024/0219032 A1 * | 7/2024 | Hanks | A47J 37/0682 |
| 2024/0285121 A1 * | 8/2024 | Barajas, Jr. | F24C 15/14 |
| 2024/0374082 A1 * | 11/2024 | Graham | A47J 37/067 |
| 2024/0407600 A1 * | 12/2024 | Dahle | A47J 37/0713 |
| 2025/0082132 A1 * | 3/2025 | Bush, III | A47J 37/0713 |
| 2025/0213068 A1 * | 7/2025 | Dahle | A47J 37/0754 |

OTHER PUBLICATIONS

A-0060-MAN Heatlie Community Barbecue Instruction Manual V3, dated Feb. 2022, 16 pages, available at: https://cdn.shopify.com/s/files/1/0645/7412/8364/files/Community_BBQ_Series_-_CBBQ600_Written_User_Instructions_Revision_3_Updated_7-10-12.pdf?v=1670989943.

International Searching Authority, "International Search Report and Written Opinion," issued in connection with International Patent Application No. PCT/US2024/058078, mailed on May 8, 2025, 12 pages.

Canadian Intellectual Property Office, "Office Action No. 1," issued in connection with Canadian Patent Application No. 3,217,873, dated Mar. 4, 2025, 4 pages.

Australian Government, IP Australia, "Notice of Acceptance," issued in connection with Australian Patent Application No. 2023254906, dated Mar. 27, 2025, 3 pages.

* cited by examiner

SECTION A-A

SECTION B-B

SECTION C-C

SECTION D-D

1902

2404

2416

2406

2412

2410

2418

2414

2408

2402

SECTION E-E

SECTION F-F

SECTION G-G

SECTION H-H

FLAT TOP GAS GRILLS INCLUDING COOKING ENGINES CONFIGURED FOR OPTIMUM HEAT DISTRIBUTION

FIELD OF THE DISCLOSURE

This disclosure relates generally to flat top gas grills and, more specifically, to flat top gas grills including cooking engines configured for optimum heat distribution.

BACKGROUND

Many conventional gas grills are equipped with grated cooking surfaces formed by a plurality of interconnected rungs and/or grate members that are spaced apart from one another to form a framework having many openings. Unlike gas grills that are equipped with such grated cooking surfaces, flat top gas grills instead include a griddle configured as a generally continuous and flat cooking surface that optionally includes a small number of openings (e.g., typically one or two openings) extending therethrough, with such openings being configured to receive grease, residue, particles, and/or other byproducts associated with a cooking operation performed on the griddle. While a griddle can be used to cook many different types and/or sizes of food items, implementing a griddle as the cooking surface of the gas grill can be particularly advantageous when it comes to cooking liquid or semi-liquid food items (e.g., eggs, batter, etc.) and/or small pieces of food items (e.g., ground meat, diced or chopped vegetables, etc.) that would otherwise be prone to falling through one or more of the many openings of a typical grated cooking surface.

The cooking engine of a flat top gas grill conventionally includes a cookbox, a griddle disposed on or above the cookbox, and one or more gas-fueled burner tube(s) disposed in the cookbox at a location between a bottom wall of the cookbox and an underside of the griddle. Cooking operations performed on flat top gas grills are typically carried out with a lid of the grill either removed from the cookbox or placed in an open position relative to the cookbox. The absence of a lid during cooking operations can lead to substantial heat loss from the cookbox and/or the griddle, and can also lead to the formation of significant heat distribution and/or temperature variations (e.g., the presence of cold spots and/or hot spots) across the cooking surface of the griddle. In many commercially available flat top gas grills, such variations can exceed two hundred degrees Fahrenheit (200° F.), even in instances when all of the burner tubes are adjusted to the same output setting. Consumers often find such extreme variations to be undesirable and/or unacceptable.

Figure 1:
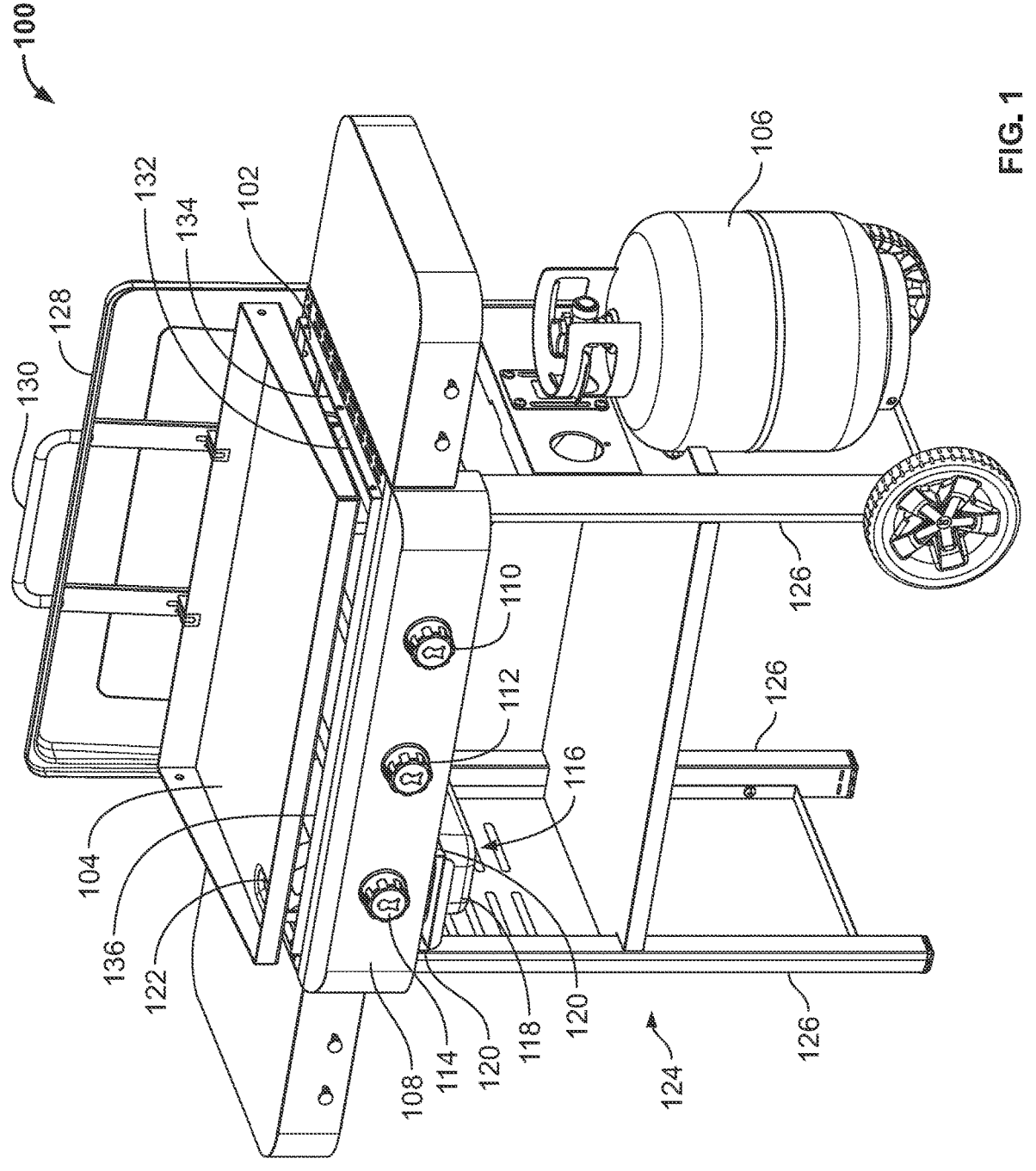
FIG. 1 is a perspective view of an example grill constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

As discussed above, the cooking engine of a flat top gas grill conventionally includes a cookbox, a griddle disposed on or above the cookbox, and one or more gas-fueled burner tube(s) disposed in the cookbox at a location between a bottom wall of the cookbox and an underside of the griddle. Cooking operations performed on flat top gas grills are typically carried out with a lid of the grill either removed from the cookbox or placed in an open position relative to the cookbox. The absence of a lid during cooking operations can lead to substantial heat loss from the cookbox and/or the griddle, and can also lead to the formation of significant heat distribution and/or temperature variations (e.g., the presence of cold spots and/or hot spots) across the cooking surface of the griddle.

For example, cooking operations performed on many commercially-available flat top gas grills can generate heat distribution and/or temperature variations in excess of two hundred degrees Fahrenheit (200° F.) across the cooking surface of the griddle, even in instances when all of the gas-fueled burner tubes of the flat top gas grill are adjusted to the same output setting (e.g., all burner tubes adjusted to a LOW output setting, all burner tubes adjusted to a MEDIUM output setting, or all burner tubes adjusted to a HI output setting). In addition to making the cooking process highly inefficient, heat distribution and/or temperature variations of such a stark magnitude can also effectively render portions of the cooking surface of the griddle unusable for their intended purpose, thereby resulting in a less than optimum user experience for the consumer.

Example flat top gas grills disclosed herein include cooking engines configured for optimum heat distribution. In some disclosed examples, a grill includes: (1) a cookbox having a plurality of air intake openings formed in and extending through a bottom wall of the cookbox; (2) a griddle disposed on or above the cookbox, the griddle including a flat top cooking surface and an underside located opposite the flat top cooking surface; and (3) a plurality of burner tubes disposed in the cookbox and located between the bottom wall of the cookbox and the underside of the griddle. In some disclosed examples, the cookbox of the grill is advantageously configured such that an unoccupied area collectively defined by the plurality of air intake openings is between 10.0 and 30.0 percent of the total area of the bottom wall of the cookbox. In some disclosed examples, the cookbox and the burner tubes of the grill are advantageously configured such that respective ones of the air intake openings are laterally positioned between neighboring ones of the burner tubes, and/or such that respective ones of the burner tubes are laterally aligned with a solid portion of the bottom wall of the cookbox that is laterally positioned between neighboring ones of the air intake openings. In some disclosed examples, the cookbox and the griddle of the grill are advantageously configured such that a vertical gap extending between an upper rim of the cookbox and the underside of the griddle is between 0.25 and 1.50 inches, wherein the vertical gap is configured to vent heat generated within the cookbox (e.g., heat generated by one or more of the burner tube(s)).

In some disclosed examples, the cookbox, the griddle, and one or more of the burner tube(s) of the grill are advantageously configured such that a central axis of the burner tube is located between 1.5 and 3.5 inches above the bottom wall of the cookbox, located between 2.0 and 4.0 inches below an upper rim of the cookbox, and/or located between 3.0 and 5.0 inches below the underside of the griddle. In some disclosed examples, one or more of the burner tube(s) of the grill include(s) first and second rows of ports extending through an outer wall of the burner tube and respectively arranged parallel to the central axis of the burner tube, wherein the first and second rows of ports are advantageously configured to be angularly displaced from one another by an angle between 90.0 and 150.0 degrees. In some disclosed examples, one or more of the burner tube(s) of the grill include(s) third and fourth rows of ports extending through the outer wall of the burner tube and respectively arranged perpendicular to the central axis of the burner tube, wherein the third row of ports is advantageously configured to be located between 1.0 and 6.0 inches inwardly from a front wall of the cookbox, and wherein the fourth row of ports is advantageously configured to be located between 1.0 and 6.0 inches inwardly from a rear wall of the cookbox.

The above-described features implemented by the disclosed flat top gas grills advantageously improve the operating efficiency of the cooking engine of the flat top gas grill, and advantageously improve the heat distribution properties associated with the griddle of the flat top gas grill. In this regard, the above-described features individually and collectively assist in minimizing any temperature variation across the flat top cooking surface of the griddle during cooking operations performed thereon. Flat top gas grills disclosed herein maintain temperature variations of approximately 150 degrees Fahrenheit (150° F.) or less across the flat top cooking surface of the griddle when the burner tubes of the grill are adjusted to a common output setting. Such temperature variations are substantially less than those found in many commercially available flat top gas grills, some of which produce flat top cooking surface temperature variations exceeding two hundred degrees Fahrenheit (200° F.) when the burner tubes of the flat top gas grill are adjusted to a common output setting.

The above-identified features as well as other advantageous features of example flat top gas grills including cooking engines configured for optimum heat distribution as disclosed herein are further described below in connection with the figures of the application.

As used herein, the term "configured" means sized, shaped, arranged, structured, oriented, positioned, and/or located. For example, in the context of a first part configured to fit within a second part, the first part is sized, shaped, arranged, structured, oriented, positioned, and/or located to fit within the second part.

As used herein, unless otherwise stated, the terms "above" and "below" describe the relationship of two parts relative to Earth. For example, as used herein, a first part is "above" a second part if the second part is closer to Earth than the first part is. As another example, as used herein, a first part is "below" a second part if the first part is closer to Earth than the second part is. It is to be understood that a first part can be above or below a second part with one or more of: another part or parts therebetween; without another part therebetween; with the first and second parts contacting one another; or without the first and second parts contacting one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the terms "substantially" and/or "approximately" modify their subjects and/or values to recognize the potential presence of variations that occur in real world applications. For example, "substantially" and/or "approximately" may modify dimensions that may not be exact due to manufacturing tolerances and/or other real-world imperfections as will be understood by persons of ordinary skill in the art. For example, "substantially" and/or "approximately" may indicate such dimensions may be within a tolerance range of +/−10% unless otherwise specified in the description provided herein.

As used herein, the terms "including" and "comprising" (and all forms and tenses thereof) are open-ended terms. Thus, whenever the written description or a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, singular references (e.g., "a," "an." "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B. (5) A with C. (6) B with C, or (7) A with B and with C.

As used herein, when the phrase "at least" is used as the transition term in, for example, a preamble of a claim, it is open-ended in the same manner as the term "comprising" and "including" are open-ended. As used herein in the context of describing structures, components, items, objects, and/or things, the phrase "at least one of A and B" is intended to refer to implementations including any of (1) at least one A. (2) at least one B, or (3) at least one A and at least one B. Similarly, as used herein in the context of describing structures, components, items, objects, and/or things, the phrase "at least one of A or B" is intended to refer to implementations including any of (1) at least one A. (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A. (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

Figure 2:
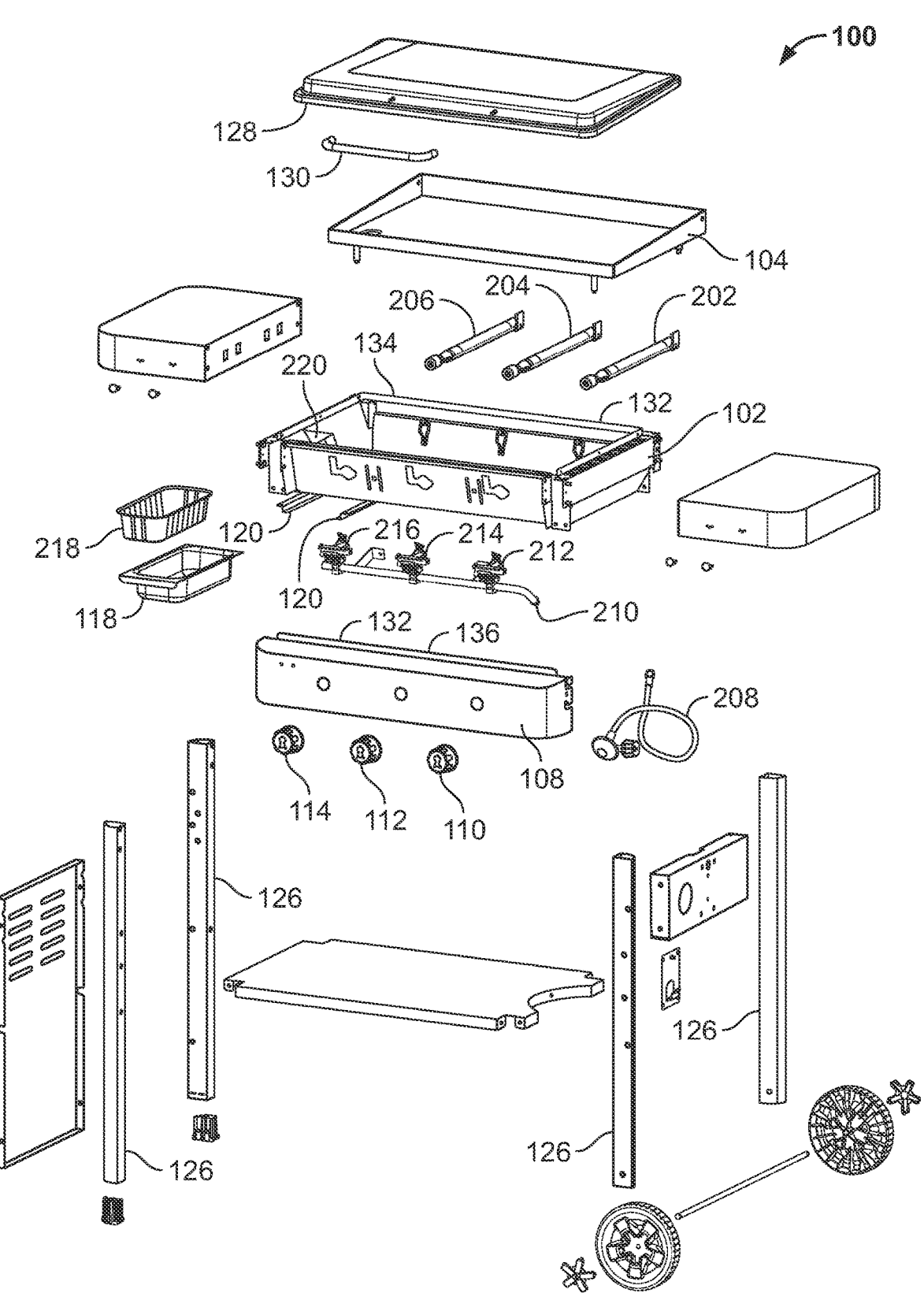
FIG. 2 is an exploded view of the grill of FIG. 1.

FIG. 1 is a perspective view of an example grill 100 constructed in accordance with the teachings of this disclosure. FIG. 2 is an exploded view of the grill 100 of FIG. 1. The grill 100 of FIGS. 1 and 2 is structured as a flat top gas grill. In this regard, the grill 100 of FIGS. 1 and 2 includes an example cookbox 102 and an example griddle 104. The griddle 104 of the grill 100 is configured to be disposed on or above the cookbox 102 of the grill 100. The cookbox 102 of the grill 100 is further described below in connection with FIGS. 3 and 4. The griddle 104 of the grill 100 is further described below in connection with FIGS. 5 and 6.

The grill 100 of FIGS. 1 and 2 further includes a plurality of burner tubes configured to be disposed within the cookbox 102 at a location between a bottom wall of the cookbox 102 and an upper rim defined by or associated with the cookbox 102, and/or at a location between the bottom wall of the cookbox 102 and an underside of the griddle 104. As shown in FIG. 2, the plurality of burner tubes includes an example first burner tube 202, an example second burner tube 204, and an example third burner tube 206 (e.g., a total of three burner tubes) that are configured to be laterally spaced apart from one another and arranged in a front-to-rear orientation within the cookbox 102, with the first burner tube 202, the second burner tube 204, and the third burner tube 206 being of a substantially identical construction relative to one another. In other examples, the plurality of burner tubes can instead include a different number (e.g., two, four, five, etc.) of burner tubes, and the construction of one or more of the burner tubes may differ from that of the first burner tube 202, the second burner tube 204, and/or the third burner tube 206 shown in FIG. 2. The first burner tube 202 of the grill 100 is further described below in connection with FIGS. 7-11.

In the illustrated example of FIGS. 1 and 2, the burner tubes (e.g., the first burner tube 202, the second burner tube 204, and the third burner tube 206) form part of a gas train that further includes an example fuel source 106, an example regulator assembly 208, an example manifold 210, and a plurality of control valves corresponding in number to the plurality of burner tubes. In this regard, the plurality of control valves of the grill 100 as shown in FIG. 2 includes an example first control valve 212 associated with the first burner tube 202, an example second control valve 214 associated with the second burner tube 204, and an example third control valve 216 associated with the third burner tube 206.

In the illustrated example of FIG. 1, the fuel source 106 is implemented as a fuel tank (e.g., a propane tank) containing combustible gas. In other examples, the fuel source 106 can instead be implemented as a piped (e.g., household) natural gas line that provides an accessible flow of combustible gas. The regulator assembly 208 is operatively positioned between the fuel source 106 and the manifold 210 such that a supply of combustible gas provided via the fuel source 106 flows through the regulator assembly 208 and into the manifold 210. The first control valve 212 is operatively positioned between the manifold 210 and the first burner tube 202 such that combustible gas received at the manifold 210 can be selectively supplied to the first burner tube 202 via the first control valve 212. The second control valve 214 is operatively positioned between the manifold 210 and the second burner tube 204 such that combustible gas received at the manifold 210 can be selectively supplied to the second burner tube 204 via the second control valve 214. The third control valve 216 is operatively positioned between the manifold 210 and the third burner tube 206 such that combustible gas received at the manifold 210 can be selectively supplied to the third burner tube 206 via the third control valve 216.

In the illustrated example of FIGS. 1 and 2, the manifold 210, the first control valve 212, the second control valve 214, and the third control valve 216 are at least partially covered and/or concealed by an example control panel 108 that is coupled to and/or located along the front of the cookbox 102. The grill 100 further includes a plurality of control knobs mounted and/or located along the front face of the control panel 108, with the plurality of control knobs corresponding in number to the plurality of control valves and/or the number of burner tubes. In this regard, the plurality of control valves of the grill 100 as shown in FIGS. 1 and 2 includes an example first control knob 110 associated with the first control valve 212 and/or the first burner tube 202, an example second control knob 112 associated with the second control valve 214 and/or the second burner tube 204, and an example third control knob 114 associated with the third control valve 216 and/or the third burner tube 206. Each control knob is mechanically coupled to its corresponding control valve such that movement (e.g., rotation) of the control knob changes the extent to which an adjustable flow control member of the corresponding control valve enables combustible gas to flow through the corresponding control valve into the corresponding burner tube. For example, the first control knob 110 is mechanically coupled to the first control valve 212 such that movement (e.g., rotation) of the first control knob 110 changes the extent to which an adjustable flow control member of the first control valve 212 enables combustible gas to flow through the first control valve 212 into the first burner tube 202.

The grill 100 of FIGS. 1 and 2 further includes an example waste collection assembly 116 configured to collect and facilitate the removal of cooking waste. In the illustrated example of FIGS. 1 and 2, the waste collection assembly 116 includes an example waste bin 118 that is suspended from and slidably coupled to a pair of example support rails 120, with the support rails 120 being coupled to an underside of the cookbox 102. The waste bin 118 is moveable (e.g., slidable) along the support rails 120 between a closed position in which a substantial portion of the waste bin 118 is covered by the underside of the cookbox 102 (e.g., as shown in FIG. 1), and a closed position in which a substantial portion of the waste bin 118 is located forward of and not covered by the underside of the cookbox 102. The waste bin 118 is configured to hold and/or contain an example disposable liner 218.

When the waste bin 118 is in the closed position, the waste bin 118 and/or the disposable liner 218 is/are positioned below a lower waste disposal opening formed in and extending through a bottom wall of the cookbox 102. The waste collection assembly 116 further includes an example waste disposal chute 220 disposed within the cookbox 102, and an example upper waste disposal opening 122 formed in and extending through the griddle 104. The waste disposal chute 220 is operatively positioned between the upper waste disposal opening 122 and the lower waste disposal opening such that liquid and/or solid cooking waste (e.g., grease, residue, particles, and/or other byproducts associated with a cooking operation) located on a flat top cooking surface of the griddle 104 can be fed into the upper waste disposal opening 122, with the cooking waste thereafter passing from the upper waste disposal opening 122 through the waste disposal chute 220 and through the lower waste disposal opening. The waste bin 118 and/or the disposable liner 218 collect(s) cooking waste that passes though the waste disposal chute 220 and the lower waste disposal opening when the waste bin 118 is in the closed position. Moving the waste bin 118 from the closed position into the open position facilitates removal of the disposable liner 218 and/or the cooking waste contained therein.

The grill 100 of FIGS. 1 and 2 further includes an example frame 124. In the illustrated example of FIGS. 1 and 2, the frame 124 includes one or more example cookbox support member(s) 126 (e.g., one or more vertically oriented leg(s)) that are configured to support the cookbox 102 above an underlying ground surface. The cookbox support member(s) 126 and/or, more generally, the frame 124 can be configured from any number and any type of structural components arranged in any manner that facilitates supporting the cookbox 102 above an underlying ground surface when the grill 100 is in use. For example, while each of the one or more cookbox support member(s) 126 shown in FIGS. 1 and 2 is fixed relative to the cookbox 102, in other examples the frame 124 can include one or more foldable, slidable, and/or telescoping cookbox support member(s) 126 that facilitate collapsing and/or otherwise modifying the frame 124 of the grill 100 when the grill 100 is not in use. The grill 100 of FIGS. 1 and 2 can further include one or more side table(s) coupled to the frame 124 and/or to the cookbox 102 of the grill 100.

The grill 100 of FIGS. 1 and 2 further includes an example lid 128 configured to cover and/or enclose the griddle 104 of the grill 100 when the lid 128 is in a closed position. The lid 128 is movable relative to the griddle 104 and/or the cookbox 102 between a closed position and an open position in which the flat top cooking surface of the griddle 104 is exposed (e.g., as shown in FIG. 1). In the illustrated example of FIGS. 1 and 2, the lid 128 is removably positioned on the griddle 104 and/or the cookbox 102 without there being any direct mechanical coupling between the lid 128 on the one hand and the cookbox 102, the griddle 104, and/or the frame 124 on the other hand. In other examples, the lid 128 can be pivoted relative to the cookbox 102, the griddle 104, and/or the frame 124 via one or more hinge(s) that mechanically couple the lid 128 to the cookbox 102, the griddle 104, and/or the frame 124. Movement of the lid 128 of the grill 100 between the closed position and the open position can be facilitated via user interaction with an example handle 130 that is coupled to the lid 128.

Figure 3:
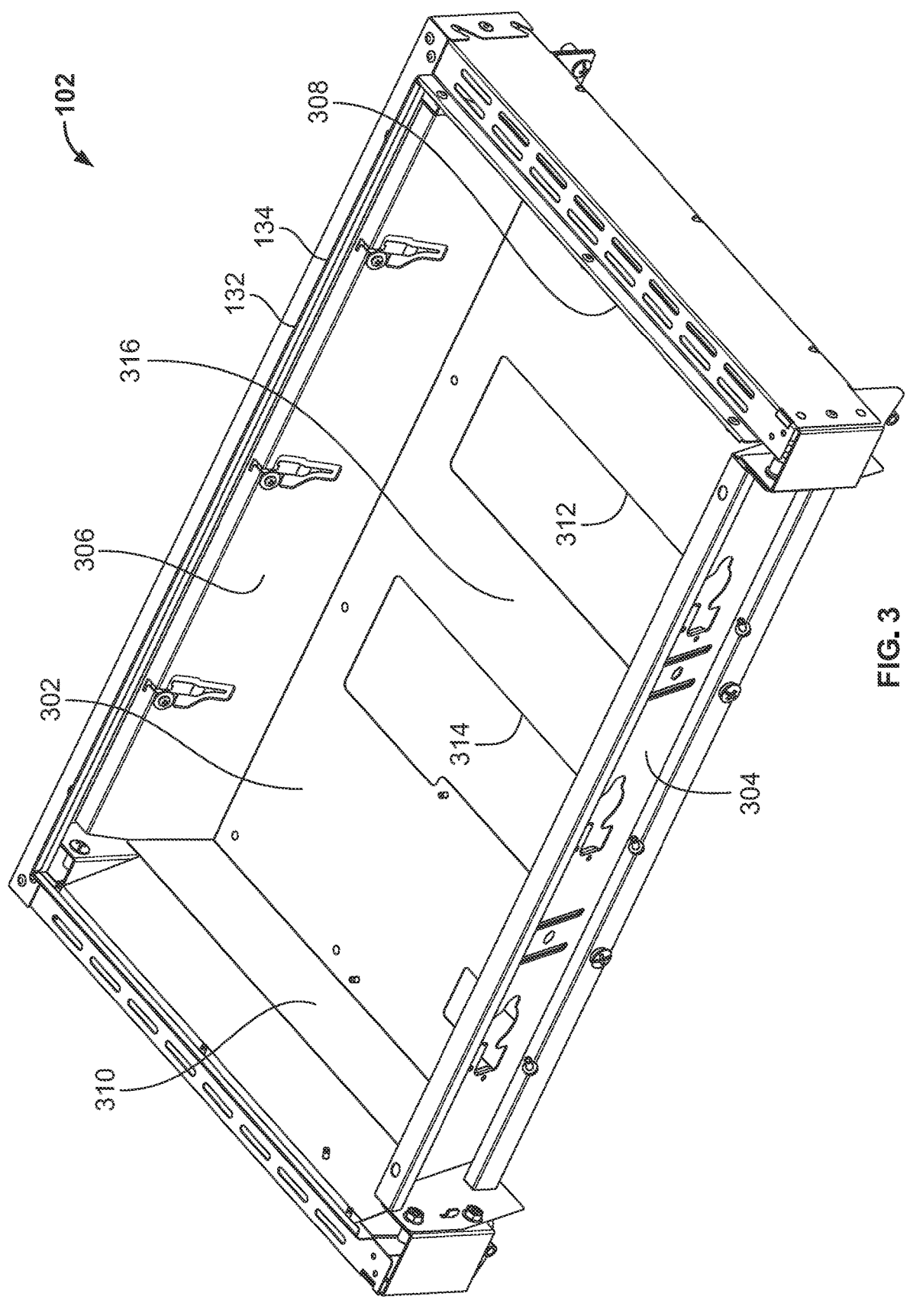
FIG. 3 is a perspective view showing the cookbox of the grill of FIGS. 1 and 2 in isolation.
Figure 4:
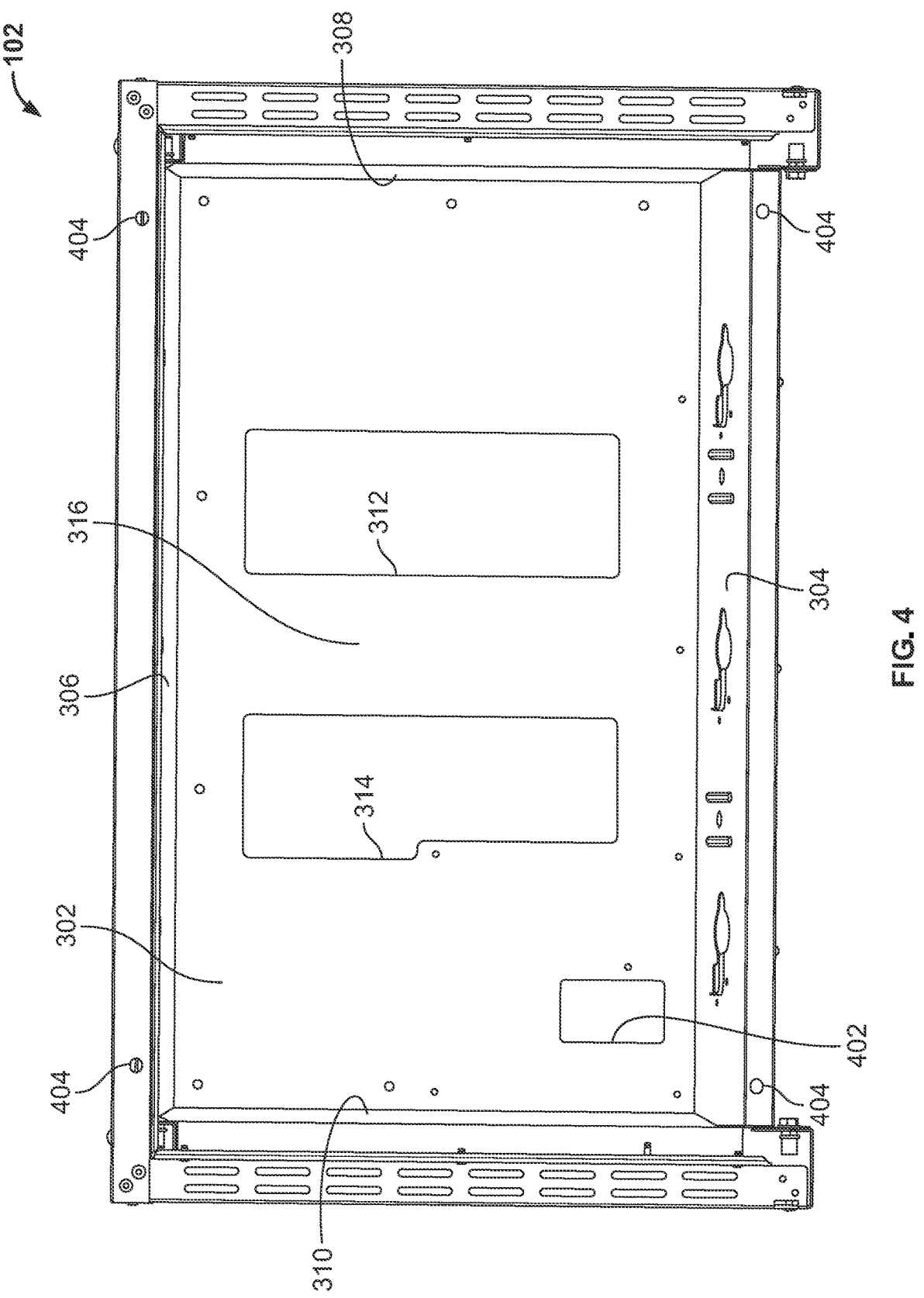
FIG. 4 is a top view of the cookbox of FIG. 3.

FIG. 3 is a perspective view showing the cookbox 102 of the grill 100 of FIGS. 1 and 2 in isolation. FIG. 4 is a top view of the cookbox 102 of FIG. 3. As shown in FIGS. 3 and 4, the cookbox 102 includes an example bottom wall 302, an example front wall 304, an example rear wall 306, an example right sidewall 308, and an example left sidewall 310. The rear wall 306 of the cookbox 102 is located opposite the front wall 304 of the cookbox 102. The right sidewall 308 of the cookbox 102 extends between the front wall 304 and the rear wall 306 of the cookbox 102. The left sidewall 310 of the cookbox 102 is located opposite the right sidewall 308 of the cookbox 102 and extends between the front wall 304 and the rear wall 306 of the cookbox 102. As shown in FIGS. 3 and 4, the front wall 304, the rear wall 306, the right sidewall 308, and the left sidewall 310 of the cookbox 102 extend upwardly from the bottom wall 302 of the cookbox 102 to define a cavity in which one or more structural component(s) (e.g., the first burner tube 202, the second burner tube 204, and the third burner tube 206) of the grill 100 can be disposed.

The cookbox 102 further includes a plurality of air intake openings formed in and extending through the bottom wall 302 of the cookbox 102. The air intake openings are individually and collectively configured to draw air from the surrounding atmosphere into the cookbox 102. As shown in FIGS. 3 and 4, the plurality of air intake openings includes an example first air intake opening 312 and an example second air intake opening 314, with the second air intake opening 314 being laterally spaced apart from the first air intake opening 312. In this regard, the bottom wall 302 of the cookbox 102 further includes an example solid portion 316 that extends between the front wall 304 and the rear wall 306 of the cookbox 102, and further extends between the first air intake opening 312 and the second air intake opening 314 formed in the bottom wall 302 of the cookbox 102. In the illustrated example of FIGS. 3 and 4, the solid portion 316 is free of any unplugged and/or uncovered opening(s) that extend through the bottom wall 302.

The first air intake opening 312, the second air intake opening 314, and the solid portion 316 of the bottom wall 302 of the cookbox 102 are individually and collectively configured such that a burner tube (e.g., the second burner tube 204) of the grill 100 is laterally aligned with the solid portion 316, and such that said burner tube (e.g., the second burner tube 204) is laterally positioned between the first air intake opening 312 and the second air intake opening 314. The first air intake opening 312, the second air intake opening 314, and the solid portion 316 of the bottom wall 302 of the cookbox 102 are further individually and collectively configured such that the first air intake opening 312 is laterally positioned between one set of neighboring burner tubes (e.g., the first burner tube 202 and the second burner tube 204) of the grill 100, and such that the second air intake opening 314 is laterally positioned between another set of neighboring burner tubes (e.g., the second burner tube 204 and the third burner tube 206) of the grill 100.

In the illustrated example of FIGS. 3 and 4, the plurality of air intake openings includes a total of two air intake openings (e.g., the first air intake opening 312 and the second air intake opening 314). In other examples, the plurality of air intake openings can instead include a different number (e.g., three, four, five, etc.) of air intake openings. In the illustrated example of FIGS. 3 and 4, the first air intake opening 312 and the second air intake opening 314 each have a generally rectangular shape. In other examples, the first air intake opening 312 and/or the second air intake opening 314 can instead have a different shape (e.g., a circular shape, an oval shape, a triangular shape, a trapezoidal shape, etc.).

In addition to the air intake openings illustrated in FIGS. 3 and 4, the cookbox 102 further includes an example lower waste disposal opening 402 formed in and extending through the bottom wall 302 of the cookbox 102. The lower waste disposal opening 402 is configured to receive and/or to otherwise be in alignment with a lower portion of the waste disposal chute 220 of the waste collection assembly 116 of the grill 100. Unlike the air intake openings described above, the lower waste disposal opening 402 is not configured to draw air from the surrounding atmosphere into the cookbox 102, but is instead configured to transport cooking waste passing through the waste disposal chute 220 into the disposable liner 218 and/or the waste bin 118 of the waste collection assembly 116 of the grill 100, as further described above.

In the illustrated example of FIGS. 3 and 4, the bottom wall 302 of the cookbox 102 has a width (e.g., measured between the right sidewall 308 and the left sidewall 310) of approximately 25.0 inches, a depth (e.g., measured between the front wall 304 and the rear wall 306) of approximately 13.9 inches, and an associated total area (e.g., calculated as width multiplied by depth) of approximately 347.5 square inches. The first air intake opening 312 formed in the bottom wall 302 has an area of approximately 39.0 square inches, and the second air intake opening 314 formed in the bottom wall 302 has an area of approximately 36.3 square inches. Thus, the first air intake opening 312 and the second air intake opening 314 collectively define an unoccupied area of 75.3 square inches. In the illustrated example of FIGS. 3 and 4, the unoccupied area defined by the air intake openings accounts for approximately 21.7 percent of the total area of the bottom wall 302. In other examples, the unoccupied area defined by the air intake openings can account for between 10.0 and 30.0 percent of the total area of the bottom wall 302. Satisfaction of the above-described range of the ratio of unoccupied area defined by the air intake openings to the total area of the bottom wall 302 advantageously improves the operating efficiency of the cooking engine of the grill 100, and also improves the heat distribution properties associated with the griddle 104 of the grill 100. In this regard, satisfaction of the above-described range of the ratio of unoccupied area defined by the air intake openings to the total area of the bottom wall 302 advantageously assists in minimizing any temperature variation across the flat top cooking surface of the griddle 104 during cooking operations performed thereon.

As shown in FIGS. 1-4, the grill 100 further includes an example upper rim 132 defined by or associated with the cookbox 102. In some examples, one or more portion(s) of the upper rim 132 of the grill 100 is/are formed by one or more portion(s) of the front wall 304, the rear wall 306, the right sidewall 308, and/or the left sidewall 310 of the cookbox 102. In some examples, one or more portion(s) of the upper rim 132 of the grill 100 is/are additionally or alternatively formed by one or more portion(s) of the control panel 108 and/or the frame 124 of the grill 100. For example, as shown in FIGS. 1-4, an example first portion 134 of the upper rim 132 (e.g., including a rear portion, a right side portion, and a left side portion of the upper rim 132) is defined by the cookbox 102 of the grill 100, and an example second portion 136 of the upper rim 132 is defined by the control panel 108 of the grill 100. The cookbox 102, the control panel 108, and/or the frame 124 of the grill 100 include a plurality of example griddle docking openings 404 that are configured to receive and/or to otherwise engage corresponding ones of a plurality of griddle support members of the griddle 104. As further described below, the griddle docking openings 404 and the griddle support members are configured to support the griddle 104 of the grill 100 on or above the cookbox 102 of the grill 100, and/or on or above the upper rim 132 of the grill 100.

Figure 5:
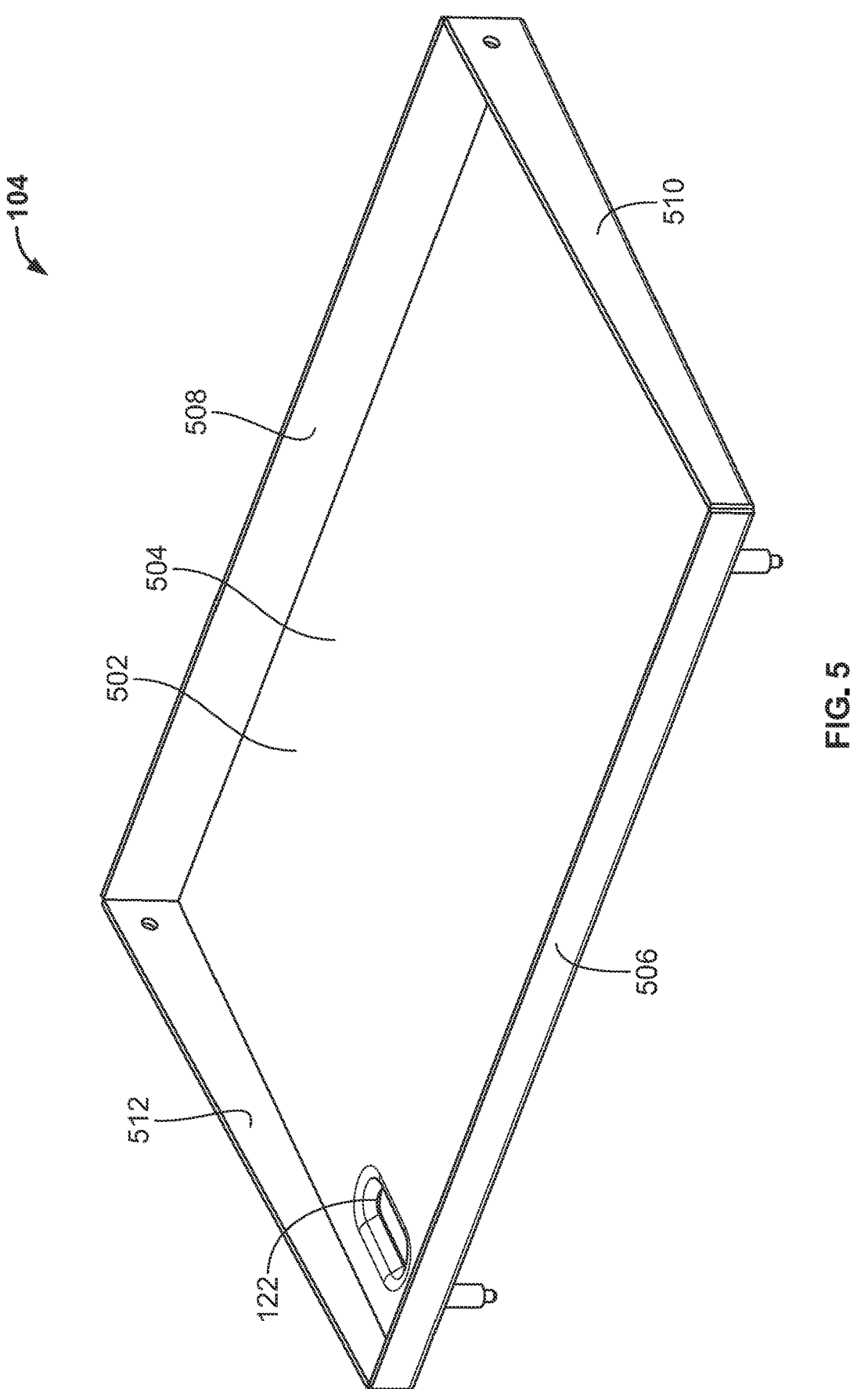
FIG. 5 is a first perspective view showing the griddle of the grill of FIGS. 1 and 2 in isolation.
Figure 6:
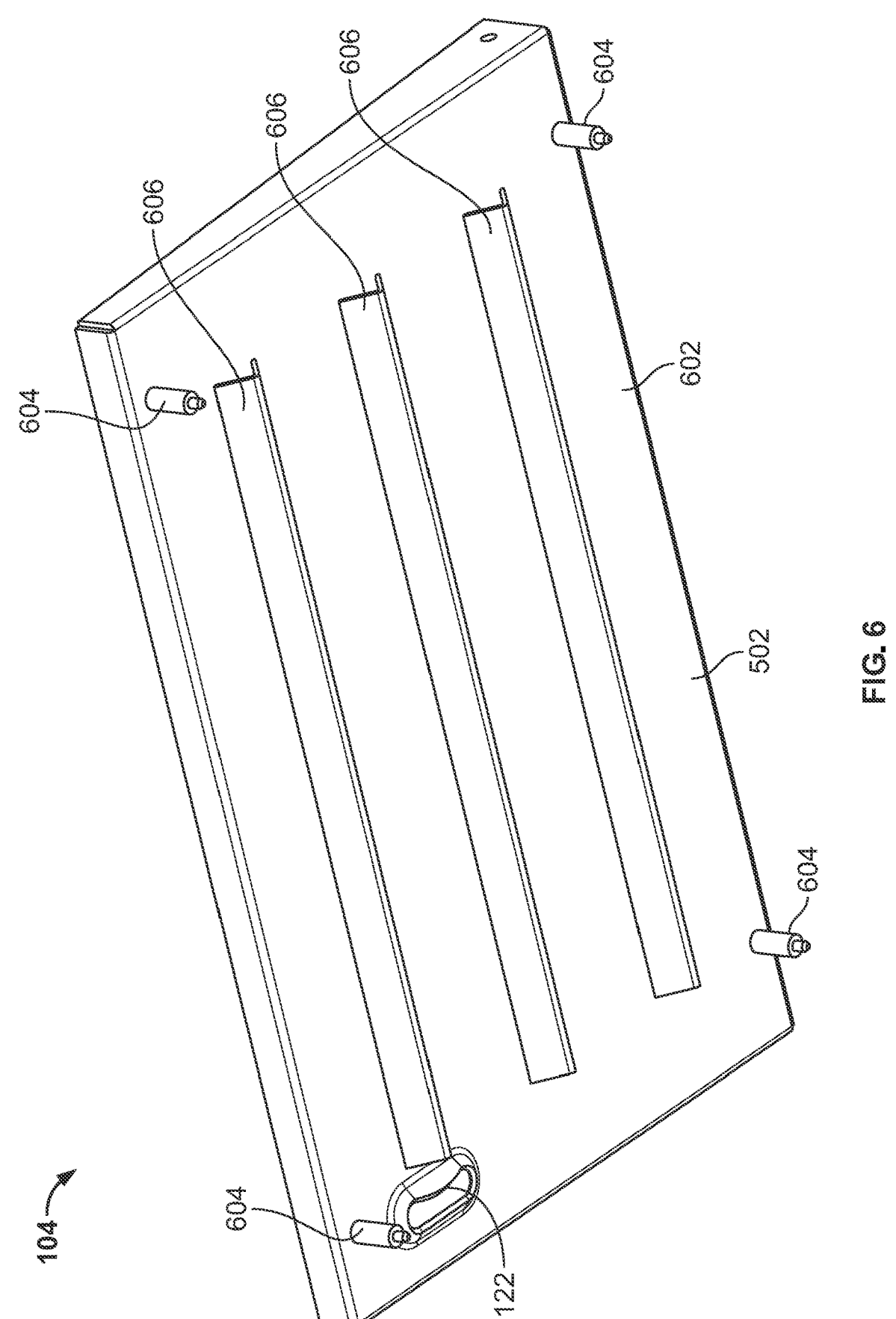
FIG. 6 is a second perspective view of the griddle of FIG. 5.

FIG. 5 is a first perspective view showing the griddle 104 of the grill 100 of FIGS. 1 and 2 in isolation. FIG. 6 is a second perspective view of the griddle 104 of FIG. 5. As shown in FIGS. 5 and 6, the griddle 104 includes an example base 502. The base 502 of the griddle 104 includes an example flat top cooking surface 504 and an example underside 602 located opposite the flat top cooking surface 504. In the illustrated example of FIGS. 5 and 6, the flat top cooking surface 504 is a continuous, substantially flat and/or substantially planar surface that is free of openings aside from the upper waste disposal opening 122 described herein. The flat top cooking surface 504 is configured to support a variety of liquid, semi-liquid, and/or solid food items during a variety of cooking processes that may be performed on the griddle 104. In the illustrated example of FIGS. 5 and 6, the flat top cooking surface 504 and/or, more generally, the base 502 of the griddle 104 has a generally rectangular profile. In other examples, the flat top cooking surface 504 and/or, more generally, the base 502 of the griddle 104 can instead have a non-rectangular profile (e.g., a circular profile, an oval profile, a triangular profile, a trapezoidal profile, etc.).

The griddle 104 further includes an example front lip 506, and an example rear lip 508, an example right side lip 510, and an example left side lip 512. The rear lip 508 of the griddle 104 is located opposite the front lip 506 of the griddle 104. The right side lip 510 of the griddle 104 extends between the front lip 506 and the rear lip 508 of the griddle 104. The left side lip 512 of the griddle 104 is located opposite the right side lip 510 of the griddle 104 and extends between the front lip 506 and the rear lip 508 of the griddle 104. The front lip 506, the rear lip 508, the right side lip 510, and the left side lip 512 of the griddle 104 extend upwardly from the base 502 of the griddle 104 to provide vertical boundaries configured to prevent food items from sliding off the flat top cooking surface 504 of the griddle 104 during one or more cooking operation(s) performed thereon.

As shown in FIGS. 5 and 6, the upper waste disposal opening 122 formed in the base 502 of the griddle 104 extends completely through the base 502 (e.g., from the flat top cooking surface 504 of the base 502 through to the underside 602 of the base 502). The upper waste disposal opening 122 facilitates the removal and/or disposal of liquid and/or solid cooking waste (e.g., grease, residue, particles, and/or other byproducts associated with a cooking operation) located on the flat top cooking surface 504 of the griddle 104, as further described above. In the illustrated example of FIGS. 5 and 6, the upper waste disposal opening 122 is located proximate the front left corner of the base 502 of the griddle 104 (e.g., near the junction of the front lip 506 and the left side lip 512 of the griddle 104). In other examples, the upper waste disposal opening 122 can instead be located proximate some other portion (e.g., the rear left corner, the front right corner, the rear right corner, etc.) of the base 502 of the griddle 104.

The griddle 104 further includes a plurality of example griddle support members 604 (e.g., vertically oriented posts) coupled to and extending downwardly from the underside 602 of the base 502 of the griddle 104. The griddle support members 604 are configured to support the underside 602 and/or, more generally, the base 502 of the griddle 104 on or above the cookbox 102 of the grill 100, and/or on or above the upper rim 132 of the grill 100. In this regard, respective ones of the griddle support members 604 of the griddle 104 are configured to be received by and/or to otherwise engage corresponding ones of the griddle docking openings 404 of the cookbox 102 of the grill 100. In the illustrated example of FIGS. 5 and 6, the griddle 104 includes a total of four griddle support members 604 configured to be received by and/or to otherwise engage a total of four griddle docking openings 404. In other examples, the griddle 104 can instead include a different number (e.g., two, three, five, six, etc.) of griddle support members 604, and the cookbox 102 can similarly include a corresponding different number (e.g., two, three, five, six, etc.) of griddle docking openings 404.

The griddle 104 further includes a plurality of example anti-warping braces 606 coupled to and extending downwardly from the underside 602 of the base 502 of the griddle 104. The anti-warping braces 606 are configured to support, strengthen, and/or brace the underside 602 and/or, more generally, the base 502 of the griddle 104 to limit and/or prevent any buckling and/or warping thereof. As shown in FIGS. 5 and 6, the anti-warping braces 606 are arranged in a right-to-left orientation along the underside 602 of the base 502 of the griddle 104. In other examples, the anti-warping braces 606 can instead be arranged in a different orientation (e.g., a front-to-rear orientation, a diagonal orientation, etc.)

along the underside 602 of the base 502 of the griddle 104. In the illustrated example of FIGS. 5 and 6, the griddle 104 includes a total of three anti-warping braces 606. In other examples, the griddle 104 can instead include a different number (e.g., one, two, four, etc.) of anti-warping braces 606.

In the illustrated example of FIGS. 5 and 6, the flat top cooking surface 504 and/or, more generally, the base 502 of the griddle 104 has a width (e.g., measured between the right side lip 510 to the left side lip 512) of approximately 28.0 inches, a depth (e.g., measured between the front lip 506 and the rear lip 508) of approximately 18.0 inches, and an associated total area (e.g., calculated as width multiplied by depth) of approximately 504.0 square inches. In other examples, the width, the depth, and/or the total area of the flat top cooking surface 504 can differ from the above-described dimensions.

Figure 7:
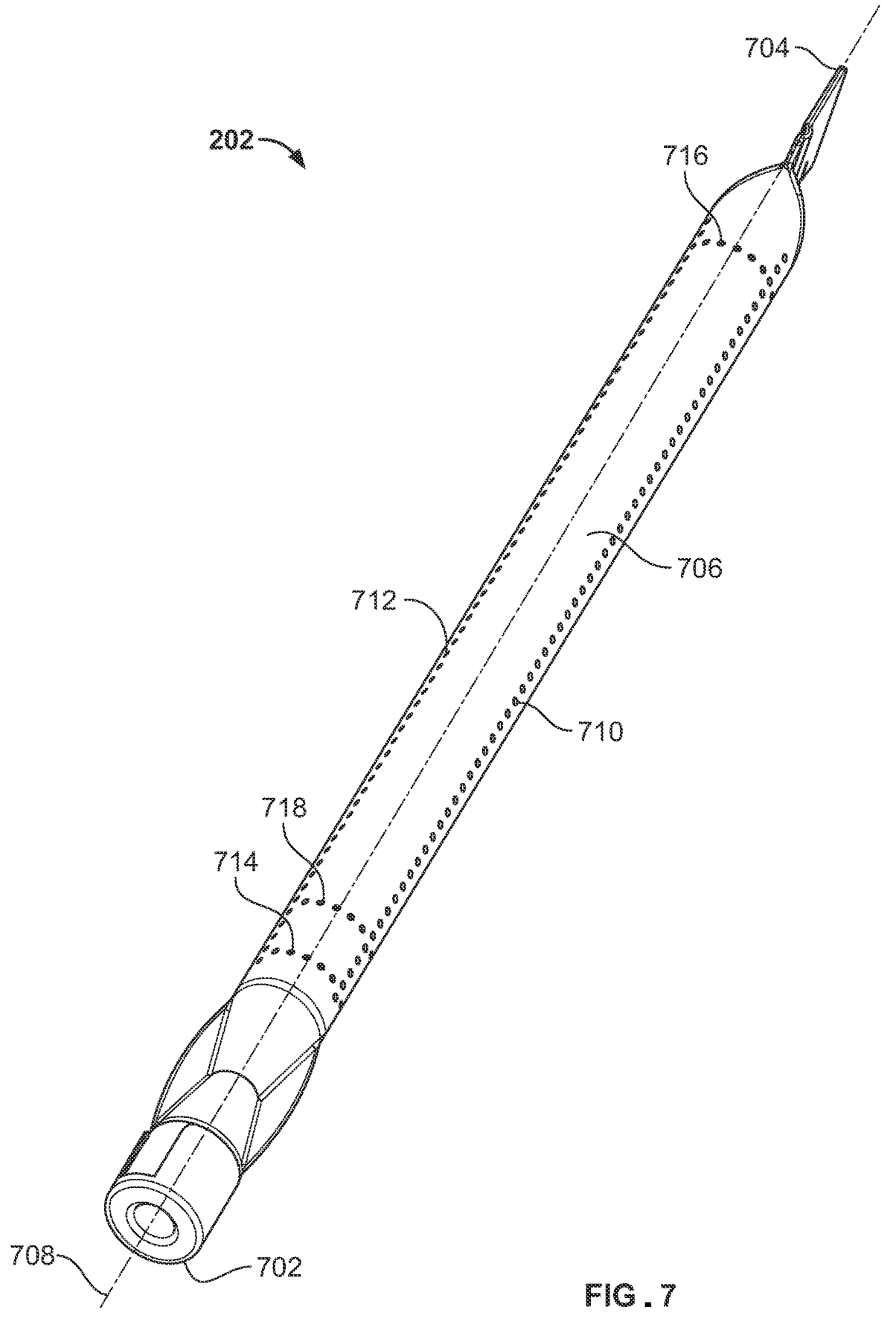
FIG. 7 is a perspective view showing the first burner tube of the grill of FIGS. 1 and 2 in isolation.
Figures 8, 9:
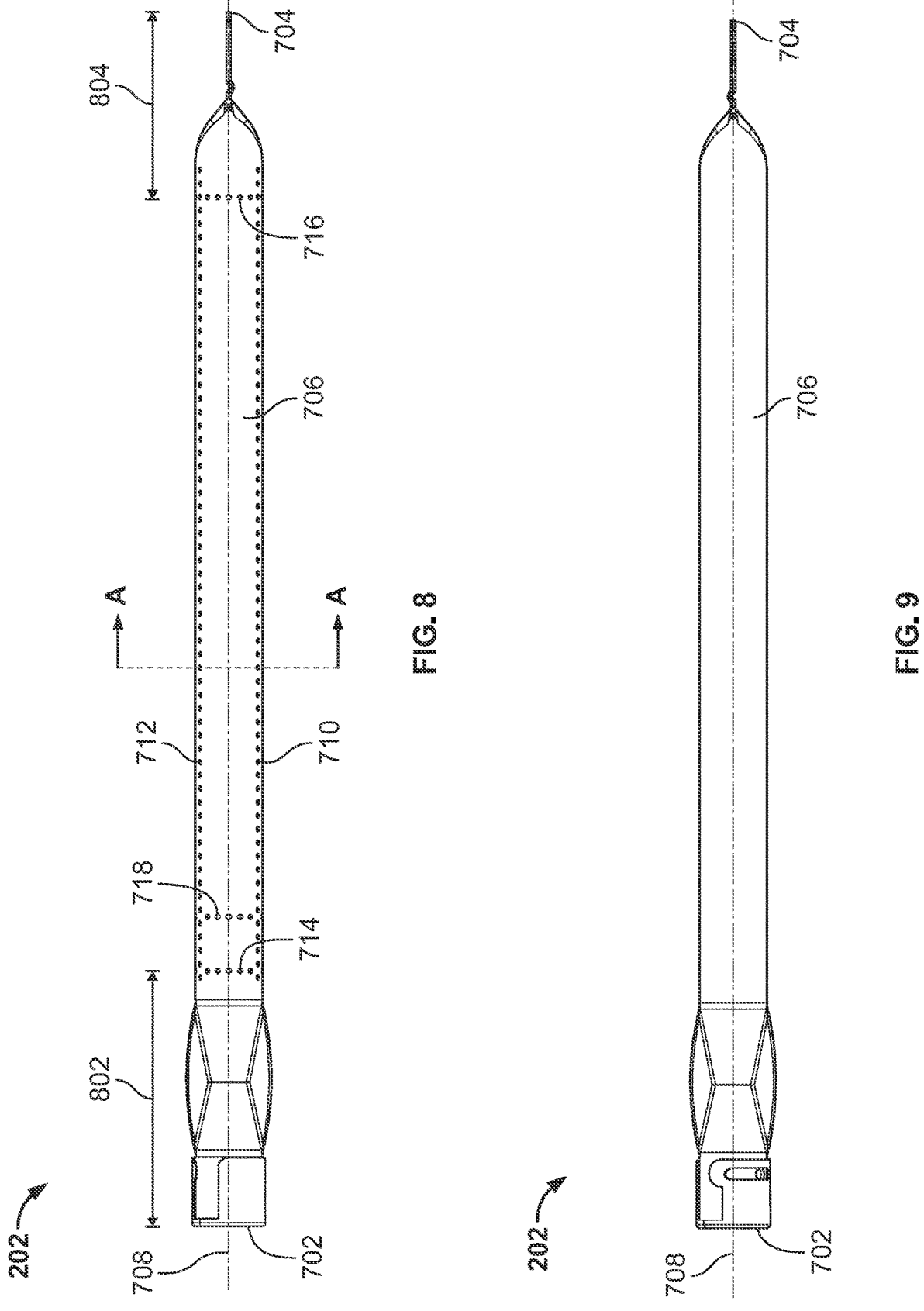
FIG. 8 is a top view of the first burner tube of FIG. 7.
FIG. 9 is a bottom view of the first burner tube of FIGS. 7 and 8.
Figures 10, 11:
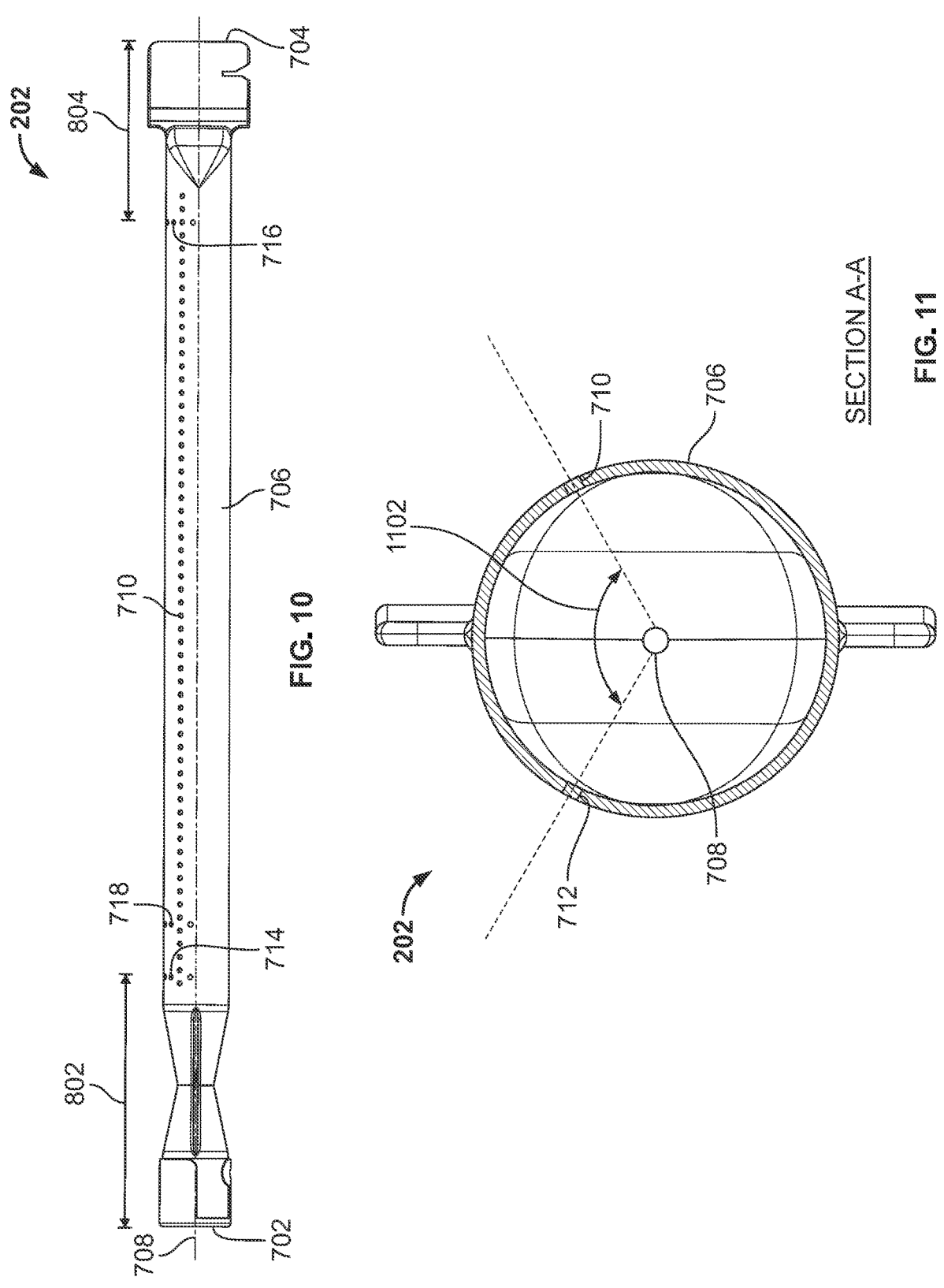
FIG. 10 is a right side view of the first burner tube of FIGS. 7-9.
FIG. 11 is a cross-sectional view of the first burner tube of FIGS. 7-10 taken along section A-A of FIG. 8.

FIG. 7 is a perspective view showing the first burner tube 202 of the grill 100 of FIGS. 1 and 2 in isolation. FIG. 8 is a top view of the first burner tube 202 of FIG. 7. FIG. 9 is a bottom view of the first burner tube 202 of FIGS. 7 and 8. FIG. 10 is a right side view of the first burner tube 202 of FIGS. 7-9. FIG. 11 is a cross-sectional view of the first burner tube 202 of FIGS. 7-10 taken along section A-A of FIG. 8. The construction of the second burner tube 204 and the third burner tube 206 of the grill 100 of FIGS. 1 and 2 is substantially identical to that of the first burner tube 202 as described herein in connection with FIGS. 7-11.

As shown in FIGS. 7-11, the first burner tube 202 includes an example first end 702 (e.g., a front end), an example second end 704 (e.g., a rear end), an example outer wall 706 extending between the first end 702 and the second end 704, and an example central axis 708 extending between the first end 702 and the second end 704. The first end 702 of the first burner tube 202 is partially open, with the first end 702 being configured to receive an outlet of a control valve (e.g., the outlet of the first control valve 212) located proximate the front wall 304 of the cookbox 102. The second end 704 of the first burner tube 202 is closed, with the second end 704 being configured to be coupled to a mounting flange located proximate the rear wall 306 of the cookbox 102. The first burner tube 202 is accordingly configured to be arranged in a front-to-rear orientation when disposed in the cookbox 102. In the illustrated example of FIGS. 7-11, the first burner tube 202 is structured as a linear burner tube having a circular cross-sectional profile. In other example, the first burner tube 202 can instead be structured as a linear burner tube having a different cross-sectional profile (e.g., a rectangular cross-sectional profile, an oval-shaped cross-sectional profile, a triangular cross-sectional profile, a trapezoidal cross-sectional profile, etc.). In still other examples, the first burner tube 202 can instead be structured as a non-linear burner tube having one or more bend(s) and/or curve(s) formed therein.

The first burner tube 202 of FIGS. 7-11 includes a plurality of ports formed in and extending through the outer wall 706 of the first burner tube 202. As shown in FIGS. 7-11, the plurality of ports includes an example first row of ports 710, an example second row of ports 712, an example third row of ports 714, and an example fourth row of ports 716. The first row of ports 710 is arranged parallel to the central axis 708. The second row of ports 712 is also arranged parallel to the central axis 708, with the second row of ports 712 being spaced apart from (e.g., angularly displaced from) the first row of ports 710 about the perimeter (e.g., about the circumference) of the outer wall 706 of the first burner tube 202. The third row of ports 714 is arranged perpendicular to the central axis 708. The fourth row of ports 716 is also arranged perpendicular to the central axis 708, with the fourth row of ports 716 being spaced apart from (e.g., longitudinally displaced from) the third row of ports 714 along central axis 708 of the first burner tube 202. In the illustrated example of FIGS. 7-11, the third row of ports 714 is located proximate the first end 702 (e.g., the front end) of the first burner tube 202, and the fourth row of ports 716 is located proximate the second end 704 (e.g., the rear end) of the first burner tube 202. The first burner tube 202 can include additional ports and/or additional rows of ports relative to those described above. For example, as shown in FIGS. 7-11, the first burner tube 202 further includes an example fifth row of ports 718 arranged perpendicular to the central axis 708, with the fifth row of ports 718 being spaced apart from and proximate to the third row of ports 714.

As shown in FIGS. 7-11, the outer wall 706 of the first burner tube 202 has a circular cross-sectional profile. The second row of ports 712 is angularly displaced from the first row of ports 710 about the circumference of the outer wall 706 by an example angle 1102 measuring approximately 120.0 degrees. In other examples, the angle 1102 at which the second row of ports 712 is angularly displaced from the first row of ports 710 about the circumference of the outer wall 706 can be between 90.0 and 150.0 degrees. Satisfaction of the above-described range of the angle 1102 at which the second row of ports 712 is angularly displaced from the first row of ports 710 about the circumference of the outer wall 706 advantageously improves the operating efficiency of the cooking engine of the grill 100, and also improves the heat distribution properties associated with the griddle 104 of the grill 100. In this regard, satisfaction of the above-described range of the angle 1102 at which the second row of ports 712 is angularly displaced from the first row of ports 710 about the circumference of the outer wall 706 advantageously assists in minimizing any temperature variation across the flat top cooking surface 504 of the griddle 104 during cooking operations performed thereon.

The first burner tube 202 of FIGS. 7-11 is further configured such that the third row of ports 714 of the first burner tube 202 is spaced apart from the first end 702 (e.g., the front end) of the first burner tube 202 by an example distance 802 of approximately 3.8 inches. In other examples, the distance 802 between the third row of ports 714 and the first end 702 of the first burner tube 202 can be between 1.0 and 6.0 inches. Satisfaction of the above-described range of the distance 802 between the third row of ports 714 and the first end 702 of the first burner tube 202 advantageously improves the operating efficiency of the cooking engine of the grill 100, and also improves the heat distribution properties associated with the griddle 104 of the grill 100. In this regard, satisfaction of the above-described range of the distance 802 between the third row of ports 714 and the first end 702 of the first burner tube 202 advantageously assists in minimizing any temperature variation across the flat top cooking surface 504 of the griddle 104 during cooking operations performed thereon.

The first burner tube 202 of FIGS. 7-11 is further configured such that the fourth row of ports 716 of the first burner tube 202 is spaced apart from the second end 704 (e.g., the rear end) of the first burner tube 202 by an example distance 804 of approximately 2.8 inches. In other examples, the distance 804 between the fourth row of ports 716 and the second end 704 of the first burner tube 202 can be between 1.0 and 6.0 inches. Satisfaction of the above-described range of the distance 804 between the fourth row of ports 716 and the second end 704 of the first burner tube 202 advantageously improves the operating efficiency of the cooking engine of the grill 100, and also improves the heat distribution properties associated with the griddle 104 of the grill 100. In this regard, satisfaction of the above-described range of the distance 804 between the fourth row of ports 716 and the second end 704 of the first burner tube 202 advantageously assists in minimizing any temperature variation across the flat top cooking surface 504 of the griddle 104 during cooking operations performed thereon.

In the illustrated example of FIGS. 7-11, the first burner tube 202 has a length of approximately 18.0 inches measured along the central axis 708 from the first end 702 (e.g., the front end) to the second end 704 (e.g., the rear end) of the first burner tube 202. In other examples, the first burner tube 202 can instead have a length that is substantially greater than or substantially less than 18.0 inches. In the illustrated example of FIGS. 7-11, the outer wall 706 of the first burner tube 202 has a diameter of approximately 1.0 inches measured across the circular cross-sectional profile of the outer wall 706. In other examples, the first burner tube 202 can instead have a diameter that is substantially greater than or substantially less than 1.0 inches. In the illustrated example of FIGS. 7-11, each one of the ports formed in and extending through the outer wall 706 of the first burner tube 202 has a diameter of approximately 0.07 inches measured across the circular outlet opening of the port. In other examples, one or more of the ports formed in and extending through the outer wall 706 of the first burner tube 202 can instead have a diameter that is substantially greater than or substantially less than 0.07 inches.

Figure 12:
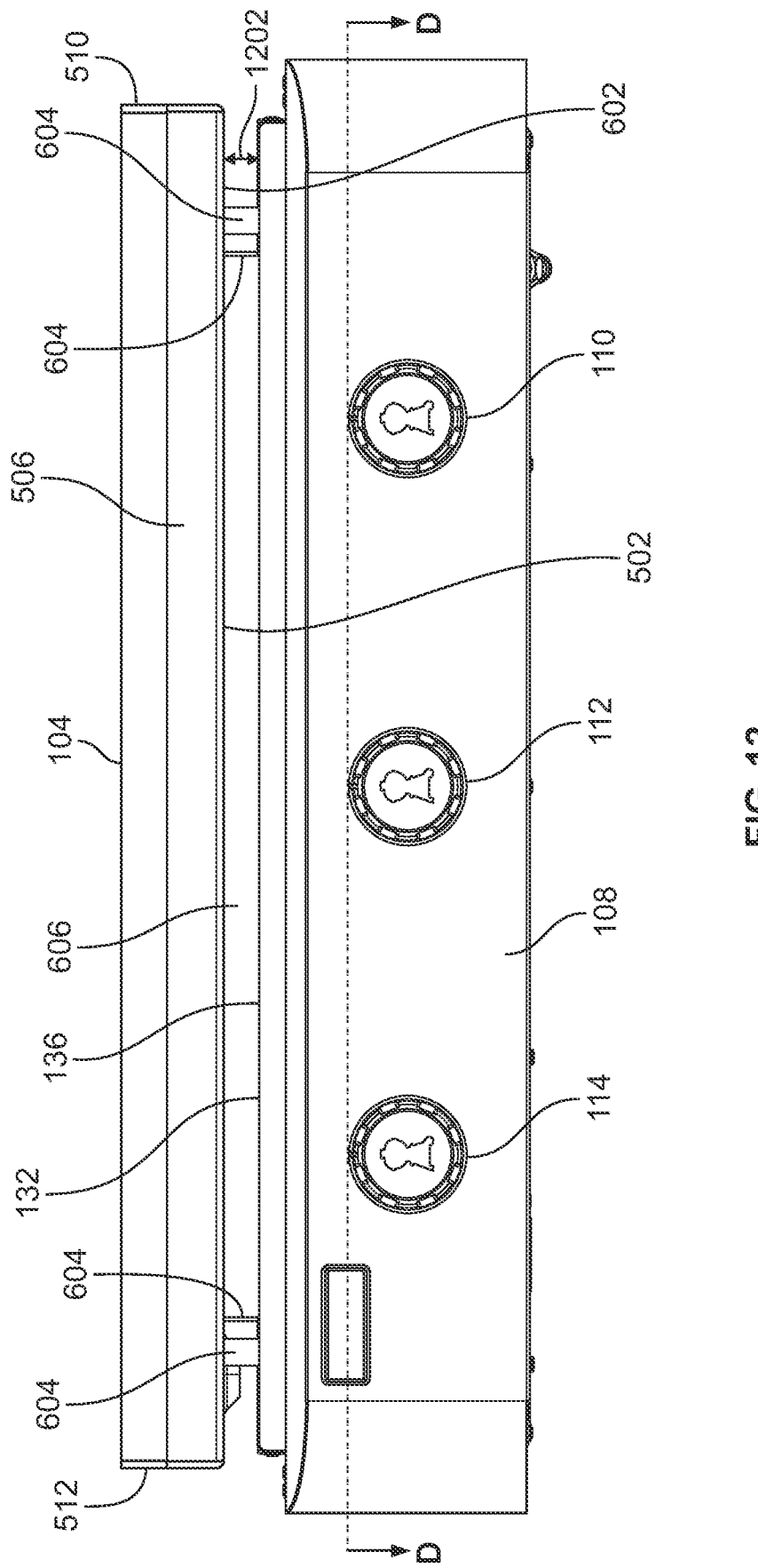
FIG. 12 is a front view showing the grill of FIGS. 1 and 2, with the frame, the lid, and certain other structural features of the grill omitted for enhanced viewability.
Figure 13:
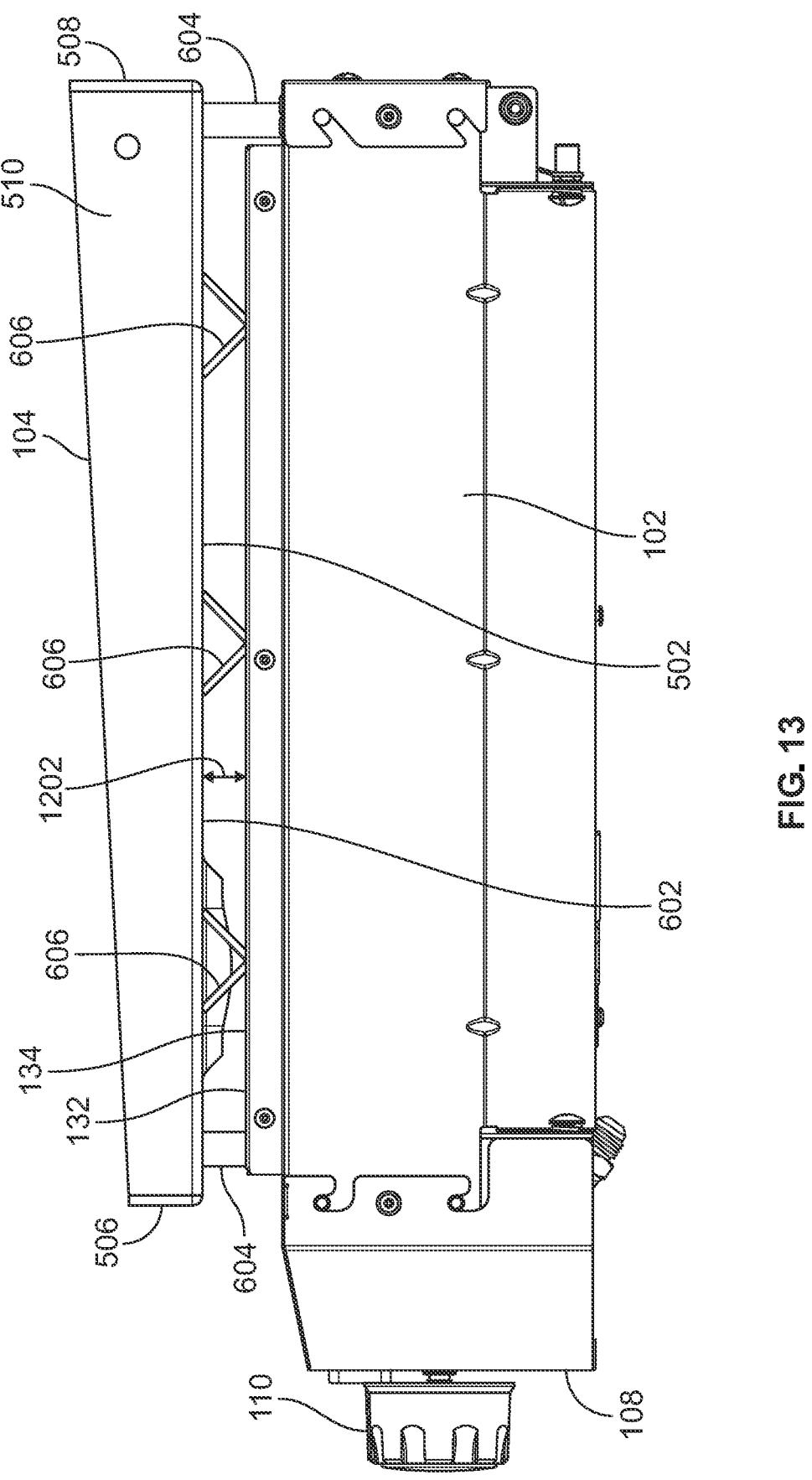
FIG. 13 is a right side view of the grill of FIG. 12.
Figure 14:
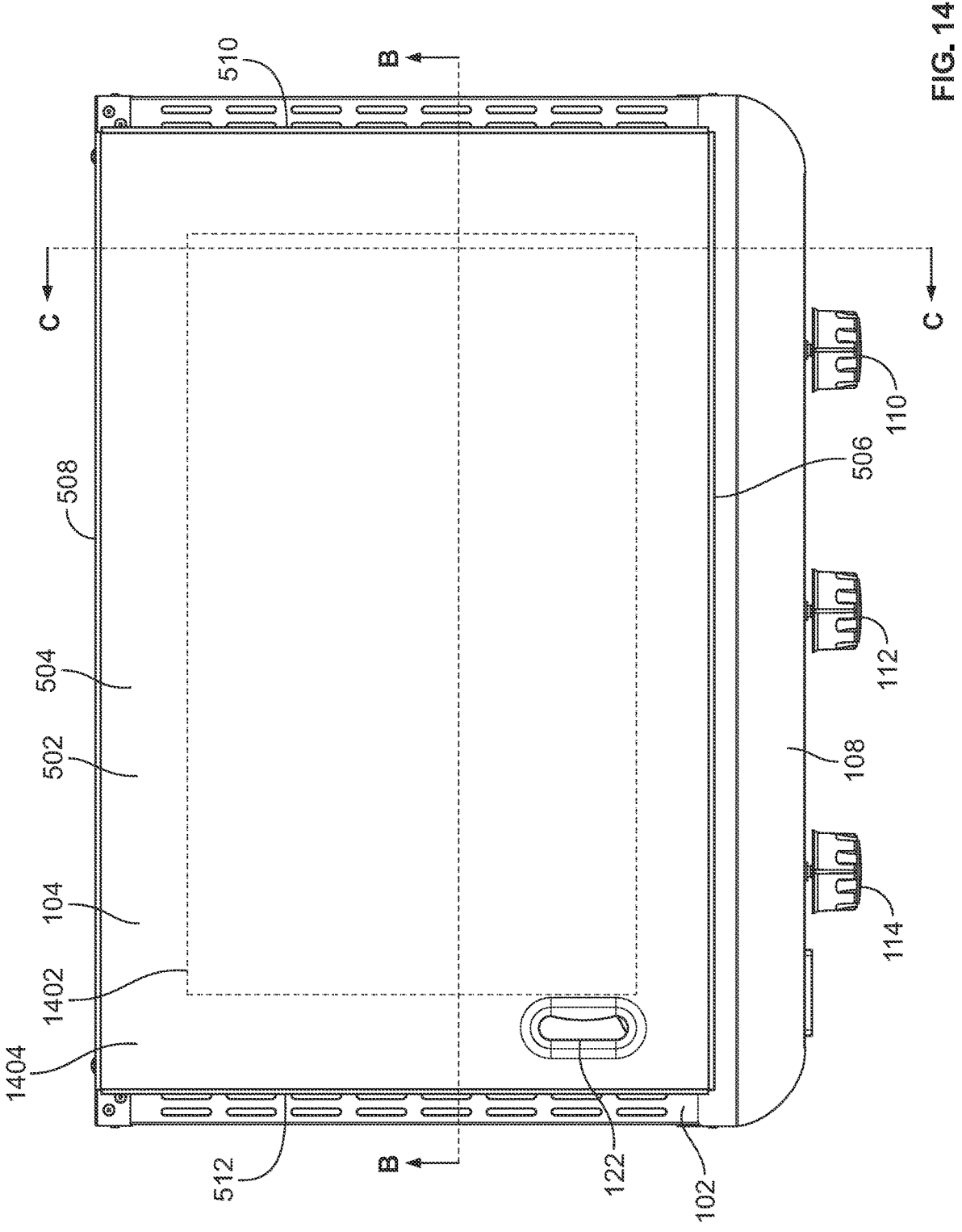
FIG. 14 is a top view of the grill of FIGS. 12 and 13.
Figure 15:
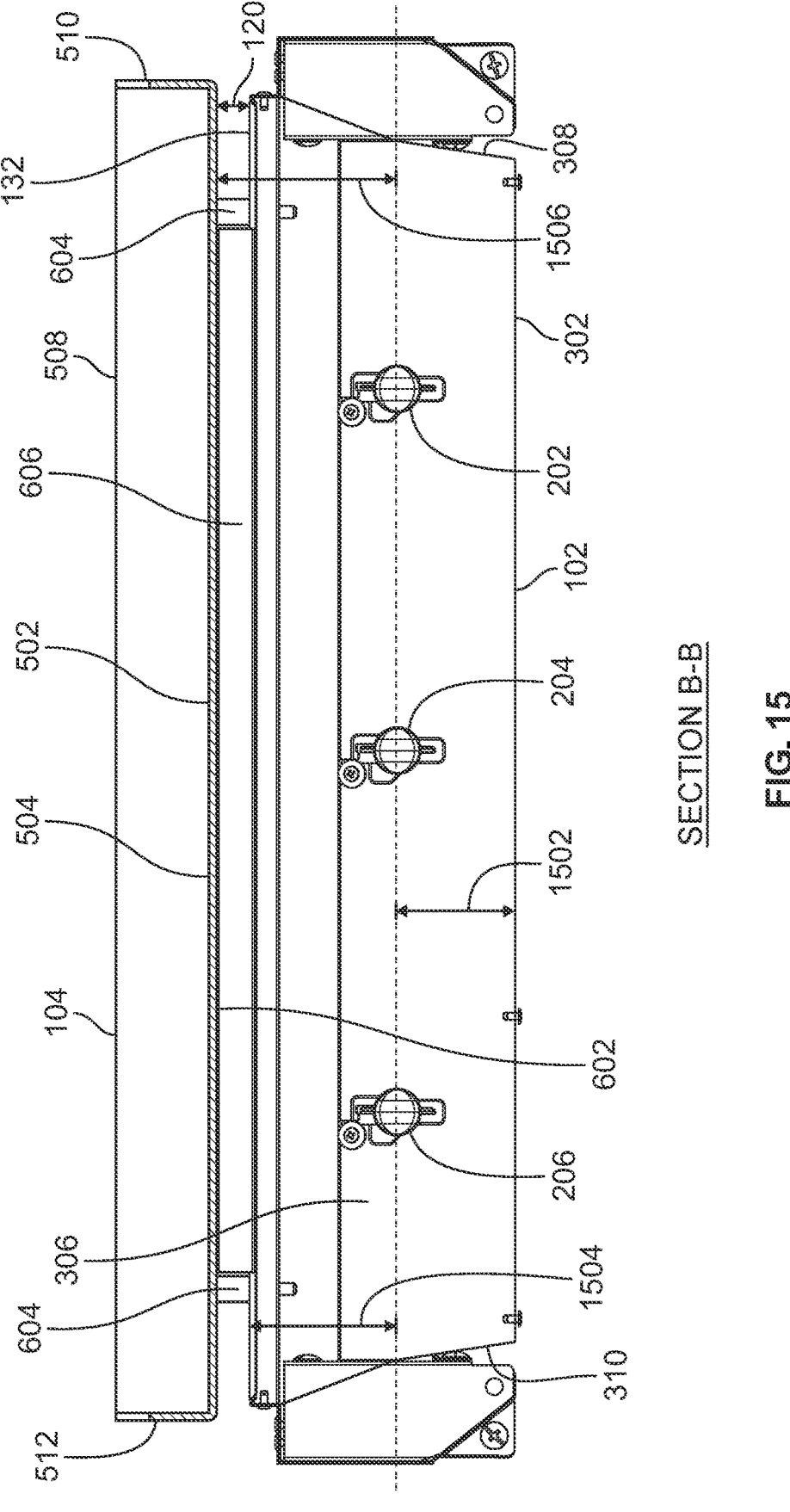
FIG. 15 is a cross-sectional view of the grill of FIGS. 12-14 taken along section B-B of FIG. 14.
Figure 16:
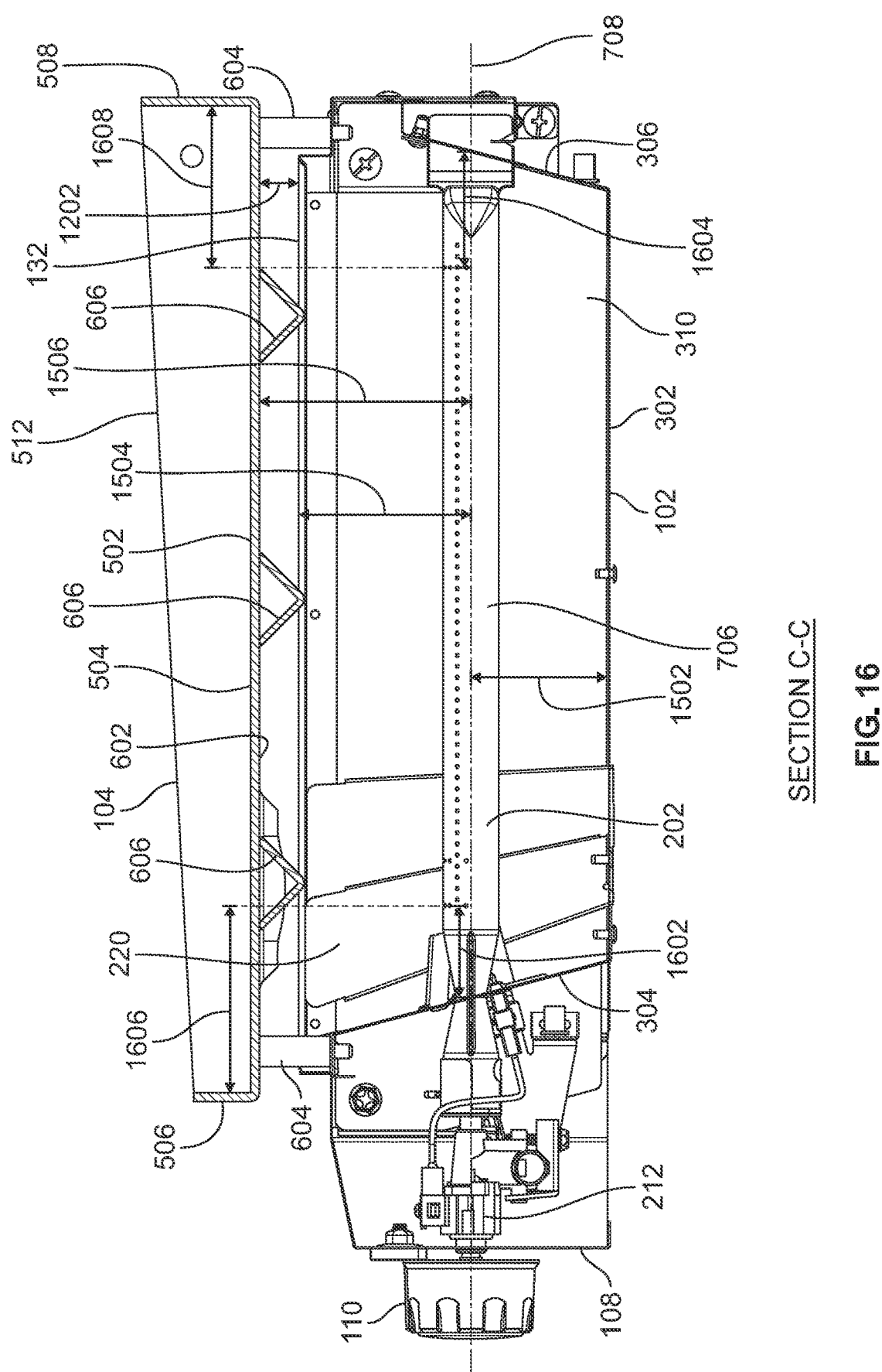
FIG. 16 is a cross-sectional view of the grill of FIGS. 12-15 taken along section C-C of FIG. 14.
Figure 17:
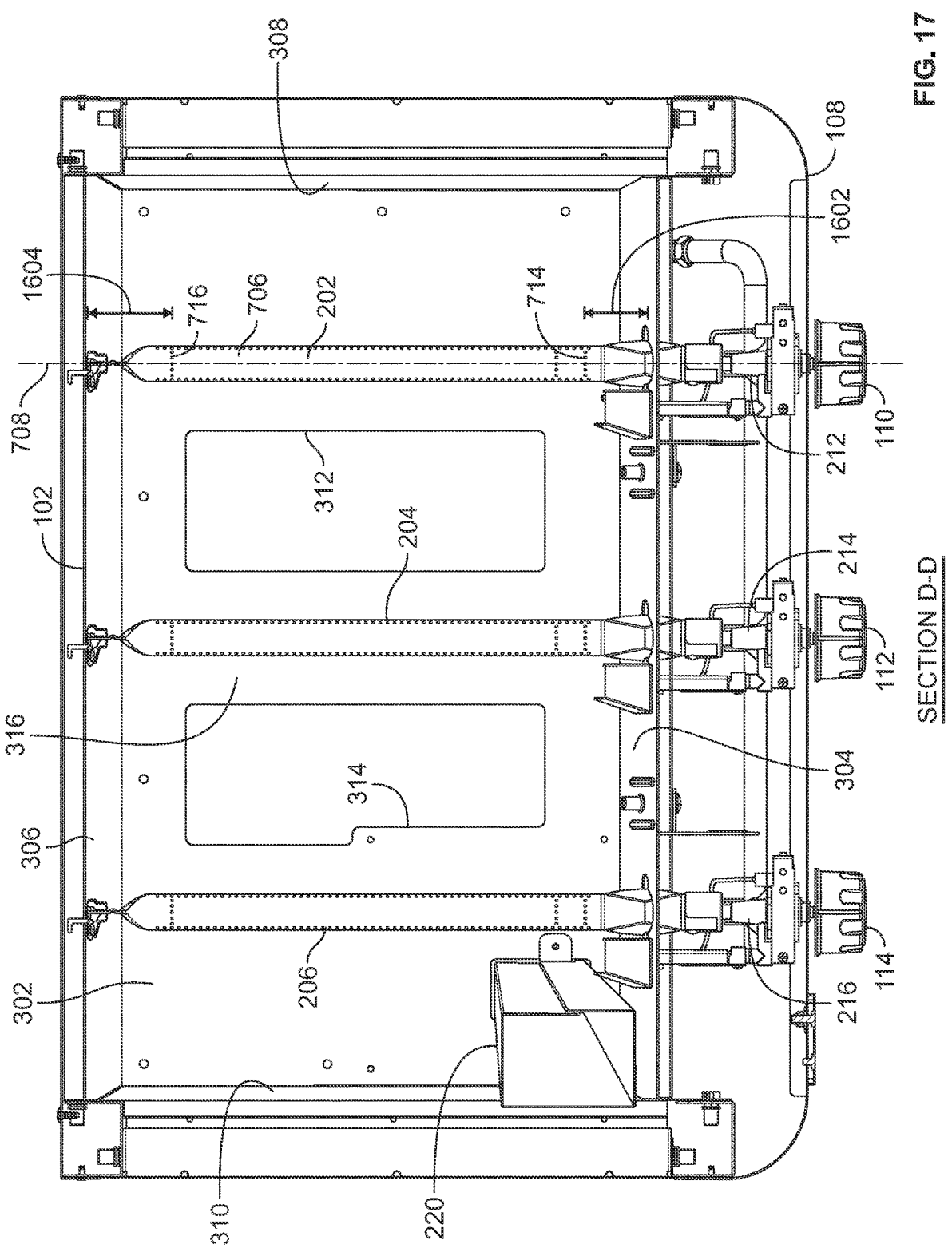
FIG. 17 is a cross-sectional view of the grill of FIGS. 12-16 taken along section D-D of FIG. 12.

FIG. 12 is a front view showing the grill 100 of FIGS. 1 and 2, with the frame 124, the lid 128, and certain other structural features of the grill 100 omitted for enhanced viewability. FIG. 13 is a right side view of the grill 100 of FIG. 12. FIG. 14 is a top view of the grill 100 of FIGS. 12 and 13. FIG. 15 is a cross-sectional view of the grill 100 of FIGS. 12-14 taken along section B-B of FIG. 14. FIG. 16 is a cross-sectional view of the grill 100 of FIGS. 12-15 taken along section C-C of FIG. 14. FIG. 17 is a cross-sectional view of the grill 100 of FIGS. 12-16 taken along section D-D of FIG. 12.

As shown in FIGS. 12-17, the griddle 104 of the grill 100 is disposed on or above the cookbox 102 of the grill 100. More specifically, the griddle 104 is removably positioned and/or docked on top of the cookbox 102 via engagement of the griddle support members 604 of the griddle 104 and the griddle docking openings 404 associated with the cookbox 102. As further shown in FIGS. 12-17, the underside 602 of the griddle 104 is located above and spaced apart from the upper rim 132 of the cookbox 102 by an example vertical gap 1202 that is configured to vent heated air generated within the cookbox 102 (e.g., heated air generated via the first burner tube 202, the second burner tube 204, and/or the third burner tube 206). In addition to extending between the upper rim 132 of the cookbox 102 and the underside 602 of the griddle 104, the vertical gap 1202 further extends completely or substantially around a perimeter of the upper rim 132 of the cookbox 102, and completely or substantially around a perimeter of the underside 602 of the griddle 104. Configuring the vertical gap 1202 in this manner advantageously facilitates even and/or uniform venting of heat from the cookbox 102 (e.g., along each of the front wall 304, the rear wall 306, the right sidewall 308, and the left sidewall 310 of the cookbox 102) relative to the griddle 104 (e.g., along the front lip 506, the rear lip 508, the right side lip 510, and the left side lip 512 of the griddle 104).

In the illustrated example of FIGS. 12-17, the vertical gap 1202 has a height of approximately 0.70 inches. In other examples, the vertical gap 1202 can have a height between 0.25 and 1.50 inches. Satisfaction of the above-described range of the height of the vertical gap 1202 advantageously improves the operating efficiency of the cooking engine of the grill 100, and also improves the heat distribution properties associated with the griddle 104 of the grill 100. In this regard, satisfaction of the above-described range of the height of the vertical gap 1202 advantageously assists in minimizing any temperature variation across the flat top cooking surface of the griddle 104 during cooking operations performed thereon.

As shown in FIGS. 12-17, the burner tubes (e.g., the first burner tube 202, the second burner tube 204, and the third burner tube 206) of the grill 100 are disposed within the cookbox 102 of the grill 100 at a location between the bottom wall 302 of the cookbox 102 and the underside 602 of the griddle 104. More specifically, the burner tubes (e.g., the first burner tube 202, the second burner tube 204, and the third burner tube 206) of the grill 100 are disposed within the cookbox 102 of the grill 100 at a location between the bottom wall 302 of the cookbox 102 and the upper rim 132 of the cookbox 102, with respective ones of the burner tubes being laterally spaced apart from one another and arranged in a front-to-rear orientation. As shown in FIGS. 12-17, the first burner tube 202 is laterally positioned to the right side of the first air intake opening 312 formed in the bottom wall 302 of the cookbox 102. The second burner tube 204 is laterally positioned to the left side of the first air intake opening 312 formed in the bottom wall 302 of the cookbox 102 and to the right side of the second air intake opening 314 formed in the bottom wall 302 of the cookbox 102. The second burner tube 204 is accordingly located between the first air intake opening 312 and the second air intake opening 314 formed in the bottom wall 302 of the cookbox 102, such that the second burner tube 204 is laterally aligned with the solid portion 316 of the bottom wall 302 of the cookbox 102. The third burner tube 206 is laterally positioned to the left side of the second air intake opening 314 formed in the bottom wall 302 of the cookbox 102.

In the illustrated example of FIGS. 12-17, each of the burner tubes (e.g., the first burner tube 202, the second burner tube 204, and the third burner tube 206) is vertically positioned above the bottom wall 302 of the cookbox 102 by an example distance 1502 of approximately 2.5 inches measured vertically from the bottom wall 302 of the cookbox 102 to the central axis 708 of the respective burner tube. In other examples, the distance 1502 at which each of the burner tubes is vertically positioned above the bottom wall 302 of the cookbox 102 can be between 1.5 and 3.5 inches. Satisfaction of the above-described range of the distance 1502 at which each of the burner tubes is vertically positioned above the bottom wall 302 of the cookbox 102 advantageously improves the operating efficiency of the cooking engine of the grill 100, and also improves the heat distribution properties associated with the griddle 104 of the grill 100. In this regard, satisfaction of the above-described range of the distance 1502 at which each of the burner tubes is vertically positioned above the bottom wall 302 of the cookbox 102 advantageously assists in minimizing any temperature variation across the flat top cooking surface 504 of the griddle 104 during cooking operations performed thereon.

In the illustrated example of FIGS. 12-17, each of the burner tubes (e.g., the first burner tube 202, the second burner tube 204, and the third burner tube 206) is vertically positioned below the upper rim 132 of the cookbox 102 by an example distance 1504 of approximately 3.1 inches measured vertically from the upper rim 132 of the cookbox 102 to the central axis 708 of the respective burner tube. In other examples, the distance 1504 at which each of the burner tubes is vertically positioned below the upper rim 132 of the cookbox 102 can be between 2.0 and 4.0 inches. Satisfaction of the above-described range of the distance 1504 at which each of the burner tubes is vertically positioned below the upper rim 132 of the cookbox 102 advantageously improves the operating efficiency of the cooking engine of the grill 100, and also improves the heat distribution properties associated with the griddle 104 of the grill 100. In this regard, satisfaction of the above-described range of the distance 1504 at which each of the burner tubes is vertically positioned below the upper rim 132 of the cookbox 102 advantageously assists in minimizing any temperature variation across the flat top cooking surface 504 of the griddle 104 during cooking operations performed thereon.

In the illustrated example of FIGS. 12-17, each of the burner tubes (e.g., the first burner tube 202, the second burner tube 204, and the third burner tube 206) is vertically positioned below the underside 602 of the griddle 104 by an example distance 1506 of approximately 3.8 inches measured vertically from the underside 602 of the griddle 104 to the central axis 708 of the respective burner tube. In other examples, the distance 1506 at which each of the burner tubes is vertically positioned below the underside 602 of the griddle 104 can be between 3.0 and 5.0 inches. Satisfaction of the above-described range of the distance 1506 at which each of the burner tubes is vertically positioned below the underside 602 of the griddle 104 advantageously improves the operating efficiency of the cooking engine of the grill 100, and also improves the heat distribution properties associated with the griddle 104 of the grill 100. In this regard, satisfaction of the above-described range of the distance 1506 at which each of the burner tubes is vertically positioned below the underside 602 of the griddle 104 advantageously assists in minimizing any temperature variation across the flat top cooking surface 504 of the griddle 104 during cooking operations performed thereon.

In the illustrated example of FIGS. 12-17, the third row of ports 714 formed on the outer wall 706 of each of the burner tubes (e.g., the first burner tube 202, the second burner tube 204, and the third burner tube 206) is positioned inwardly from the front wall 304 of the cookbox 102 by an example distance 1602 of approximately 3.0 inches measured depth-wise (e.g., along the central axis 708 of the respective burner tube) from the front wall 304 of the cookbox 102 to the third row of ports 714 of the respective burner tube. In other examples, the distance 1602 at which the third row of ports 714 of the respective burner tube is positioned inwardly from the front wall 304 of the cookbox 102 can be between 1.0 and 6.0 inches. Satisfaction of the above-described range of the distance 1602 at which the third row of ports 714 of the respective burner tube is positioned inwardly from the front wall 304 of the cookbox 102 advantageously improves the operating efficiency of the cooking engine of the grill 100, and also improves the heat distribution properties associated with the griddle 104 of the grill 100. In this regard, satisfaction of the above-described range of the distance 1602 at which the third row of ports 714 of the respective burner tube is positioned inwardly from the front wall 304 of the cookbox 102 advantageously assists in minimizing any temperature variation across the flat top cooking surface 504 of the griddle 104 during cooking operations performed thereon.

In the illustrated example of FIGS. 12-17, the fourth row of ports 716 formed on the outer wall 706 of each of the burner tubes (e.g., the first burner tube 202, the second burner tube 204, and the third burner tube 206) is positioned inwardly from the rear wall 306 of the cookbox 102 by an example distance 1604 of approximately 2.0 inches measured depthwise (e.g., along the central axis 708 of the respective burner tube) from the rear wall 306 of the cookbox 102 to the fourth row of ports 716 of the respective burner tube. In other examples, the distance 1604 at which the fourth row of ports 716 of the respective burner tube is positioned inwardly from the rear wall 306 of the cookbox 102 can be between 1.0 and 6.0 inches. Satisfaction of the above-described range of the distance 1604 at which the fourth row of ports 716 of the respective burner tube is positioned inwardly from the rear wall 306 of the cookbox 102 advantageously improves the operating efficiency of the cooking engine of the grill 100, and also improves the heat distribution properties associated with the griddle 104 of the grill 100. In this regard, satisfaction of the above-described range of the distance 1604 at which the fourth row of ports 716 of the respective burner tube is positioned inwardly from the rear wall 306 of the cookbox 102 advantageously assists in minimizing any temperature variation across the flat top cooking surface 504 of the griddle 104 during cooking operations performed thereon.

In the illustrated example of FIGS. 12-17, the third row of ports 714 formed on the outer wall 706 of each of the burner tubes (e.g., the first burner tube 202, the second burner tube 204, and the third burner tube 206) is positioned inwardly from the front lip 506 of the griddle 104 by an example distance 1606 of approximately 3.5 inches measured depthwise (e.g., along the central axis 708 of the respective burner tube) from the front lip 506 of the griddle 104 to the third row of ports 714 of the respective burner tube. In other examples, the distance 1606 at which the third row of ports 714 of the respective burner tube is positioned inwardly from the front lip 506 of the griddle 104 can be between 1.0 and 6.0 inches. Satisfaction of the above-described range of the distance 1606 at which the third row of ports 714 of the respective burner tube is positioned inwardly from the front lip 506 of the griddle 104 advantageously improves the operating efficiency of the cooking engine of the grill 100, and also improves the heat distribution properties associated with the griddle 104 of the grill 100. In this regard, satisfaction of the above-described range of the distance 1606 at which the third row of ports 714 of the respective burner tube is positioned inwardly from the front lip 506 of the griddle 104 advantageously assists in minimizing any temperature variation across the flat top cooking surface 504 of the griddle 104 during cooking operations performed thereon.

In the illustrated example of FIGS. 12-17, the fourth row of ports 716 formed on the outer wall 706 of each of the burner tubes (e.g., the first burner tube 202, the second burner tube 204, and the third burner tube 206) is positioned inwardly from the rear lip 508 of the griddle 104 by an example distance 1608 of approximately 3.1 inches measured depthwise (e.g., along the central axis 708 of the respective burner tube) from the rear lip 508 of the griddle 104 to the fourth row of ports 716 of the respective burner tube. In other examples, the distance 1608 at which the fourth row of ports 716 of the respective burner tube is positioned inwardly from the rear lip 508 of the griddle 104 can be between 1.0 and 6.0 inches. Satisfaction of the above-described range of the distance 1608 at which the fourth row of ports 716 of the respective burner tube is positioned inwardly from the rear lip 508 of the griddle 104 advantageously improves the operating efficiency of the cooking engine of the grill 100, and also improves the heat distribution properties associated with the griddle 104 of the grill 100. In this regard, satisfaction of the above-described range of the distance 1608 at which the fourth row of ports 716 of the respective burner tube is positioned inwardly from the rear lip 508 of the griddle 104 of the cookbox 102 advantageously assists in minimizing any temperature variation across the flat top cooking surface 504 of the griddle 104 during cooking operations performed thereon.

The grill 100 of FIGS. 1-17 is configured for optimum efficiency and optimum heat distribution during cooking operations performed on the flat top cooking surface 504 of the griddle 104. More specifically, the grill 100 is configured to minimize any temperature variation across the flat top cooking surface 504 of the griddle 104 during cooking operations performed thereon. As shown in FIG. 14, the flat top cooking surface 504 of the griddle 104 includes an example central portion 1402 that is bounded and/or circumscribed by an example peripheral portion 1404. In the illustrated example, the peripheral portion 1404 of the flat top cooking surface 504 extends approximately three inches inwardly from each of the four surrounding lips of the griddle 104 (e.g., the front lip 506, the rear lip 508, the right side lip 510, and the left side lip 512). The grill 100 of FIGS. 1-17 is configured such that the average temperature within the central portion 1402 of the flat top cooking surface 504 of the griddle 104 is approximately 375 degrees Fahrenheit (375° F.) when the burner tubes (e.g., the first burner tube 202, the second burner tube 204, and the third burner tube 206) of the grill 100 are adjusted to a LOW output setting, approximately 420 degrees Fahrenheit (420° F.) when the burner tubes of the grill 100 are adjusted to a MEDIUM output setting, and approximately 560 degrees Fahrenheit (560° F.) when the burner tubes of the grill 100 are adjusted to a HI output setting. As a result of implementing the innovative heat distribution features described above, the grill 100 of FIGS. 1-17 is advantageously configured such that the average temperature variation between the central portion 1402 and the peripheral portion 1404 of the flat top cooking surface 504 of the griddle 104 is approximately 60 degrees Fahrenheit (60° F.) or less when the burner tubes of the grill 100 are adjusted to a LOW output setting, approximately 90 degrees Fahrenheit (90° F.) or less when the burner tubes of the grill 100 are adjusted to a MEDIUM output setting, and approximately 140 degrees Fahrenheit (140° F.) or less when the burner tubes of the grill 100 are adjusted to a HI output setting. The above-described temperature variations are substantially less than those found in many commercially available flat top gas grills, some of which produce flat top cooking surface temperature variations exceeding two hundred degrees Fahrenheit (200° F.) when the burner tubes of the flat top gas grill are adjusted to a common output setting.

Figure 18:
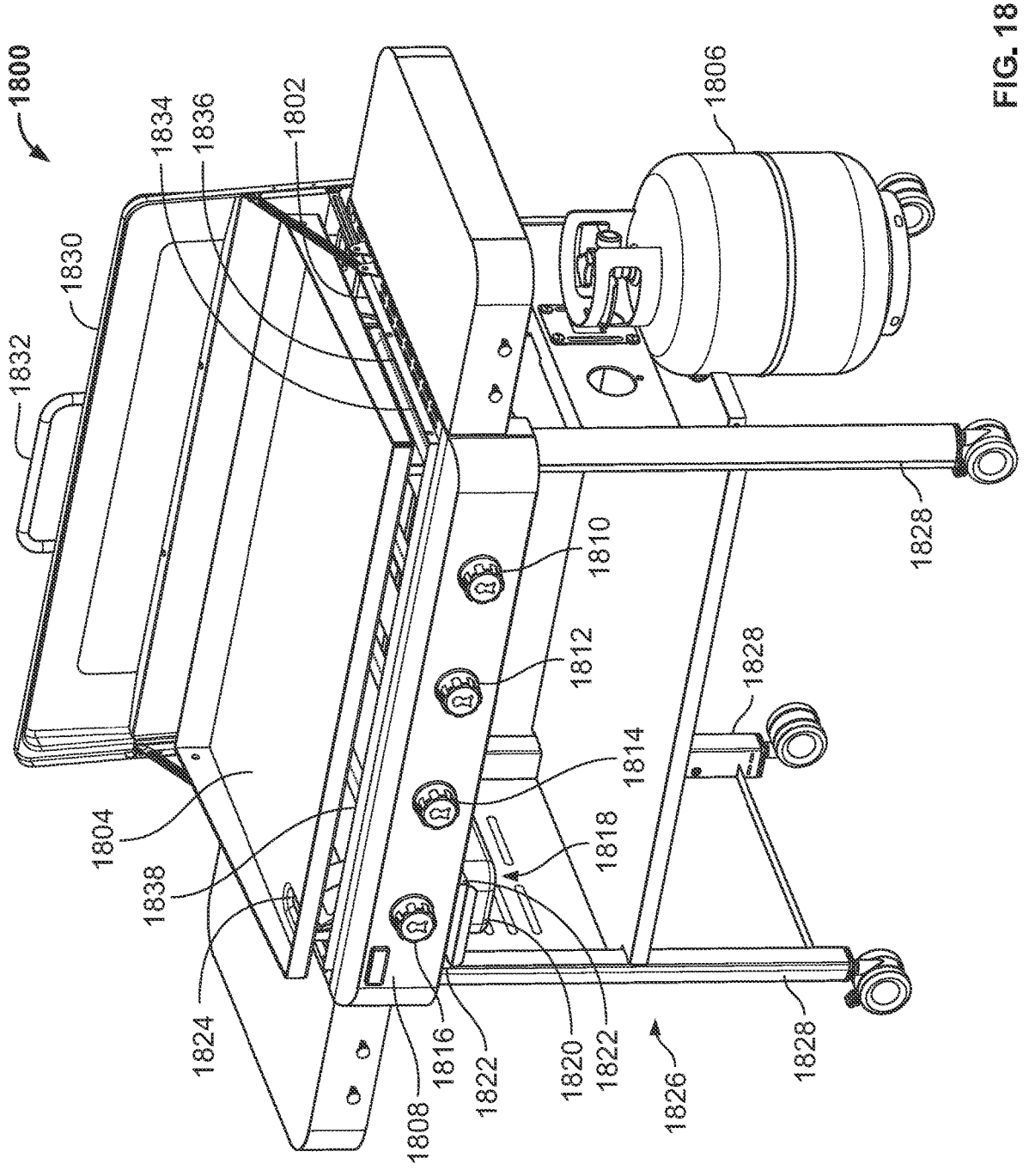
FIG. 18 is a perspective view of another example grill constructed in accordance with the teachings of this disclosure.
Figure 19:
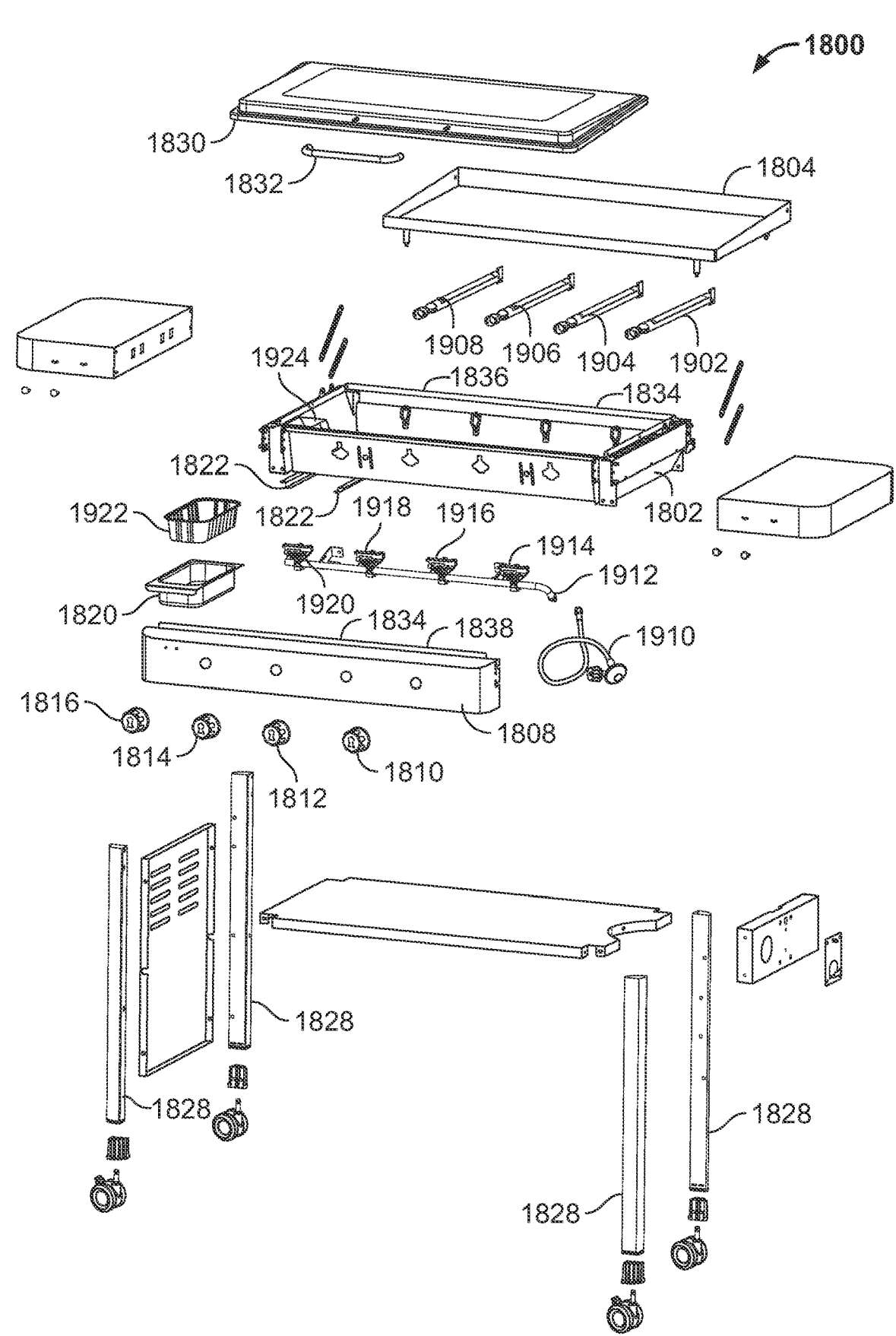
FIG. 19 is an exploded view of the grill of FIG. 18.

FIG. 18 is a perspective view of another example grill 1800 constructed in accordance with the teachings of this disclosure. FIG. 19 is an exploded view of the grill 1800 of FIG. 18. The grill 1800 of FIGS. 18 and 19 is structured as a flat top gas grill. In this regard, the grill 1800 of FIGS. 18 and 19 includes an example cookbox 1802 and an example griddle 1804. The griddle 1804 of the grill 1800 is configured to be disposed on or above the cookbox 1802 of the grill 1800. The cookbox 1802 of the grill 1800 is further described below in connection with FIGS. 20 and 21. The griddle 1804 of the grill 1800 is further described below in connection with FIGS. 22 and 23.

The grill 1800 of FIGS. 18 and 19 further includes a plurality of burner tubes configured to be disposed within the cookbox 1802 at a location between a bottom wall of the cookbox 1802 and an upper rim defined by or associated with the cookbox 1802, and/or at a location between the bottom wall of the cookbox 1802 and an underside of the griddle 1804. As shown in FIG. 19, the plurality of burner tubes includes an example first burner tube 1902, an example second burner tube 1904, an example third burner tube 1906, and an example fourth burner tube 1908 (e.g., a total of four burner tubes) that are configured to be laterally spaced apart from one another and arranged in a front-to-rear orientation within the cookbox 1802, with the first burner tube 1902, the second burner tube 1904, the third burner tube 1906, and the fourth burner tube 1908 being of a substantially identical construction relative to one another. In other examples, the plurality of burner tubes can instead include a different number (e.g., two, three, five, etc.) of burner tubes, and the construction of one or more of the burner tubes may differ from that of the first burner tube 1902, the second burner tube 1904, the third burner tube 1906, and/or the fourth burner tube 1908 shown in FIG. 19. The first burner tube 1902 of the grill 1800 is further described below in connection with FIGS. 24-28.

In the illustrated example of FIGS. 18 and 19, the burner tubes (e.g., the first burner tube 1902, the second burner tube 1904, the third burner tube 1906, and the fourth burner tube 1908) form part of a gas train that further includes an example fuel source 1806, an example regulator assembly 1910, an example manifold 1912, and a plurality of control valves corresponding in number to the plurality of burner tubes. In this regard, the plurality of control valves of the grill 1800 as shown in FIG. 19 includes an example first control valve 1914 associated with the first burner tube 1902, an example second control valve 1916 associated with the second burner tube 1904, an example third control valve 1918 associated with the third burner tube 1906, and an example fourth control valve 1920 associated with the fourth burner tube 1908.

In the illustrated example of FIG. 18, the fuel source 1806 is implemented as a fuel tank (e.g., a propane tank) containing combustible gas. In other examples, the fuel source 1806 can instead be implemented as a piped (e.g., household) natural gas line that provides an accessible flow of combustible gas. The regulator assembly 1910 is operatively positioned between the fuel source 1806 and the manifold 1912 such that a supply of combustible gas provided via the fuel source 1806 flows through the regulator assembly 1910 and into the manifold 1912. The first control valve 1914 is operatively positioned between the manifold 1912 and the first burner tube 1902 such that combustible gas received at the manifold 1912 can be selectively supplied to the first burner tube 1902 via the first control valve 1914. The second control valve 1916 is operatively positioned between the manifold 1912 and the second burner tube 1904 such that combustible gas received at the manifold 1912 can be selectively supplied to the second burner tube 1904 via the second control valve 1916. The third control valve 1918 is operatively positioned between the manifold 1912 and the third burner tube 1906 such that combustible gas received at the manifold 1912 can be selectively supplied to the third burner tube 1906 via the third control valve 1918. The fourth control valve 1920 is operatively positioned between the manifold 1912 and the third burner tube 1906 such that combustible gas received at the manifold 1912 can be selectively supplied to the third burner tube 1906 via the third control valve 1918.

In the illustrated example of FIGS. 18 and 19, the manifold 1912, the first control valve 1914, the second control valve 1916, the third control valve 1918, and the fourth control valve 1920 are at least partially covered and/or concealed by an example control panel 1808 that is coupled to and/or located along the front of the cookbox 1802. The grill 1800 further includes a plurality of control knobs mounted and/or located along the front face of the control panel 1808, with the plurality of control knobs corresponding in number to the plurality of control valves and/or the number of burner tubes. In this regard, the plurality of control valves of the grill 1800 as shown in FIGS. 18 and 19 includes an example first control knob 1810 associated with the first control valve 1914 and/or the first burner tube 1902, an example second control knob 1812 associated with the second control valve 1916 and/or the second burner tube 1904, an example third control knob 1814 associated with the third control valve 1918 and/or the third burner tube 1906, and an example fourth control knob 1816 associated with the fourth control valve 1920 and/or the fourth burner tube 1908. Each control knob is mechanically coupled to its corresponding control valve such that movement (e.g., rotation) of the control knob changes the extent to which an adjustable flow control member of the corresponding control valve enables combustible gas to flow through the corresponding control valve into the corresponding burner tube. For example, the first control knob 1810 is mechanically coupled to the first control valve 1914 such that movement (e.g., rotation) of the first control knob 1810 changes the extent to which an adjustable flow control member of the first control valve 1914 enables combustible gas to flow through the first control valve 1914 into the first burner tube 1902.

The grill 1800 of FIGS. 18 and 19 further includes an example waste collection assembly 1818 configured to collect and facilitate the removal of cooking waste. In the illustrated example of FIGS. 18 and 19, the waste collection assembly 1818 includes an example waste bin 1820 that is suspended from and slidably coupled to a pair of example support rails 1822, with the support rails 1822 being coupled to an underside of the cookbox 1802. The waste bin 1820 is moveable (e.g., slidable) along the support rails 1822 between a closed position in which a substantial portion of the waste bin 1820 is covered by the underside of the cookbox 1802 (e.g., as shown in FIG. 18), and a closed position in which a substantial portion of the waste bin 1820 is located forward of and not covered by the underside of the cookbox 1802. The waste bin 1820 is configured to hold and/or contain an example disposable liner 1922.

When the waste bin 1820 is in the closed position, the waste bin 1820 and/or the disposable liner 1922 is/are positioned below a lower waste disposal opening formed in and extending through a bottom wall of the cookbox 1802. The waste collection assembly 1818 further includes an example waste disposal chute 1924 disposed within the cookbox 1802, and an example upper waste disposal opening 1824 formed in and extending through the griddle 1804. The waste disposal chute 1924 is operatively positioned between the upper waste disposal opening 1824 and the lower waste disposal opening such that liquid and/or solid cooking waste (e.g., grease, residue, particles, and/or other byproducts associated with a cooking operation) located on a flat top cooking surface of the griddle 1804 can be fed into the upper waste disposal opening 1824, with the cooking waste thereafter passing from the upper waste disposal opening 1824 through the waste disposal chute 1924 and through the lower waste disposal opening. The waste bin 1820 and/or the disposable liner 1922 collect(s) cooking waste that passes though the waste disposal chute 1924 and the lower waste disposal opening when the waste bin 1820 is in the closed position. Moving the waste bin 1820 from the closed position into the open position facilitates removal of the disposable liner 1922 and/or the cooking waste contained therein.

The grill 1800 of FIGS. 18 and 19 further includes an example frame 1826. In the illustrated example of FIGS. 18 and 19, the frame 1826 includes one or more example cookbox support member(s) 1828 (e.g., one or more vertically oriented leg(s)) that are configured to support the cookbox 1802 above an underlying ground surface. The cookbox support member(s) 1828 and/or, more generally, the frame 1826 can be configured from any number and any type of structural components arranged in any manner that facilitates supporting the cookbox 1802 above an underlying ground surface when the grill 1800 is in use. For example, while each of the one or more cookbox support member(s) 1828 shown in FIGS. 18 and 19 is fixed relative to the cookbox 1802, in other examples the frame 1826 can include one or more foldable, slidable, and/or telescoping cookbox support member(s) 1828 that facilitate collapsing and/or otherwise modifying the frame 1826 of the grill 1800 when the grill 1800 is not in use. The grill 1800 of FIGS. 18 and 19 can further include one or more side table(s) coupled to the frame 1826 and/or to the cookbox 1802 of the grill 1800.

The grill 1800 of FIGS. 18 and 19 further includes an example lid 1830 configured to cover and/or enclose the griddle 1804 of the grill 1800 when the lid 1830 is in a closed position. The lid 1830 is movable relative to the griddle 1804 and/or the cookbox 1802 between a closed position and an open position in which the flat top cooking surface of the griddle 1804 is exposed (e.g., as shown in FIG. 18). In the illustrated example of FIGS. 18 and 19, the lid 1830 can be pivoted relative to the cookbox 1802, the griddle 1804, and/or the frame 1826 via one or more hinge(s) that mechanically couple the lid 1830 to the cookbox 1802 and/or the frame 1826. In other example, the lid 1830 can instead be removably positioned on the griddle 1804 and/or the cookbox 1802 without there being any direct mechanical coupling between the lid 1830 on the one hand and the cookbox 1802, the griddle 1804, and/or the frame 1826 on the other hand. Movement of the lid 1830 of the grill 1800 between the closed position and the open position can be facilitated via user interaction with an example handle 1832 that is coupled to the lid 1830.

Figure 20:
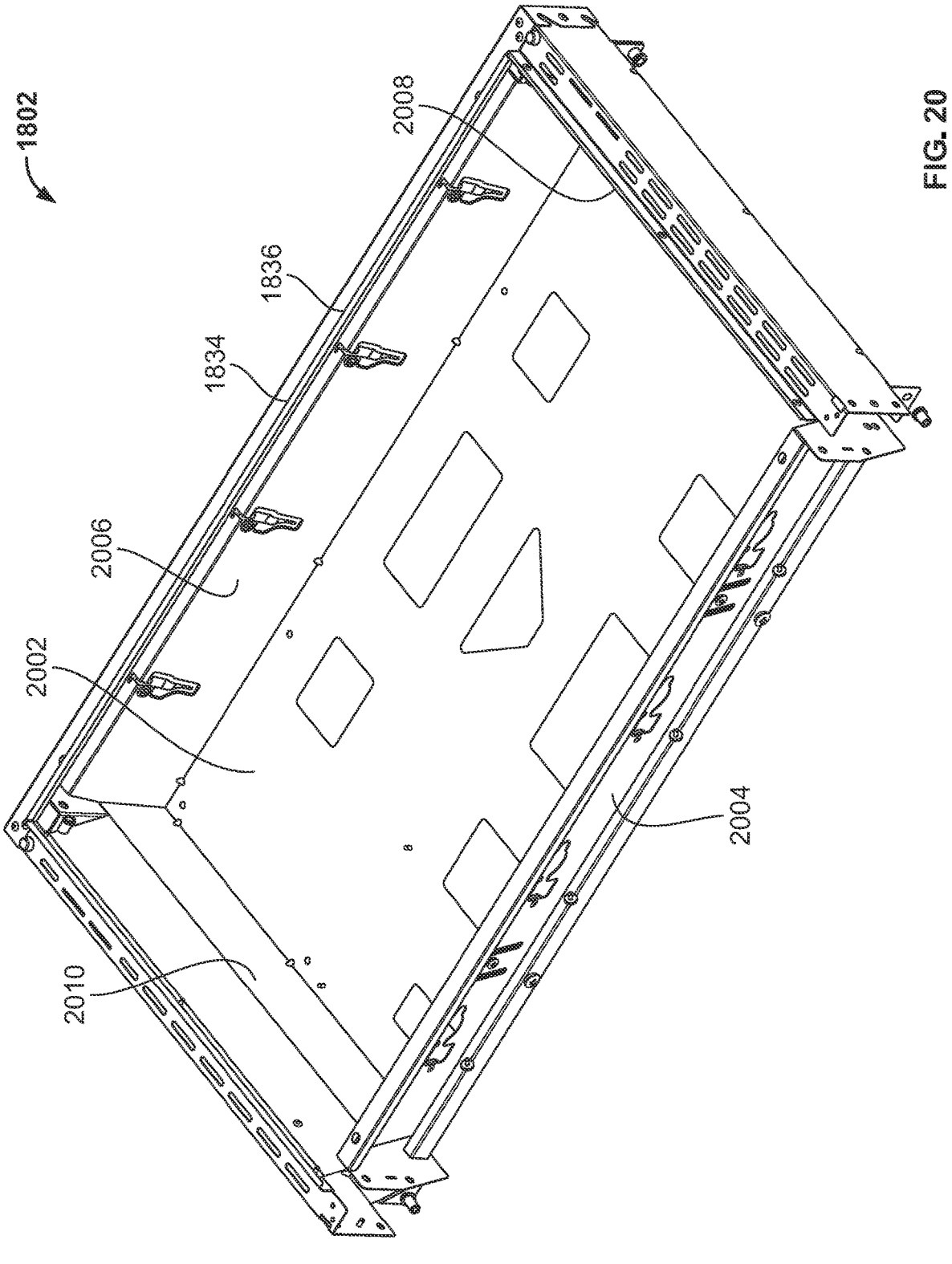
FIG. 20 is a perspective view showing the cookbox of the grill of FIGS. 18 and 19 in isolation.
Figure 21:
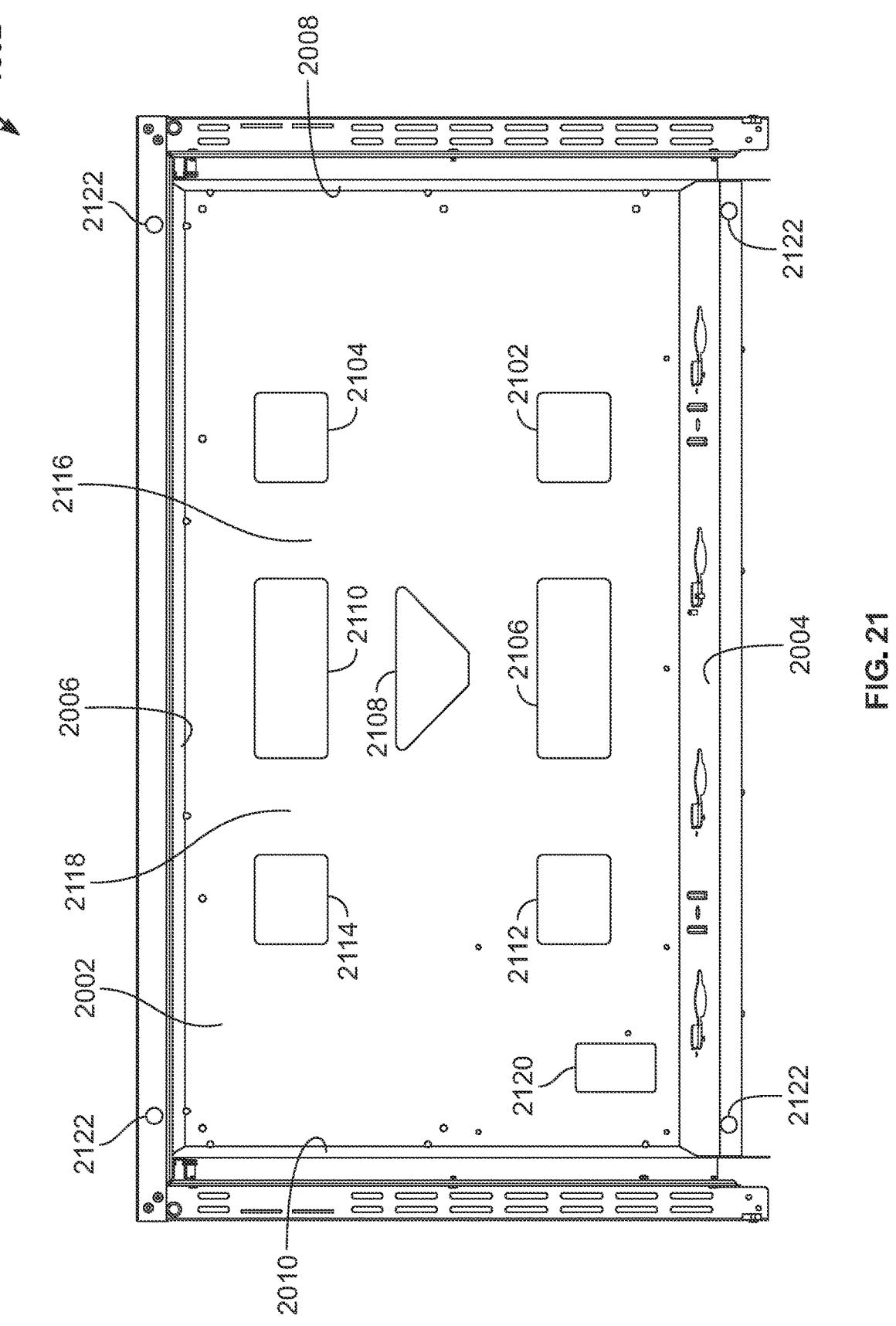
FIG. 21 is a top view of the cookbox of FIG. 20.

FIG. 20 is a perspective view showing the cookbox 1802 of the grill 1800 of FIGS. 18 and 19 in isolation. FIG. 21 is a top view of the cookbox 1802 of FIG. 20. As shown in FIGS. 20 and 21, the cookbox 1802 includes an example bottom wall 2002, an example front wall 2004, an example rear wall 2006, an example right sidewall 2008, and an example left sidewall 2010. The rear wall 2006 of the cookbox 1802 is located opposite the front wall 2004 of the cookbox 1802. The right sidewall 2008 of the cookbox 1802 extends between the front wall 2004 and the rear wall 2006 of the cookbox 1802. The left sidewall 2010 of the cookbox 1802 is located opposite the right sidewall 2008 of the cookbox 1802 and extends between the front wall 2004 and the rear wall 2006 of the cookbox 1802. As shown in FIGS. 20 and 21, the front wall 2004, the rear wall 2006, the right sidewall 2008, and the left sidewall 2010 of the cookbox 1802 extend upwardly from the bottom wall 2002 of the cookbox 1802 to define a cavity in which one or more structural component(s) (e.g., the first burner tube 1902, the second burner tube 1904, the third burner tube 1906, and the fourth burner tube 1908) of the grill 1800 can be disposed.

The cookbox 1802 further includes a plurality of air intake openings formed in and extending through the bottom wall 2002 of the cookbox 1802. The air intake openings are individually and collectively configured to draw air from the surrounding atmosphere into the cookbox 1802. As shown in FIGS. 20 and 21, the plurality of air intake openings includes an example first air intake opening 2102, an example second air intake opening 2104, an example third air intake opening 2106, an example fourth air intake opening 2108, an example fifth air intake opening 2110, an example sixth air intake opening 2112, and an example seventh air intake opening 2114. The first air intake opening 2102 and the second air intake opening 2104 are collectively laterally spaced apart from the third air intake opening 2016, the fourth air intake opening 2108, and the fifth air intake opening 2110. The third air intake opening 2106, the fourth air intake opening 2108, and the fifth air intake opening 2110 are collectively laterally spaced apart from the sixth air intake opening 2112 and the seventh air intake opening 2114. In this regard, the bottom wall 2002 of the cookbox 1802 further includes an example first solid portion 2116 and an example second solid portion 2118 that are laterally spaced apart from one another, and that respectively extend between the front wall 2004 and the rear wall 2006 of the cookbox 1802. The first solid portion 2116 further extends between the first air intake opening 2102 and the second air intake opening 2104 on the one hand, and the third air intake opening 2106, the fourth air intake opening 2108, and the fifth air intake opening 2110 on the other hand. The second solid portion 2118 further extends between the third air intake opening 2106, the fourth air intake opening 2108, and the fifth air intake opening 2110 on the one hand, and the sixth air intake opening 2112 and the seventh air intake opening 2114 on the other hand. In the illustrated example of FIGS. 20 and 21, the first solid portion 2116 and the second solid portion 2118 are free of any unplugged and/or uncovered opening(s) that extend through the bottom wall 2002.

The first air intake opening 2102, the second air intake opening 2104, the third air intake opening 2106, the fourth air intake opening 2108, the fifth air intake opening 2110, and the first solid portion 2116 of the bottom wall 2002 of the cookbox 1802 are individually and collectively configured such that a burner tube (e.g., the second burner tube 1904) of the grill 1800 is laterally aligned with the first solid portion 2116, and such that said burner tube (e.g., the second burner tube 1904) is laterally positioned between the first air intake opening 2102 and the second air intake opening 2104 on the one hand and the third air intake opening 2106, the fourth air intake opening 2108, and the fifth air intake opening 2110 on the other hand. The first air intake opening 2102, the second air intake opening 2104, the third air intake opening 2106, the fourth air intake opening 2108, the fifth air intake opening 2110, and the first solid portion 2116 of the bottom wall 2002 of the cookbox 1802 are further individually and collectively configured such that the first air intake opening 2102 and the second air intake opening 2104 are laterally positioned between one set of neighboring burner tubes (e.g., the first burner tube 1902 and the second burner tube 1904) of the grill 1800, and such that the third air intake opening 2106, the fourth air intake opening 2108, and the fifth air intake opening 2110 are laterally positioned between another set of neighboring burner tubes (e.g., the second burner tube 1904 and the third burner tube 1906) of the grill 1800.

The third air intake opening, 2106, fourth air intake opening 2108, the fifth air intake opening 2110, the sixth air intake opening 2112, the seventh air intake opening 2114, and the second solid portion 2118 of the bottom wall 2002 of the cookbox 1802 are individually and collectively configured such that a burner tube (e.g., the third burner tube 1906) of the grill 1800 is laterally aligned with the second solid portion 2118, and such that said burner tube (e.g., the third burner tube 1906) is laterally positioned between the third air intake opening 2106, the fourth air intake opening 2108, and the fifth air intake opening 2110 on the one hand and the sixth air intake opening 2112 and the seventh air intake opening 2114 on the other hand. The third air intake opening 2106, the fourth air intake opening 2108, the fifth air intake opening 2110, the sixth air intake opening 2112, the seventh air intake opening 2114, and the second solid portion 2118 of the bottom wall 2002 of the cookbox 1802 are further individually and collectively configured such that the third air intake opening 2106, the fourth air intake opening 2108, and the fifth air intake opening 2110 are laterally positioned between one set of neighboring burner tubes (e.g., the second burner tube 1904 and the third burner tube 1906) of the grill 1800, and such that the sixth air intake opening 2112 and the seventh air intake opening 2114 are laterally positioned between another set of neighboring burner tubes (e.g., the third burner tube 1906 and the fourth burner tube 1908) of the grill 1800.

As shown in FIGS. 20 and 21, the first air intake opening 2102 and the second air intake opening 2104 formed in the bottom wall 2002 of the cookbox 1802 are spaced apart from one another along a depthwise direction (e.g., front-to-rear) of the cookbox 1802. The first air intake opening 2102 and the second air intake opening 2104 are generally aligned with one another along the depthwise direction, thereby forming a first depthwise row of air intake openings. The third air intake opening 2106, the fourth air intake opening 2108, and the fifth air intake opening 2110 formed in the bottom wall 2002 of the cookbox 1802 are spaced apart from one another along a depthwise direction (e.g., front-to-rear) of the cookbox 1802. The third air intake opening 2106, the fourth air intake opening 2108, and the fifth air intake opening 2110 are generally aligned with one another along the depthwise direction, thereby forming a second depthwise row of air intake openings that is laterally spaced apart from the first depthwise row of air intake openings. The sixth air intake opening 2112 and the seventh air intake opening 2114 formed in the bottom wall 2002 of the cookbox 1802 are spaced apart from one another along a depthwise direction (e.g., front-to-rear) of the cookbox 1802. The sixth air intake opening 2112 and the seventh air intake opening 2114 are generally aligned with one another along the depthwise direction, thereby forming a third depthwise row of air intake openings that is laterally spaced apart from both the second depthwise row of air intake openings and the first depth row of air intake openings.

In the illustrated example of FIGS. 20 and 21, the plurality of air intake openings includes a total of seven air intake openings (e.g., the first air intake opening 2102, the second air intake opening 2104, the third air intake opening 2106, the fourth air intake opening 2108, the fifth air intake opening 2110, the sixth air intake opening 2112, and the seventh air intake opening 2114). In other examples, the plurality of air intake openings can instead include a different number (e.g., two, three, four, five, six, eight, nine, etc.) of air intake openings. In the illustrated example of FIGS. 20 and 21, the first air intake opening 2102, the second air intake opening 2104, the third air intake opening 2106, the fifth air intake opening 2110, the sixth air intake opening 2112, and the seventh air intake opening 2114 each have a generally rectangular shape, and the fourth air intake opening 2108 has a generally trapezoidal shape. In other examples, the first air intake opening 2102, the second air intake opening 2104, the third air intake opening 2106, the fourth air intake opening 2108, the fifth air intake opening 2110, the sixth air intake opening 2112, and/or the seventh air intake opening 2114 can instead have a different shape (e.g., a circular shape, an oval shape, a triangular shape, etc.).

In addition to the air intake openings illustrated in FIGS. 20 and 21, the cookbox 1802 further includes an example lower waste disposal opening 2120 formed in and extending through the bottom wall 2002 of the cookbox 1802. The lower waste disposal opening 2120 is configured to receive and/or to otherwise be in alignment with a lower portion of the waste disposal chute 1924 of the waste collection assembly 1818 of the grill 1800. Unlike the air intake openings described above, the lower waste disposal opening 2120 is not configured to draw air from the surrounding atmosphere into the cookbox 1802, but is instead configured to transport cooking waste passing through the waste disposal chute 1924 into the disposable liner 1922 and/or the waste bin 1820 of the waste collection assembly 1818 of the grill 1800, as further described above.

In the illustrated example of FIGS. 20 and 21, the bottom wall 2002 of the cookbox 1802 has a width (e.g., measured between the right sidewall 2008 and the left sidewall 2010) of approximately 33.0 inches, a depth (e.g., measured between the front wall 2004 and the rear wall 2006) of approximately 17.1 inches, and an associated total area (e.g., calculated as width multiplied by depth) of approximately 564.3 square inches. The first air intake opening 2102 formed in the bottom wall 2002 has an area of approximately 7.8 square inches. The second air intake opening 2104 formed in the bottom wall 2002 has an area of approximately 7.8 square inches. The third air intake opening 2106 formed in the bottom wall 2002 has an area of approximately 15.5 square inches. The fourth air intake opening 2108 formed in the bottom wall 2002 has an area of approximately 9.1 square inches. The fifth air intake opening 2110 formed in the bottom wall 2002 has an area of approximately 15.5 square inches. The sixth air intake opening 2112 formed in the bottom wall 2002 has an area of approximately 7.8 square inches. The seventh air intake opening 2114 formed in the bottom wall 2002 has an area of approximately 7.8 square inches. Thus, the first air intake opening 2102, the second air intake opening 2104, the third air intake opening 2106, the fourth air intake opening 2108, the fifth air intake opening 2110, the sixth air intake opening 2112, and the seventh air intake opening 2114 collectively define an unoccupied area of 71.3 square inches. In the illustrated example of FIGS. 20 and 21, the unoccupied area defined by the air intake openings accounts for approximately 12.6 percent of the total area of the bottom wall 2002. In other examples, the unoccupied area defined by the air intake openings can account for between 10.0 and 30.0 percent of the total area of the bottom wall 2002. Satisfaction of the above-described range of the ratio of unoccupied area defined by the air intake openings to the total area of the bottom wall 2002 advantageously improves the operating efficiency of the cooking engine of the grill 1800, and also improves the heat distribution properties associated with the griddle 1804 of the grill 1800. In this regard, satisfaction of the above-described range of the ratio of unoccupied area defined by the air intake openings to the total area of the bottom wall 2002 advantageously assists in minimizing any temperature variation across the flat top cooking surface of the griddle 1804 during cooking operations performed thereon.

As shown in FIGS. 18-21, the grill 1800 further includes an example upper rim 1834 defined by or associated with the cookbox 1802. In some examples, one or more portion(s) of the upper rim 1834 of the grill 1800 is/are formed by one or more portion(s) of the front wall 2004, the rear wall 2006, the right sidewall 2008, and/or the left sidewall 2010 of the cookbox 1802. In some examples, one or more portion(s) of the upper rim 1834 of the grill 1800 is/are additionally or alternatively formed by one or more portion(s) of the control panel 1808 and/or the frame 1826 of the grill 1800. For example, as shown in FIGS. 18-21, an example first portion 1836 of the upper rim 1834 (e.g., including a rear portion, a right side portion, and a left side portion of the upper rim 1834) is defined by the cookbox 1802 of the grill 1800, and an example second portion 1838 of the upper rim 1834 is defined by the control panel 1808 of the grill 1800. The cookbox 1802, the control panel 1808, and/or the frame 1826 of the grill 1800 include a plurality of example griddle docking openings 2122 that are configured to receive and/or to otherwise engage corresponding ones of a plurality of griddle support members of the griddle 1804. As further described below, the griddle docking openings 2122 and the griddle support members are configured to support the griddle 1804 of the grill 1800 on or above the cookbox 1802 of the grill 1800, and/or on or above the upper rim 1834 of the grill 1800.

Figure 22:
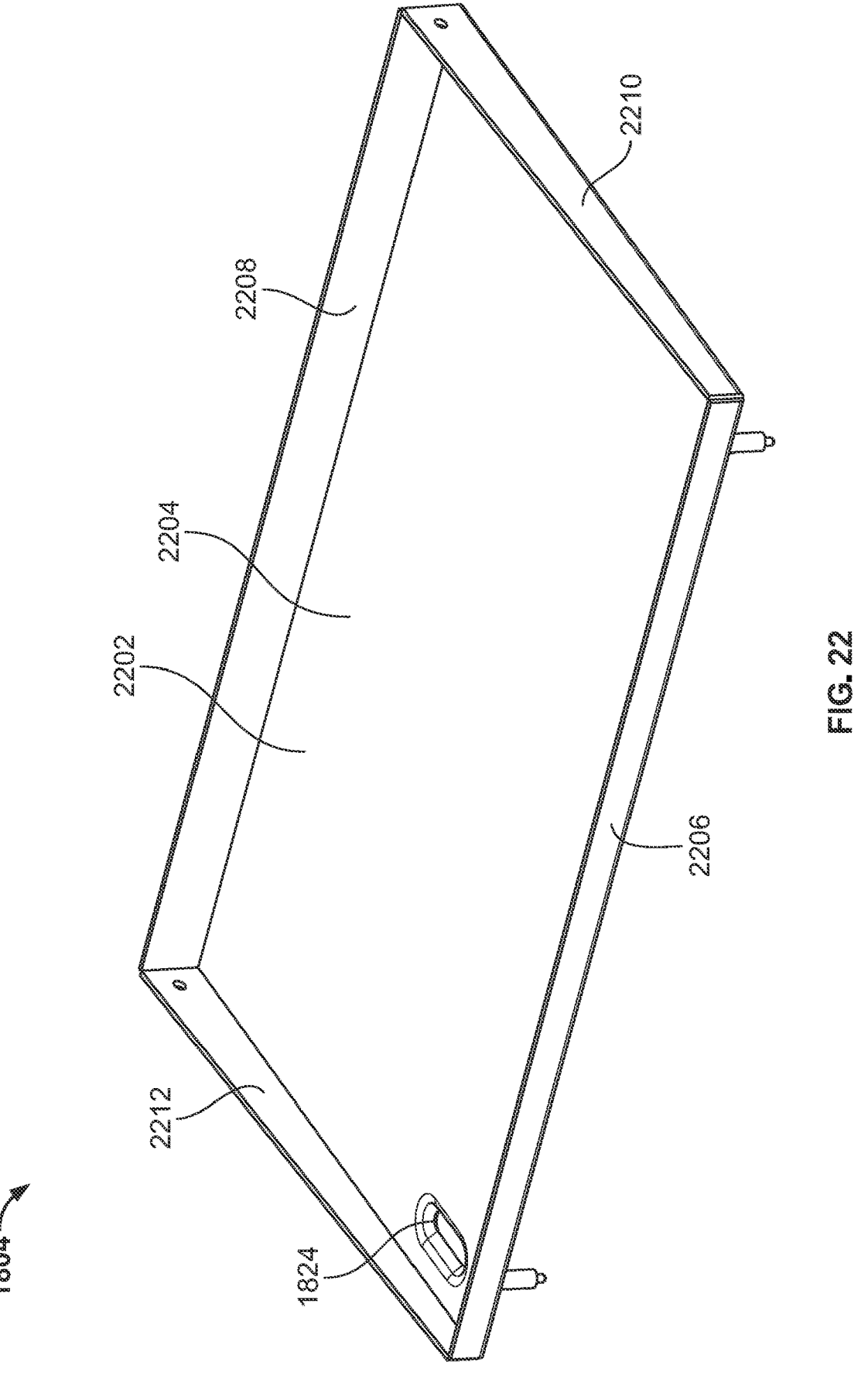
FIG. 22 is a first perspective view showing the griddle of the grill of FIGS. 18 and 19 in isolation.
Figure 23:
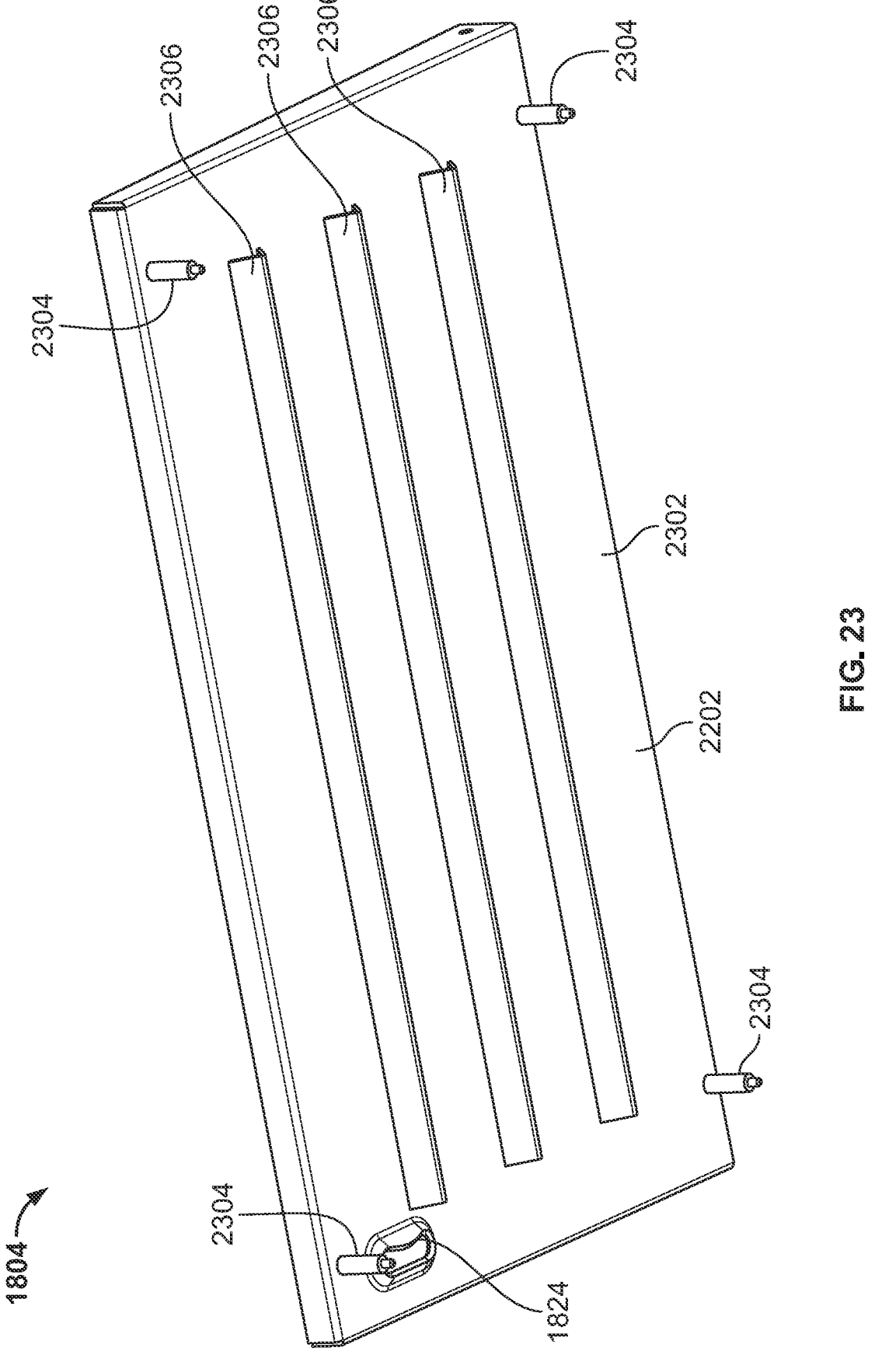
FIG. 23 is a second perspective view of the griddle of FIG. 22.

FIG. 22 is a first perspective view showing the griddle 1804 of the grill 1800 of FIGS. 18 and 19 in isolation. FIG. 23 is a second perspective view of the griddle 1804 of FIG. 22. As shown in FIGS. 22 and 23, the griddle 1804 includes an example base 2202. The base 2202 of the griddle 1804 includes an example flat top cooking surface 2204 and an example underside 2302 located opposite the flat top cooking surface 2204. In the illustrated example of FIGS. 22 and 23, the flat top cooking surface 2204 is a continuous, substantially flat and/or substantially planar surface that is free of openings aside from the upper waste disposal opening 1824 described herein. The flat top cooking surface 2204 is configured to support a variety of liquid, semi-liquid, and/or solid food items during a variety of cooking processes that may be performed on the griddle 1804. In the illustrated example of FIGS. 22 and 23, the flat top cooking surface 2204 and/or, more generally, the base 2202 of the griddle 1804 has a generally rectangular profile. In other examples, the flat top cooking surface 2204 and/or, more generally, the base 2202 of the griddle 1804 can instead have a non-rectangular profile (e.g., a circular profile, an oval profile, a triangular profile, a trapezoidal profile, etc.).

The griddle 1804 further includes an example front lip 2206, and an example rear lip 2208, an example right side lip 2210, and an example left side lip 2212. The rear lip 2208 of the griddle 1804 is located opposite the front lip 2206 of the griddle 1804. The right side lip 2210 of the griddle 1804 extends between the front lip 2206 and the rear lip 2208 of the griddle 1804. The left side lip 2212 of the griddle 1804 is located opposite the right side lip 2210 of the griddle 1804 and extends between the front lip 2206 and the rear lip 2208 of the griddle 1804. The front lip 2206, the rear lip 2208, the right side lip 2210, and the left side lip 2212 of the griddle 1804 extend upwardly from the base 2202 of the griddle 1804 to provide vertical boundaries configured to prevent food items from sliding off the flat top cooking surface 2204 of the griddle 1804 during one or more cooking operation(s) performed thereon.

As shown in FIGS. 22 and 23, the upper waste disposal opening 1824 formed in the base 2202 of the griddle 1804 extends completely through the base 2202 (e.g., from the flat top cooking surface 2204 of the base 2202 through to the underside 2302 of the base 2202). The upper waste disposal opening 1824 facilitates the removal and/or disposal of liquid and/or solid cooking waste (e.g., grease, residue, particles, and/or other byproducts associated with a cooking operation) located on the flat top cooking surface 2204 of the griddle 1804, as further described above. In the illustrated example of FIGS. 22 and 23, the upper waste disposal opening 1824 is located proximate the front left corner of the base 2202 of the griddle 1804 (e.g., near the junction of the front lip 2206 and the left side lip 2212 of the griddle 1804). In other examples, the upper waste disposal opening 1824 can instead be located proximate some other portion (e.g., the rear left corner, the front right corner, the rear right corner, etc.) of the base 2202 of the griddle 1804.

The griddle 1804 further includes a plurality of example griddle support members 2304 (e.g., vertically oriented posts) coupled to and extending downwardly from the underside 2302 of the base 2202 of the griddle 1804. The griddle support members 2304 are configured to support the underside 2302 and/or, more generally, the base 2202 of the griddle 1804 on or above the cookbox 1802 of the grill 1800, and/or on or above the upper rim 1834 of the grill 1800. In this regard, respective ones of the griddle support members 2304 of the griddle 1804 are configured to be received by and/or to otherwise engage corresponding ones of the griddle docking openings 2122 of the cookbox 1802 of the grill 1800. In the illustrated example of FIGS. 22 and 23, the griddle 1804 includes a total of four griddle support members 2304 configured to be received by and/or to otherwise engage a total of four griddle docking openings 2122. In other examples, the griddle 1804 can instead include a different number (e.g., two, three, five, six, etc.) of griddle support members 2304, and the cookbox 1802 can similarly include a corresponding different number (e.g., two, three, five, six, etc.) of griddle docking openings 2122.

The griddle 1804 further includes a plurality of example anti-warping braces 2306 coupled to and extending downwardly from the underside 2302 of the base 2202 of the griddle 1804. The anti-warping braces 2306 are configured to support, strengthen, and/or brace the underside 2302 and/or, more generally, the base 2202 of the griddle 1804 to limit and/or prevent any buckling and/or warping thereof. As shown in FIGS. 22 and 23, the anti-warping braces 2306 are arranged in a right-to-left orientation along the underside 2302 of the base 2202 of the griddle 1804. In other examples, the anti-warping braces 2306 can instead be arranged in a different orientation (e.g., a front-to-rear orientation, a diagonal orientation, etc.) along the underside 2302 of the base 2202 of the griddle 1804. In the illustrated example of FIGS. 22 and 23, the griddle 1804 includes a total of three anti-warping braces 2306. In other examples, the griddle 1804 can instead include a different number (e.g., one, two, four, etc.) of anti-warping braces 2306.

In the illustrated example of FIGS. 22 and 23, the flat top cooking surface 2204 and/or, more generally, the base 2202 of the griddle 1804 has a width (e.g., measured between the right side lip 2210 to the left side lip 2212) of approximately 36.0 inches, a depth (e.g., measured between the front lip 2206 and the rear lip 2208) of approximately 21.0 inches, and an associated total area (e.g., calculated as width multiplied by depth) of approximately 756.0 square inches. In other examples, the width, the depth, and/or the total area of the flat top cooking surface 2204 can differ from the above-described dimensions.

Figure 24:
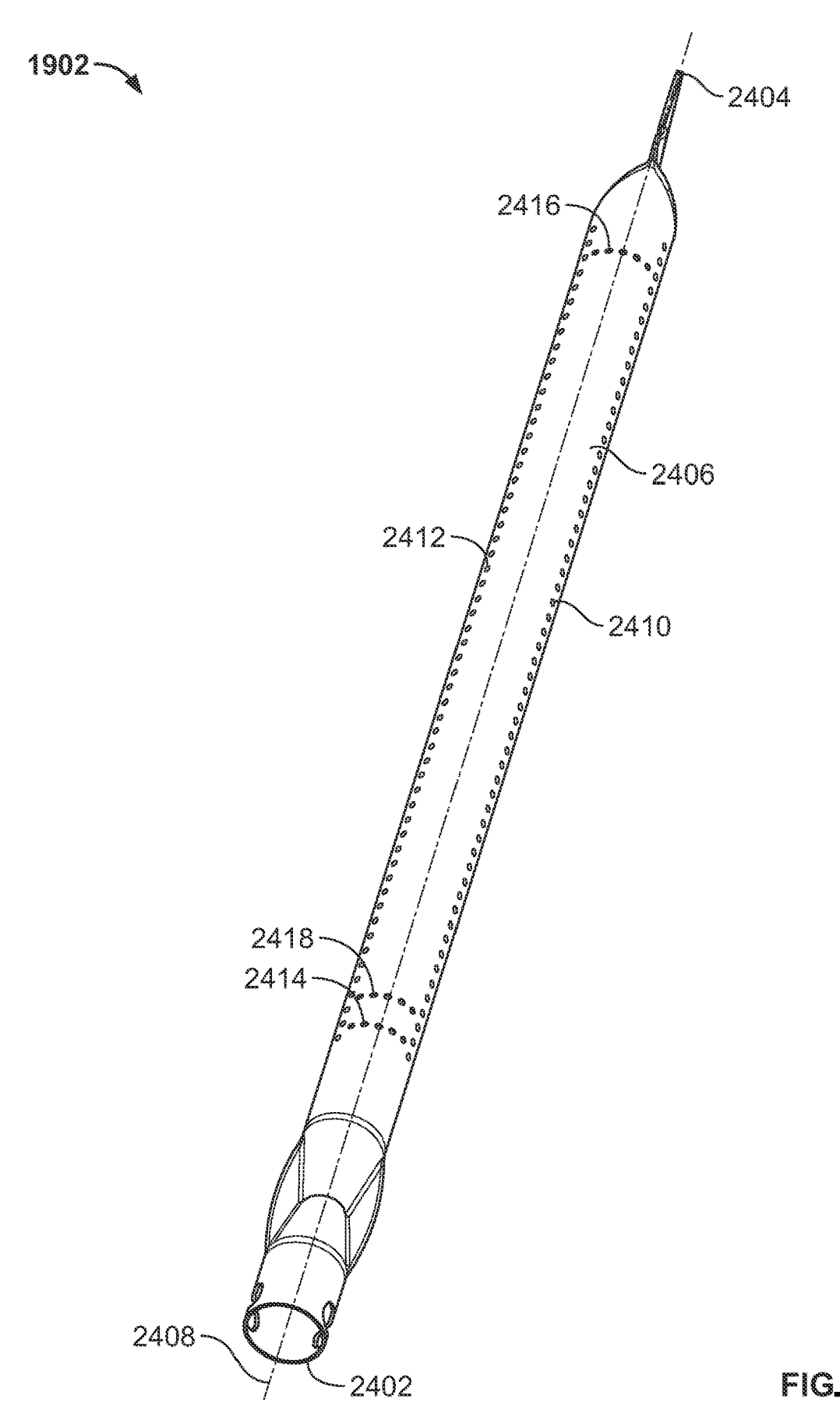
FIG. 24 is a perspective view showing the first burner tube of the grill of FIGS. 18 and 19 in isolation.
Figures 25, 26:
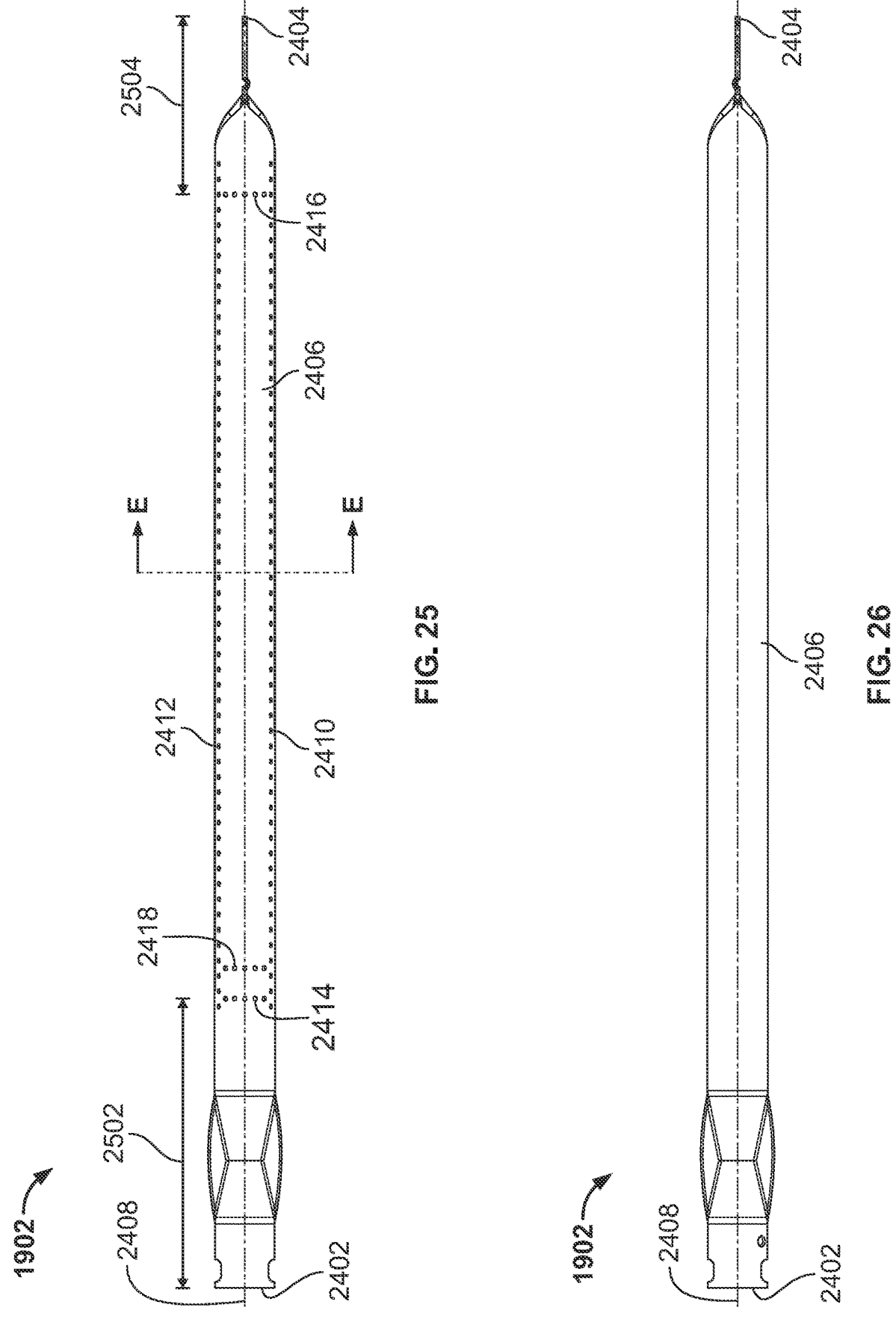
FIG. 25 is a top view of the first burner tube of FIG. 24.
FIG. 26 is a bottom view of the first burner tube of FIGS. 24 and 25.
Figures 27, 28:
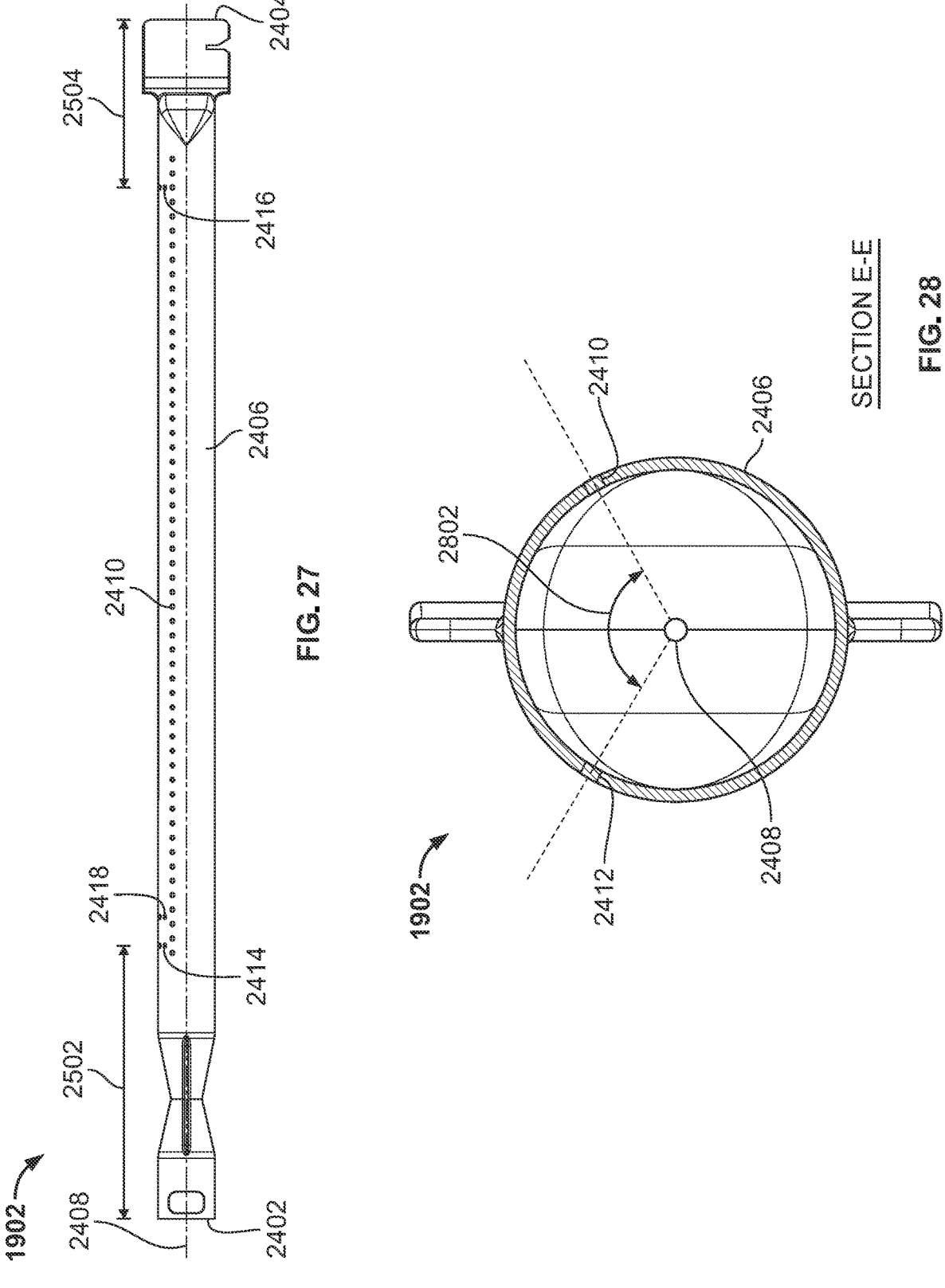
FIG. 27 is a right side view of the first burner tube of FIGS. 24-26.
FIG. 28 is a cross-sectional view of the first burner tube of FIGS. 24-27 taken along section E-E of FIG. 25.

FIG. 24 is a perspective view showing the first burner tube 1902 of the grill 1800 of FIGS. 18 and 19 in isolation. FIG. 25 is a top view of the first burner tube 1902 of FIG. 24. FIG. 26 is a bottom view of the first burner tube 1902 of FIGS. 24 and 25. FIG. 27 is a right side view of the first burner tube 1902 of FIGS. 24-26. FIG. 28 is a cross-sectional view of the first burner tube 1902 of FIGS. 24-27 taken along section E-E of FIG. 25. The construction of the second burner tube 1904, the third burner tube 1906, and the fourth burner tube 1908 of the grill 1800 of FIGS. 18 and 19 is substantially identical to that of the first burner tube 1902 as described herein in connection with FIGS. 24-28.

As shown in FIGS. 24-28, the first burner tube 1902 includes an example first end 2402 (e.g., a front end), an example second end 2404 (e.g., a rear end), an example outer wall 2406 extending between the first end 2402 and the second end 2404, and an example central axis 2408 extending between the first end 2402 and the second end 2404. The first end 2402 of the first burner tube 1902 is partially open, with the first end 2402 being configured to receive an outlet of a control valve (e.g., the outlet of the first control valve 1914) located proximate the front wall 2004 of the cookbox 1802. The second end 2404 of the first burner tube 1902 is closed, with the second end 2404 being configured to be coupled to a mounting flange located proximate the rear wall 2006 of the cookbox 1802. The first burner tube 1902 is accordingly configured to be arranged in a front-to-rear orientation when disposed in the cookbox 1802. In the illustrated example of FIGS. 24-28, the first burner tube 1902 is structured as a linear burner tube having a circular cross-sectional profile. In other example, the first burner tube 1902 can instead be structured as a linear burner tube having a different cross-sectional profile (e.g., a rectangular cross-sectional profile, an oval-shaped cross-sectional profile, a triangular cross-sectional profile, a trapezoidal cross-sectional profile, etc.). In still other examples, the first burner tube 1902 can instead be structured as a non-linear burner tube having one or more bend(s) and/or curve(s) formed therein.

The first burner tube 1902 of FIGS. 24-28 includes a plurality of ports formed in and extending through the outer wall 2406 of the first burner tube 1902. As shown in FIGS. 24-28, the plurality of ports includes an example first row of ports 2410, an example second row of ports 2412, an example third row of ports 2414, and an example fourth row of ports 2416. The first row of ports 2410 is arranged parallel to the central axis 2408. The second row of ports 2412 is also arranged parallel to the central axis 2408, with the second row of ports 2412 being spaced apart from (e.g., angularly displaced from) the first row of ports 2410 about the perimeter (e.g., about the circumference) of the outer wall 2406 of the first burner tube 1902. The third row of ports 2414 is arranged perpendicular to the central axis 2408. The fourth row of ports 2416 is also arranged perpendicular to the central axis 2408, with the fourth row of ports 2416 being spaced apart from (e.g., longitudinally displaced from) the third row of ports 2414 along central axis 2408 of the first burner tube 1902. In the illustrated example of FIGS. 24-28, the third row of ports 2414 is located proximate the first end 2402 (e.g., the front end) of the first burner tube 1902, and the fourth row of ports 2416 is located proximate the second end 2404 (e.g., the rear end) of the first burner tube 1902. The first burner tube 1902 can include additional ports and/or additional rows of ports relative to those described above. For example, as shown in FIGS. 24-28, the first burner tube 1902 further includes an example fifth row of ports 2418 arranged perpendicular to the central axis 2408, with the fifth row of ports 2418 being spaced apart from and proximate to the third row of ports 2414.

As shown in FIGS. 24-28, the outer wall 2406 of the first burner tube 1902 has a circular cross-sectional profile. The second row of ports 2412 is angularly displaced from the first row of ports 2410 about the circumference of the outer wall 2406 by an example angle 2802 measuring approximately 120.0 degrees. In other examples, the angle 2802 at which the second row of ports 2412 is angularly displaced from the first row of ports 2410 about the circumference of the outer wall 2406 can be between 90.0 and 150.0 degrees. Satisfaction of the above-described range of the angle 2802 at which the second row of ports 2412 is angularly displaced from the first row of ports 2410 about the circumference of the outer wall 2406 advantageously improves the operating efficiency of the cooking engine of the grill 180, and also improves the heat distribution properties associated with the griddle 1804 of the grill 1800. In this regard, satisfaction of the above-described range of the angle 2802 at which the second row of ports 2412 is angularly displaced from the first row of ports 2410 about the circumference of the outer wall 2406 advantageously assists in minimizing any temperature variation across the flat top cooking surface 2204 of the griddle 1804 during cooking operations performed thereon.

The first burner tube 1902 of FIGS. 24-28 is further configured such that the third row of ports 2414 of the first burner tube 1902 is spaced apart from the first end 2402 (e.g., the front end) of the first burner tube 1902 by an example distance 2502 of approximately 4.8 inches. In other examples, the distance 2502 between the third row of ports 2414 and the first end 2402 of the first burner tube 1902 can be between 1.0 and 6.0 inches. Satisfaction of the above-described range of the distance 2502 between the third row of ports 2414 and the first end 2402 of the first burner tube 1902 advantageously improves the operating efficiency of the cooking engine of the grill 1800, and also improves the heat distribution properties associated with the griddle 1804 of the grill 1800. In this regard, satisfaction of the above-described range of the distance 2502 between the third row of ports 2414 and the first end 2402 of the first burner tube 1902 advantageously assists in minimizing any temperature variation across the flat top cooking surface 2204 of the griddle 184 during cooking operations performed thereon.

The first burner tube 1902 of FIGS. 24-28 is further configured such that the fourth row of ports 2416 of the first burner tube 1902 is spaced apart from the second end 2404 (e.g., the rear end) of the first burner tube 1902 by an example distance 2504 of approximately 3.0 inches. In other examples, the distance 2504 between the fourth row of ports 2416 and the second end 2404 of the first burner tube 1902 can be between 1.0 and 6.0 inches. Satisfaction of the above-described range of the distance 2504 between the fourth row of ports 2416 and the second end 2404 of the first burner tube 1902 advantageously improves the operating efficiency of the cooking engine of the grill 1800, and also improves the heat distribution properties associated with the griddle 1804 of the grill 1800. In this regard, satisfaction of the above-described range of the distance 2504 between the fourth row of ports 2416 and the second end 2404 of the first burner tube 1902 advantageously assists in minimizing any temperature variation across the flat top cooking surface 2204 of the griddle 1804 during cooking operations performed thereon.

In the illustrated example of FIGS. 24-28, the first burner tube 1902 has a length of approximately 21.2 inches measured along the central axis 2408 from the first end 2402 (e.g., the front end) to the second end 2404 (e.g., the rear end) of the first burner tube 1902. In other examples, the first burner tube 1902 can instead have a length that is substantially greater than or substantially less than 21.2 inches. In the illustrated example of FIGS. 24-28, the outer wall 2406 of the first burner tube 1902 has a diameter of approximately 1.0 inches measured across the circular cross-sectional profile of the outer wall 2406. In other examples, the first burner tube 1902 can instead have a diameter that is substantially greater than or substantially less than 1.0 inches. In the illustrated example of FIGS. 24-28, each one of the ports from among the first row of ports 2410 and the second row of ports 2412 respectively formed in and extending through the outer wall 2406 of the first burner tube 1902 has a diameter of approximately 0.08 inches measured across the circular outlet opening of the port. In other examples, one or more of the ports from among the first row of ports 2410 and the second row of ports 2412 respectively formed in and extending through the outer wall 2406 of the first burner tube 1902 can instead have a diameter that is substantially greater than or substantially less than 0.08 inches. In the illustrated example of FIGS. 24-28, each one of the ports from among the third row of ports 2414, the fourth row of ports 2416, and the fifth row of ports 2418 respectively formed in and extending through the outer wall 2406 of the first burner tube 1902 has a diameter of approximately 0.07 inches measured across the circular outlet opening of the port. In other examples, one or more of the ports from among the third row of ports 2414, the fourth row of ports 2416, and the fifth row of ports 2418 respectively formed in and extending through the outer wall 2406 of the first burner tube 1902 can instead have a diameter that is substantially greater than or substantially less than 0.07 inches.

Figure 29:
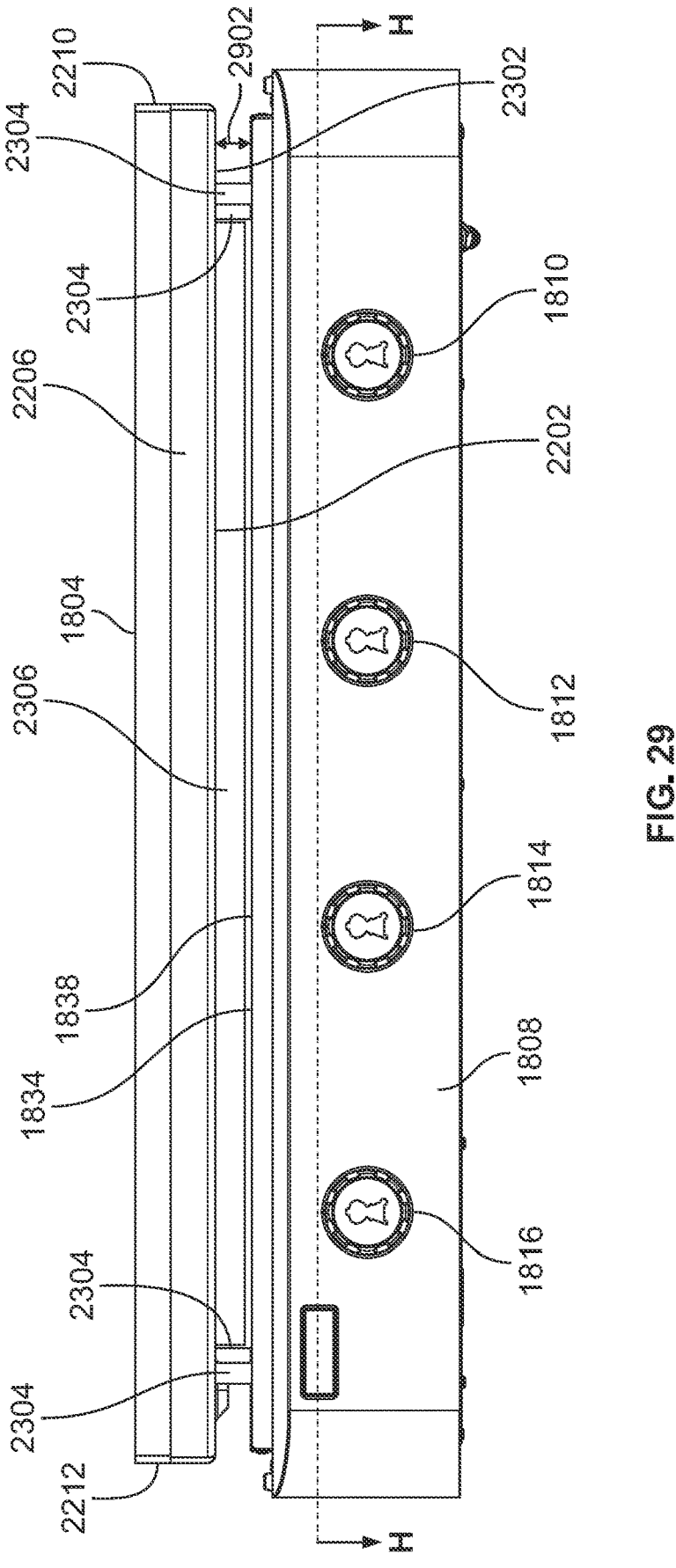
FIG. 29 is a front view showing the grill of FIGS. 18 and 19, with the frame, the lid, and certain other structural features of the grill omitted for enhanced viewability.
Figure 30:
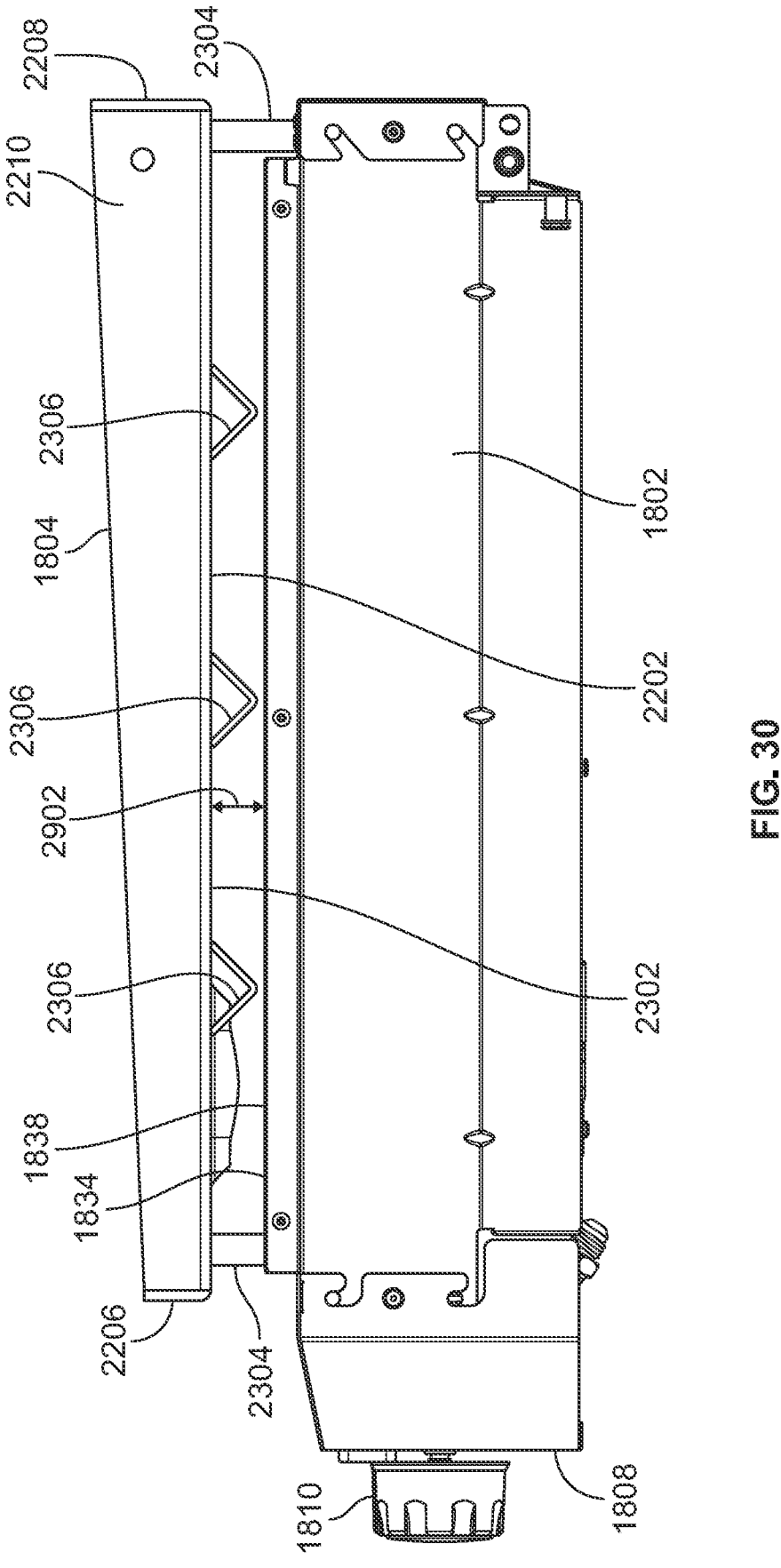
FIG. 30 is a right side view of the grill of FIG. 29.
Figure 31:
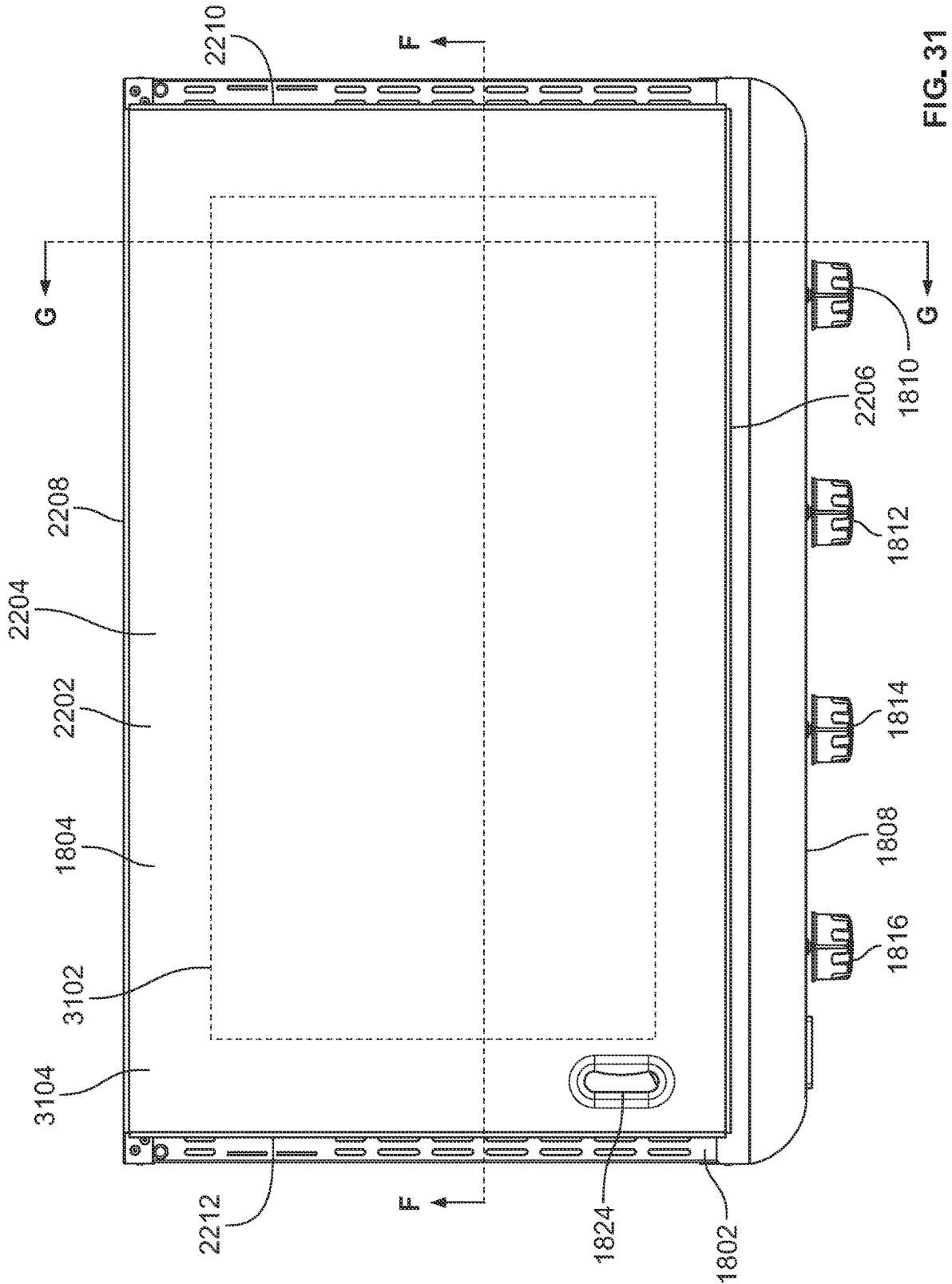
FIG. 31 is a top view of the grill of FIGS. 29 and 30.
Figure 32:
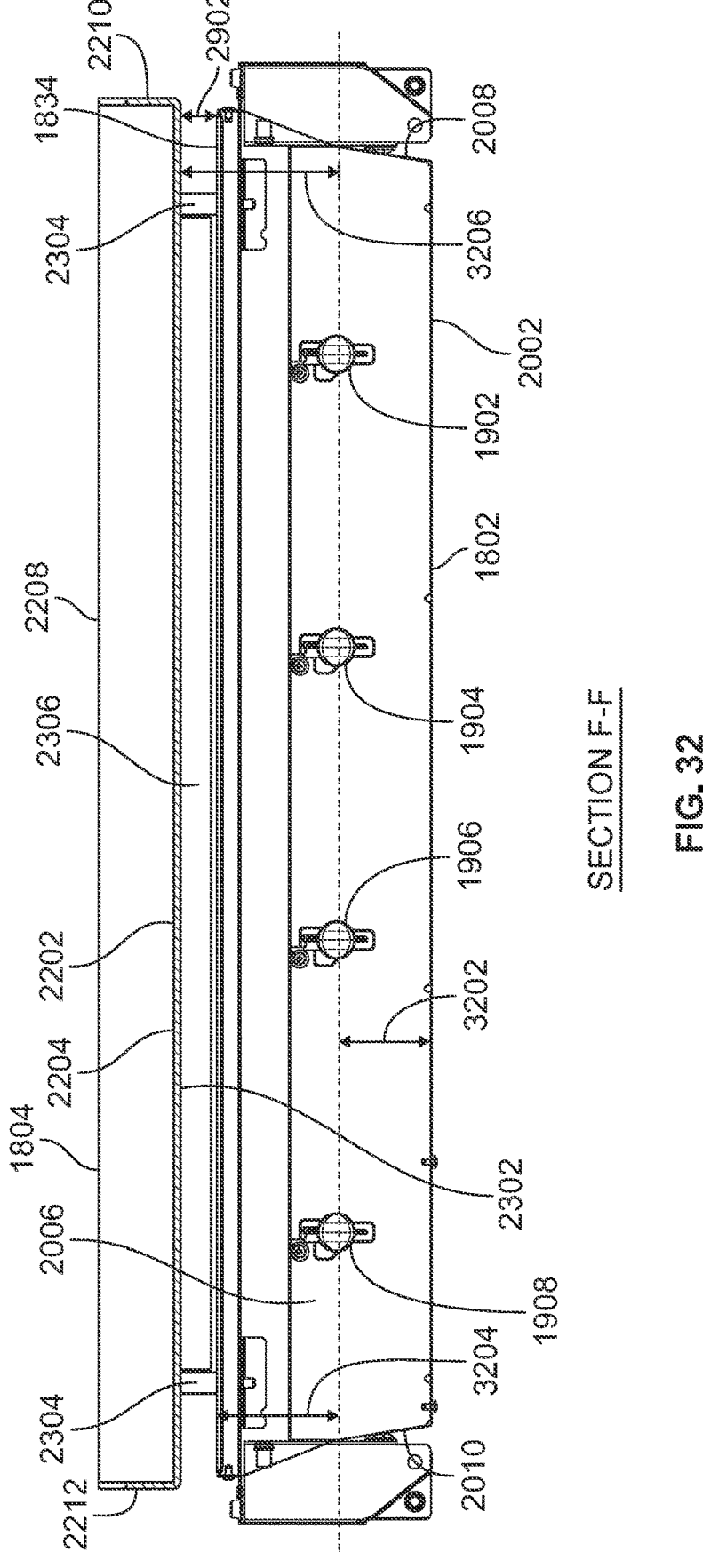
FIG. 32 is a cross-sectional view of the grill of FIGS. 29-31 taken along section F-F of FIG. 31.
Figure 33:
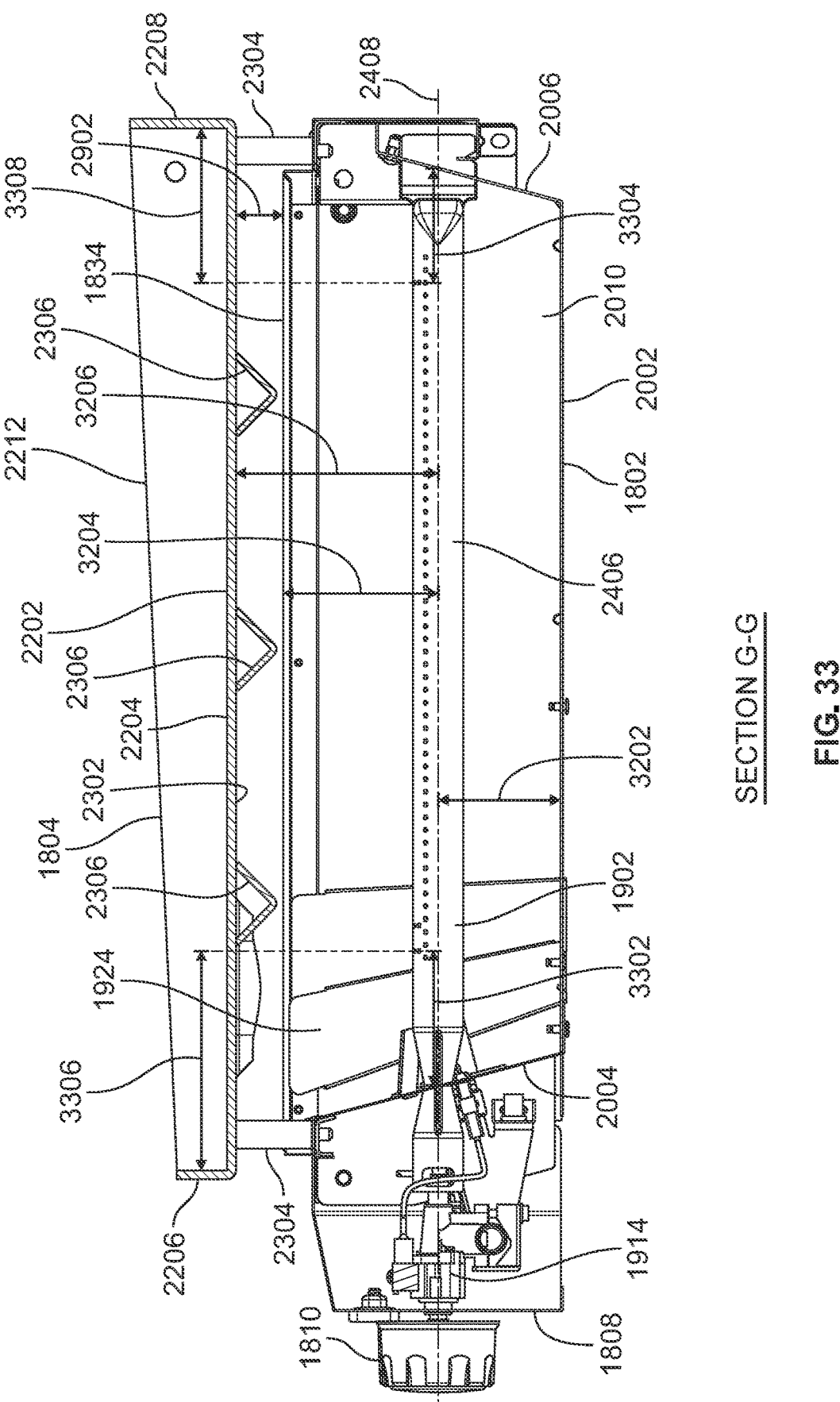
FIG. 33 is a cross-sectional view of the grill of FIGS. 29-32 taken along section G-G of FIG. 31.
Figure 34:
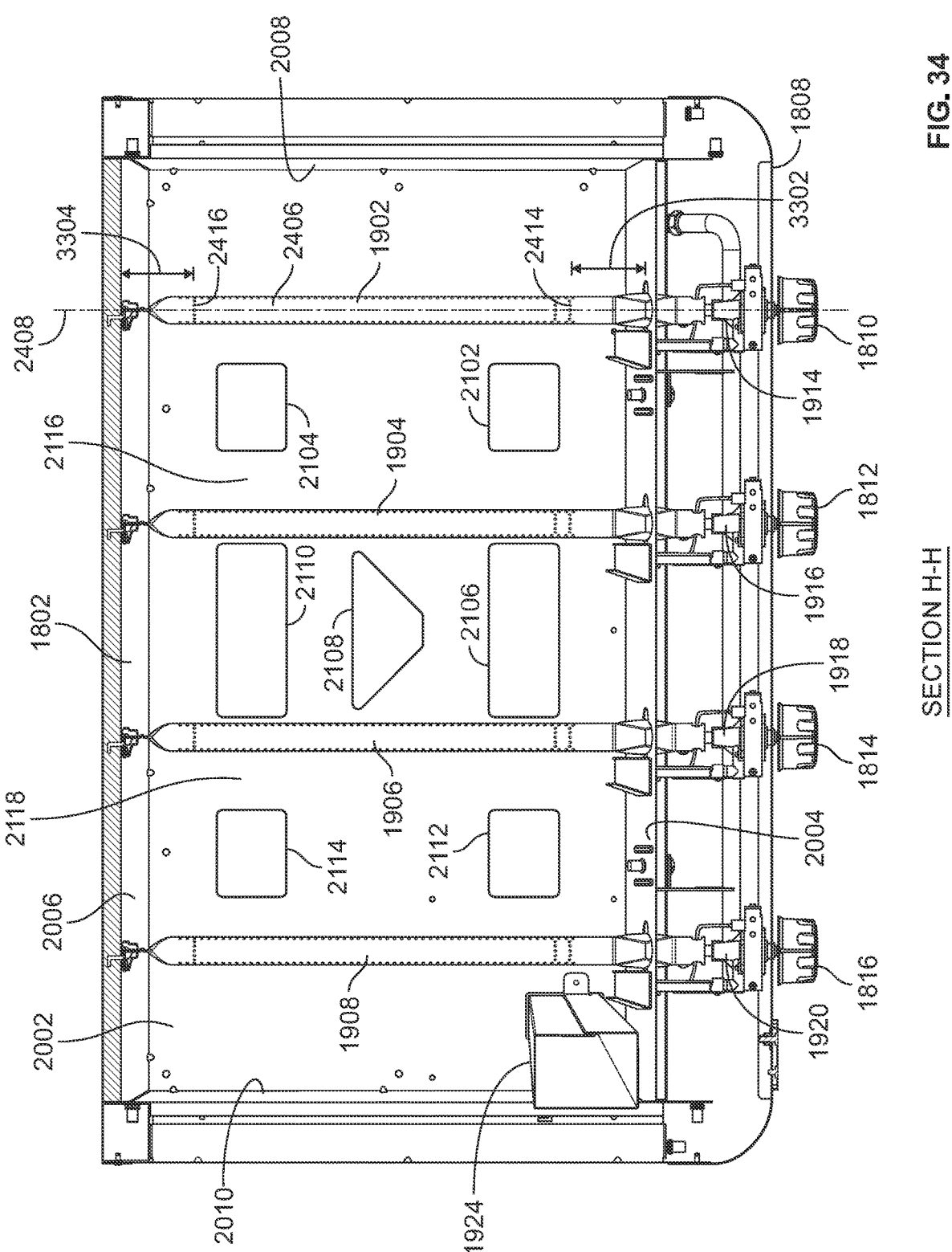
FIG. 34 is a cross-sectional view of the grill of FIGS. 29-33 taken along section H-H of FIG. 29.

FIG. 29 is a front view showing the grill 1800 of FIGS. 18 and 19, with the frame 1826, the lid 1830, and certain other structural features of the grill 1800 omitted for enhanced viewability. FIG. 30 is a right side view of the grill 1800 of FIG. 29. FIG. 31 is a top view of the grill 1800 of FIGS. 29 and 30. FIG. 32 is a cross-sectional view of the grill 1800 of FIGS. 29-31 taken along section F-F of FIG. 31. FIG. 33 is a cross-sectional view of the grill 1800 of FIGS. 29-32 taken along section G-G of FIG. 31. FIG. 34 is a cross-sectional view of the grill 1800 of FIGS. 29-33 taken along section H-H of FIG. 29.

As shown in FIGS. 29-34, the griddle 1804 of the grill 1800 is disposed on or above the cookbox 1802 of the grill 1800. More specifically, the griddle 1804 is removably positioned and/or docked on top of the cookbox 1802 via engagement of the griddle support members 2304 of the griddle 1804 and the griddle docking openings 2122 associated with the cookbox 1802. As further shown in FIGS. 29-34, the underside 2302 of the griddle 1804 is located above and spaced apart from the upper rim 1834 of the cookbox 1802 by an example vertical gap 2902 that is configured to vent heated air generated within the cookbox 1802 (e.g., heated air generated via the first burner tube 1902, the second burner tube 1904, the third burner tube 1906, and/or the fourth burner tube 1908). In addition to extending between the upper rim 1834 of the cookbox 1802 and the underside 2302 of the griddle 1804, the vertical gap 2902 further extends completely or substantially around a perimeter of the upper rim 1834 of the cookbox 1802, and completely or substantially around a perimeter of the underside 2302 of the griddle 1804. Configuring the vertical gap 2902 in this manner advantageously facilitates even and/or uniform venting of heat from the cookbox 1802 (e.g., along each of the front wall 2004, the rear wall 2006, the right sidewall 2008, and the left sidewall 2010 of the cookbox 1802) relative to the griddle 1804 (e.g., along the front lip 2206, the rear lip 2208, the right side lip 2210, and the left side lip 2212 of the griddle 1804).

In the illustrated example of FIGS. 29-34, the vertical gap 2902 has a height of approximately 0.95 inches. In other examples, the vertical gap 2902 can have a height between 0.25 and 1.50 inches. Satisfaction of the above-described range of the height of the vertical gap 2902 advantageously improves the operating efficiency of the cooking engine of the grill 1800, and also improves the heat distribution properties associated with the griddle 1804 of the grill 1800. In this regard, satisfaction of the above-described range of the height of the vertical gap 2902 advantageously assists in minimizing any temperature variation across the flat top cooking surface of the griddle 1804 during cooking operations performed thereon.

As shown in FIGS. 29-34, the burner tubes (e.g., the first burner tube 1902, the second burner tube 1904, the third burner tube 1906, and the fourth burner tube 1908) of the grill 1800 are disposed within the cookbox 1802 of the grill 1800 at a location between the bottom wall 2002 of the cookbox 1802 and the underside 2302 of the griddle 1804. More specifically, the burner tubes (e.g., the first burner tube 1902, the second burner tube 1904, the third burner tube 1906, and the fourth burner tube 1908) of the grill 1800 are disposed within the cookbox 1802 of the grill 1800 at a location between the bottom wall 2002 of the cookbox 1802 and the upper rim 1834 of the cookbox 1802, with respective ones of the burner tubes being laterally spaced apart from one another and arranged in a front-to-rear orientation. As shown in FIGS. 29-34, the first burner tube 1902 is laterally positioned to the right side of the first air intake opening 2102 and the second air intake opening 2104 respectively formed in the bottom wall 2002 of the cookbox 1802. The second burner tube 1904 is laterally positioned to the left side of the first air intake opening 2102 and the second air intake opening 2104 respectively formed in the bottom wall 2002 of the cookbox 1802, and to the right side of the third air intake opening 2106, the fourth air intake opening 2108, and the fifth air intake opening 2110 respectively formed in the bottom wall 2002 of the cookbox 1802. The second burner tube 1904 is accordingly located between the first air intake opening 2102 and the second air intake opening 2104 on the one hand and the third air intake opening 2106, the fourth air intake opening 2108, and the fifth air intake opening 2110 on the other hand, such that the second burner tube 1904 is laterally aligned with the first solid portion 2116 of the bottom wall 2002 of the cookbox 1802. The third burner tube 1906 is laterally positioned to the left side of the third air intake opening 2106, the fourth air intake opening 2108, and the fifth air intake opening 2110 respectively formed in the bottom wall 2002 of the cookbox 1802, and to the right side of the sixth air intake opening 2112 and the seventh air intake opening 2114 respectively formed in the bottom wall 2002 of the cookbox 1802. The third burner tube 1906 is accordingly located between the third air intake opening 2106, the fourth air intake opening 2108, and the fifth air intake opening 2110 on the one hand and the sixth air intake opening 2112 and the seventh air intake opening 2114 on the other hand, such that the third burner tube 1906 is laterally aligned with the second solid portion 2118 of the bottom wall 2002 of the cookbox 1802. The fourth burner tube 1908 is laterally positioned to the left side of the sixth air intake opening 2112 and the seventh air intake opening 2114 formed in the bottom wall 2002 of the cookbox 1802.

In the illustrated example of FIGS. 29-34, each of the burner tubes (e.g., the first burner tube 1902, the second burner tube 1904, the third burner tube 1906, and the fourth burner tube 1908) is vertically positioned above the bottom wall 2002 of the cookbox 1802 by an example distance 3202 of approximately 2.5 inches measured vertically from the bottom wall 2002 of the cookbox 1802 to the central axis 2408 of the respective burner tube. In other examples, the distance 3202 at which each of the burner tubes is vertically positioned above the bottom wall 2002 of the cookbox 1802 can be between 1.5 and 3.5 inches. Satisfaction of the above-described range of the distance 3202 at which each of the burner tubes is vertically positioned above the bottom wall 2002 of the cookbox 1802 advantageously improves the operating efficiency of the cooking engine of the grill 1800, and also improves the heat distribution properties associated with the griddle 1804 of the grill 1800. In this regard, satisfaction of the above-described range of the distance 3202 at which each of the burner tubes is vertically positioned above the bottom wall 2002 of the cookbox 1802 advantageously assists in minimizing any temperature variation across the flat top cooking surface 2204 of the griddle 1804 during cooking operations performed thereon.

In the illustrated example of FIGS. 29-34, each of the burner tubes (e.g., the first burner tube 1902, the second burner tube 1904, the third burner tube 1906, and the fourth burner tube 1908) is vertically positioned below the upper rim 1834 of the cookbox 1802 by an example distance 3204 of approximately 3.1 inches measured vertically from the upper rim 1834 of the cookbox 1802 to the central axis 2408 of the respective burner tube. In other examples, the distance 3204 at which each of the burner tubes is vertically positioned below the upper rim 1834 of the cookbox 1802 can be between 2.0 and 4.0 inches. Satisfaction of the above-described range of the distance 3204 at which each of the burner tubes is vertically positioned below the upper rim 1834 of the cookbox 1802 advantageously improves the operating efficiency of the cooking engine of the grill 1800, and also improves the heat distribution properties associated with the griddle 1804 of the grill 1800. In this regard, satisfaction of the above-described range of the distance 3204 at which each of the burner tubes is vertically positioned below the upper rim 1834 of the cookbox 1802 advantageously assists in minimizing any temperature variation across the flat top cooking surface 2204 of the griddle 1804 during cooking operations performed thereon.

In the illustrated example of FIGS. 29-34, each of the burner tubes (e.g., the first burner tube 1902, the second burner tube 1904, the third burner tube 1906, and the fourth burner tube 1908) is vertically positioned below the underside 2302 of the griddle 1804 by an example distance 3206 of approximately 4.1 inches measured vertically from the underside 2302 of the griddle 1804 to the central axis 2408 of the respective burner tube. In other examples, the distance 3206 at which each of the burner tubes is vertically positioned below the underside 2302 of the griddle 1804 can be between 3.0 and 5.0 inches. Satisfaction of the above-described range of the distance 3206 at which each of the burner tubes is vertically positioned below the underside 2302 of the griddle 1804 advantageously improves the operating efficiency of the cooking engine of the grill 1800, and also improves the heat distribution properties associated with the griddle 1804 of the grill 1800. In this regard, satisfaction of the above-described range of the distance 3206 at which each of the burner tubes is vertically positioned below the underside 2302 of the griddle 1804 advantageously assists in minimizing any temperature variation across the flat top cooking surface 2204 of the griddle 1804 during cooking operations performed thereon.

In the illustrated example of FIGS. 29-34, the third row of ports 2414 formed on the outer wall 2406 of each of the burner tubes (e.g., the first burner tube 1902, the second burner tube 1904, the third burner tube 1906, and the fourth burner tube 1908) is positioned inwardly from the front wall 2004 of the cookbox 1802 by an example distance 3302 of approximately 4.1 inches measured depthwise (e.g., along the central axis 2408 of the respective burner tube) from the front wall 2004 of the cookbox 1802 to the third row of ports 2414 of the respective burner tube. In other examples, the distance 3302 at which the third row of ports 2414 of the respective burner tube is positioned inwardly from the front wall 2004 of the cookbox 1802 can be between 1.0 and 6.0 inches. Satisfaction of the above-described range of the distance 3302 at which the third row of ports 2414 of the respective burner tube is positioned inwardly from the front wall 2004 of the cookbox 1802 advantageously improves the operating efficiency of the cooking engine of the grill 1800, and also improves the heat distribution properties associated with the griddle 1804 of the grill 1800. In this regard, satisfaction of the above-described range of the distance 3302 at which the third row of ports 2414 of the respective burner tube is positioned inwardly from the front wall 2004 of the cookbox 1802 advantageously assists in minimizing any temperature variation across the flat top cooking surface 2204 of the griddle 1804 during cooking operations performed thereon.

In the illustrated example of FIGS. 29-34, the fourth row of ports 2416 formed on the outer wall 2406 of each of the burner tubes (e.g., the first burner tube 1902, the second burner tube 1904, the third burner tube 1906, and the fourth burner tube 1908) is positioned inwardly from the rear wall 2006 of the cookbox 1802 by an example distance 3304 of approximately 2.2 inches measured depthwise (e.g., along the central axis 2408 of the respective burner tube) from the rear wall 2006 of the cookbox 1802 to the fourth row of ports 2416 of the respective burner tube. In other examples, the distance 3304 at which the fourth row of ports 2416 of the respective burner tube is positioned inwardly from the rear wall 2006 of the cookbox 1802 can be between 1.0 and 6.0 inches. Satisfaction of the above-described range of the distance 3304 at which the fourth row of ports 2416 of the respective burner tube is positioned inwardly from the rear wall 2006 of the cookbox 1802 advantageously improves the operating efficiency of the cooking engine of the grill 1800, and also improves the heat distribution properties associated with the griddle 1804 of the grill 1800. In this regard, satisfaction of the above-described range of the distance 3304 at which the fourth row of ports 2416 of the respective burner tube is positioned inwardly from the rear wall 2006 of the cookbox 1802 advantageously assists in minimizing any temperature variation across the flat top cooking surface 2204 of the griddle 1804 during cooking operations performed thereon.

In the illustrated example of FIGS. 29-34, the third row of ports 2414 formed on the outer wall 2406 of each of the burner tubes (e.g., the first burner tube 1902, the second burner tube 1904, the third burner tube 1906, and the fourth burner tube 1908) is positioned inwardly from the front lip 2206 of the griddle 1804 by an example distance 3306 of approximately 4.6 inches measured depthwise (e.g., along the central axis 2408 of the respective burner tube) from the front lip 2206 of the griddle 1804 to the third row of ports

2414 of the respective burner tube. In other examples, the distance 3306 at which the third row of ports 2414 of the respective burner tube is positioned inwardly from the front lip 2206 of the griddle 1804 can be between 1.0 and 6.0 inches. Satisfaction of the above-described range of the distance 3306 at which the third row of ports 2414 of the respective burner tube is positioned inwardly from the front lip 2206 of the griddle 1804 advantageously improves the operating efficiency of the cooking engine of the grill 1800, and also improves the heat distribution properties associated with the griddle 1804 of the grill 1800. In this regard, satisfaction of the above-described range of the distance 3306 at which the third row of ports 2414 of the respective burner tube is positioned inwardly from the front lip 2206 of the griddle 1804 advantageously assists in minimizing any temperature variation across the flat top cooking surface 2204 of the griddle 1804 during cooking operations performed thereon.

In the illustrated example of FIGS. 29-34, the fourth row of ports 2416 formed on the outer wall 2406 of each of the burner tubes (e.g., the first burner tube 1902, the second burner tube 1904, the third burner tube 1906, and the fourth burner tube 1908) is positioned inwardly from the rear lip 2208 of the griddle 1804 by an example distance 3308 of approximately 3.3 inches measured depthwise (e.g., along the central axis 2408 of the respective burner tube) from the rear lip 2208 of the griddle 1804 to the fourth row of ports 2416 of the respective burner tube. In other examples, the distance 3308 at which the fourth row of ports 2416 of the respective burner tube is positioned inwardly from the rear lip 2208 of the griddle 1804 can be between 1.0 and 6.0 inches. Satisfaction of the above-described range of the distance 3308 at which the fourth row of ports 2416 of the respective burner tube is positioned inwardly from the rear lip 2208 of the griddle 1804 advantageously improves the operating efficiency of the cooking engine of the grill 1800, and also improves the heat distribution properties associated with the griddle 1804 of the grill 1800. In this regard, satisfaction of the above-described range of the distance 3308 at which the fourth row of ports 2416 of the respective burner tube is positioned inwardly from the rear lip 2208 of the griddle 1804 of the cookbox 1802 advantageously assists in minimizing any temperature variation across the flat top cooking surface 2204 of the griddle 1804 during cooking operations performed thereon.

The grill 1800 of FIGS. 18-34 is configured for optimum efficiency and optimum heat distribution during cooking operations performed on the flat top cooking surface 2204 of the griddle 1804. More specifically, the grill 1800 is configured to minimize any temperature variation across the flat top cooking surface 2204 of the griddle 1804 during cooking operations performed thereon. As shown in FIG. 31, the flat top cooking surface 2204 of the griddle 1804 includes an example central portion 3102 that is bounded and/or circumscribed by an example peripheral portion 3104. In the illustrated example, the peripheral portion 3104 of the flat top cooking surface 2204 extends approximately three inches inwardly from each of the four surrounding lips of the griddle 1804 (e.g., the front lip 2206, the rear lip 2208, the right side lip 2210, and the left side lip 2212). The grill 1800 of FIGS. 18-34 is configured such that the average temperature within the central portion 3102 of the flat top cooking surface 2204 of the griddle 1804 is approximately 365 degrees Fahrenheit (365° F.) when the burner tubes (e.g., the first burner tube 1902, the second burner tube 1904, the third burner tube 1906, and the fourth burner tube 1908) of the grill 1800 are adjusted to a LOW output setting, approximately 400 degrees Fahrenheit (400° F.) when the burner tubes of the grill 1800 are adjusted to a MEDIUM output setting, and approximately 535 degrees Fahrenheit (535° F.) when the burner tubes of the grill 1800 are adjusted to a HI output setting. As a result of implementing the innovative heat distribution features described above, the grill 1800 of FIGS. 18-34 is advantageously configured such that the average temperature variation between the central portion 3102 and the peripheral portion 3104 of the flat top cooking surface 2204 of the griddle 1804 is approximately 60 degrees Fahrenheit (60° F.) or less when the burner tubes of the grill 1800 are adjusted to a LOW output setting, approximately 90 degrees Fahrenheit (90° F.) or less when the burner tubes of the grill 1800 are adjusted to a MEDIUM output setting, and approximately 140 degrees Fahrenheit (140° F.) or less when the burner tubes of the grill 1800 are adjusted to a HI output setting. The above-described temperature variations are substantially less than those found in many commercially available flat top gas grills, some of which produce flat top cooking surface temperature variations exceeding two hundred degrees Fahrenheit (200° F.) when the burner tubes of the flat top gas grill are adjusted to a common output setting.

The following paragraphs provide various examples in relation to the disclosed flat top gas grills including cooking engines configured for optimum heat distribution.

Example 1 includes a grill. In Example 1, the grill includes a cookbox, a griddle, and a plurality of burner tubes. In Example 1, the cookbox includes a bottom wall, a front wall, a rear wall, a right sidewall, and a left sidewall. In Example 1, the front wall, the rear wall, the right sidewall, and the left sidewall extend upwardly from the bottom wall. In Example 1, the cookbox further includes a plurality of air intake openings extending though the bottom wall. In Example 1, the griddle is disposed on or above the cookbox. In Example 1, the griddle includes a flat top cooking surface and an underside located opposite the flat top cooking surface. In Example 1, the burner tubes are disposed in the cookbox and located between the bottom wall of the cookbox and the underside of the griddle.

Example 2 includes the grill of Example 1. In Example 2, the bottom wall has a total area defined by a width extending between the right sidewall and the left sidewall and a depth extending between the front wall and the rear wall. In Example 2, each one of the plurality of air intake openings has an associated area, and the respective associated areas of the plurality of air intake openings collectively define an unoccupied area of the bottom wall. In Example 2, the unoccupied area is between 10.0 and 30.0 percent of the total area.

Example 3 includes the grill of Example 1. In Example 3, the plurality of burner tubes includes a first burner tube, a second burner tube laterally spaced apart from the first burner tube, and a third burner tube laterally spaced apart from both the first burner tube and the second burner tube, and the plurality of air intake openings includes a first air intake opening and a second air intake opening laterally spaced apart from the first air intake opening. In Example 3, the first air intake opening is laterally positioned between the first burner tube and the second burner tube, and the second air intake opening is laterally positioned between the second burner tube and the third burner tube.

Example 4 includes the grill of Example 3. In Example 4, the bottom wall includes a solid portion extending between the front wall and the rear wall and laterally aligned with the second burner tube. In Example 4, the solid portion extends between the first air intake opening and the second air intake opening. In Example 4, the solid portion is free of any opening extending through the bottom wall.

Example 5 includes the grill of Example 4. In Example 5, at least one of the first air intake opening or the second air intake opening has a rectangular shape.

Example 6 includes the grill of Example 1. In Example 6, the plurality of burner tubes includes a first burner tube, a second burner tube laterally spaced apart from the first burner tube, a third burner tube laterally spaced apart from both the first burner tube and the second burner tube, and a fourth burner tube laterally spaced apart from each one of the first burner tube, the second burner tube, and the third burner tube, and the plurality of air intake openings includes a first air intake opening, a second air intake opening laterally spaced apart from the first air intake opening, and a third air intake opening laterally spaced apart from both the first air intake opening and the second air intake opening. In Example 6, the first air intake opening is laterally positioned between the first burner tube and the second burner tube, the second air intake opening is laterally positioned between the second burner tube and the third burner tube, and the third air intake opening is laterally positioned between the third burner tube and the fourth burner tube.

Example 7 includes the grill of Example 6. In Example 7, the bottom wall includes a first solid portion extending between the front wall and the rear wall and laterally aligned with the second burner tube. In Example 7, the first solid portion extends between the first air intake opening and the second air intake opening. In Example 7, the first solid portion is free of any opening extending through the bottom wall. In Example 7, the bottom wall further includes a second solid portion laterally spaced apart from the first solid portion, the second solid portion extending between the front wall and the rear wall and laterally aligned with the third burner tube. In Example 7, the second solid portion extends between the second air intake opening and the third air intake opening. In Example 7, the second solid portion is free of any opening extending through the bottom wall.

Example 8 includes the grill of Example 7. In Example 8, at least one of the first air intake opening, the second air intake opening, or the third air intake opening has a rectangular shape.

Example 9 includes the grill of Example 7. In Example 9, at least one of the first air intake opening, the second air intake opening, or the third air intake opening has a trapezoidal shape.

Example 10 includes the grill of Example 1. In Example 10, the grill further comprises a vertical gap extending between an upper rim of the cookbox and the underside of the griddle. In Example 10, the vertical gap further extends around a perimeter of the upper rim of the cookbox and around a perimeter of the underside of the griddle. In Example 10, the vertical gap is configured to vent heated air generated within the cookbox.

Example 11 includes the grill of Example 10. In Example 11, the vertical gap has a height between 0.25 and 1.50 inches.

Example 12 includes the grill of Example 1. In Example 12, the plurality of burner tubes includes a linear burner tube having a central axis. In Example 12, the central axis is vertically positioned between 1.5 and 3.5 inches above the bottom wall of the cookbox.

Example 13 includes the grill of Example 12. In Example 13, the central axis is vertically positioned between 2.0 and 4.0 inches below an upper rim of the cookbox.

Example 14 includes the grill of Example 12. In Example 14, the central axis is vertically positioned between 3.0 and 5.0 inches below the underside of the griddle.

Example 15 includes the grill of Example 1. In Example 15, each one of the plurality of burner tubes is a linear burner tube having a central axis. In Example 15, the central axis of each one of the plurality of burner tubes is vertically positioned between 1.5 and 3.5 inches above the bottom wall of the cookbox, vertically positioned between 2.0 and 4.0 inches below an upper rim of the cookbox, and vertically positioned between 3.0 and 5.0 inches below the underside of the griddle.

Example 16 includes the grill of Example 1. In Example 16, the plurality of burner tubes includes a linear burner tube having a central axis, an outer wall, a first row of ports, and a second row of ports. In Example 16, the ports of the first row extend through the outer wall, and the first row of ports is arranged parallel to the central axis. In Example 16, the ports of the second row extend through the outer wall, and the second row of ports is arranged parallel to the central axis. In Example 16, the second row of ports is spaced apart from the first row of ports.

Example 17 includes the grill of Example 16. In Example 17, the outer wall of the linear burner tube has a circular cross-sectional profile. In Example 17, the second row of ports is angularly displaced from the first row of ports by an angle between 90.0 and 150.0 degrees.

Example 18 includes the grill of Example 16. In Example 18, the linear burner tube further includes a third row of ports and a fourth row of ports. In Example 18, the ports of the third row extend through the outer wall, and the third row of ports is arranged perpendicular to the central axis. In Example 18, the ports of the fourth row extend through the outer wall, and the third row of ports is arranged perpendicular to the central axis. In Example 18, the fourth row of ports is spaced apart from the third row of ports.

Example 19 includes the grill of Example 18. In Example 19, the third row of ports is located between 1.0 and 6.0 inches inwardly from the front wall of the cookbox.

Example 20 includes the grill of Example 19. In Example 20, the fourth row of ports is located between 1.0 and 6.0 inches inwardly from the rear wall of the cookbox.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A grill, comprising:

a cookbox including a bottom wall, a front wall, a rear wall, a right sidewall, and a left sidewall, the front wall, the rear wall, the right sidewall, and the left sidewall extending upwardly from the bottom wall, the cookbox further including a plurality of air intake openings extending though the bottom wall and configured to draw air from a surrounding atmosphere into the cookbox;

a griddle disposed on or above the cookbox, the griddle including a flat top cooking surface and an underside located opposite the flat top cooking surface; and a plurality of burner tubes disposed in the cookbox and located between the bottom wall of the cookbox and the underside of the griddle, wherein none of the plurality of burner tubes are laterally aligned with any of the plurality of air intake openings, wherein the plurality of burner tubes includes a first linear burner tube, a second linear burner tube laterally spaced apart from the first linear burner tube, and a third linear burner tube laterally spaced apart from both the first linear burner tube and the second linear burner tube, wherein the plurality of air intake openings includes a first air intake opening and a second air intake opening laterally spaced apart from the first air intake opening, wherein the first air intake opening is laterally positioned between the first linear burner tube and the second linear burner tube and the second air intake opening is laterally positioned between the second linear burner tube and the third linear burner tube, and wherein the bottom wall includes a solid portion extending between the front wall and the rear wall and laterally aligned with the second linear burner tube, the solid portion extending between the first air intake opening and the second air intake opening, the solid portion being free of any opening extending through the bottom wall.

2. The grill of claim 1, wherein the bottom wall has a total area defined by a width extending between the right sidewall and the left sidewall and a depth extending between the front wall and the rear wall, wherein each one of the plurality of air intake openings has an associated area, wherein the respective associated areas of the plurality of air intake openings collectively define an unoccupied area of the bottom wall, and wherein the unoccupied area is between 10.0 and 30.0 percent of the total area.

3. The grill of claim 1, wherein at least one of the first air intake opening or the second air intake opening has a rectangular shape.

4. The grill of claim 1, wherein the plurality of burner tubes further includes a fourth linear burner tube laterally spaced apart from each one of the first linear burner tube, the second linear burner tube, and the third linear burner tube, wherein the plurality of air intake openings further includes a third air intake opening laterally spaced apart from both the first air intake opening and the second air intake opening, wherein the third air intake opening is laterally positioned between the third linear burner tube and the fourth linear burner tube.

5. The grill of claim 4, wherein the solid portion is a first solid portion, wherein the bottom wall further includes a second solid portion laterally spaced apart from the first solid portion, the second solid portion extending between the front wall and the rear wall and laterally aligned with the third linear burner tube, the second solid portion extending between the second air intake opening and the third air intake opening, the second solid portion being free of any opening extending through the bottom wall.

6. The grill of claim 5, wherein at least one of the first air intake opening, the second air intake opening, or the third air intake opening has a rectangular shape.

7. The grill of claim 5, wherein at least one of the first air intake opening, the second air intake opening, or the third air intake opening has a trapezoidal shape.

8. The grill of claim 1, further comprising a vertical gap extending between an upper rim of the cookbox and the underside of the griddle, the vertical gap further extending around a perimeter of the upper rim of the cookbox and around a perimeter of the underside of the griddle, the vertical gap configured to vent heated air generated within the cookbox.

9. The grill of claim 8, wherein the vertical gap has a height between 0.25 and 1.50 inches.

10. The grill of claim 1, wherein each one of the plurality of burner tubes is a linear burner tube having a central axis, wherein the central axis of each one of the plurality of burner tubes is vertically positioned between 1.5 and 3.5 inches above the bottom wall of the cookbox.

11. The grill of claim 10, wherein the central axis of each one of the plurality of burner tubes is vertically positioned between 2.0 and 4.0 inches below an upper rim of the cookbox.

12. The grill of claim 10, wherein the central axis of each one of the plurality of burner tubes is vertically positioned between 3.0 and 5.0 inches below the underside of the griddle.

13. The grill of claim 1, wherein each one of the plurality of burner tubes is a linear burner tube having a central axis, wherein the central axis of each one of the plurality of burner tubes is vertically positioned between 1.5 and 3.5 inches above the bottom wall of the cookbox, vertically positioned between 2.0 and 4.0 inches below an upper rim of the cookbox, and vertically positioned between 3.0 and 5.0 inches below the underside of the griddle.

14. The grill of claim 1, wherein each one of the plurality of burner tubes includes a central axis, an outer wall having a circular cross-sectional profile, a first row of ports extending through the outer wall and arranged parallel to the central axis, and a second row of ports extending through the outer wall and arranged parallel to the central axis, the second row of ports angularly displaced from the first row of ports.

15. The grill of claim 14, wherein the second row of ports is angularly displaced from the first row of ports by an angle between 90.0 and 150.0 degrees.

16. The grill of claim 14, wherein each one of the plurality of burner tubes further includes a third row of ports extending through the outer wall and arranged perpendicular to the central axis, and a fourth row of ports extending through the outer wall and arranged perpendicular to the central axis, the fourth row of ports spaced apart from the third row of ports, wherein the third row of ports and the fourth row of ports each extend between the first row of ports and the second row of ports.

17. The grill of claim 16, wherein the third row of ports is located between 1.0 and 6.0 inches inwardly from the front wall of the cookbox.

18. The grill of claim 17, wherein the fourth row of ports is located between 1.0 and 6.0 inches inwardly from the rear wall of the cookbox.

19. A grill, comprising:
    a cookbox including a bottom wall, a front wall, a rear wall, a right sidewall, and a left sidewall, the front wall, the rear wall, the right sidewall, and the left sidewall extending upwardly from the bottom wall, the cookbox further including a plurality of air intake openings extending though the bottom wall, the plurality of air intake openings including a first air intake opening, a second air intake opening laterally spaced apart from the first air intake opening, and a third air intake opening laterally spaced apart from both the first air intake opening and the second air intake opening;
    a griddle disposed on or above the cookbox, the griddle including a flat top cooking surface and an underside located opposite the flat top cooking surface; and
    a plurality of burner tubes disposed in the cookbox and located between the bottom wall of the cookbox and the underside of the griddle, the plurality of burner tubes including a first burner tube, a second linear burner tube laterally spaced apart from the first burner tube, a third burner tube laterally spaced apart from both the first burner tube and the second burner tube, and a fourth burner tube laterally spaced apart from each one of the first burner tube, the second burner tube, and the third burner tube, wherein the first air intake opening is laterally positioned between the first burner tube and the second burner tube, the second air intake opening is laterally positioned between the second burner tube and the third burner tube, and the third air intake opening is laterally positioned between the third burner tube and the fourth burner tube.

20. A grill, comprising:

a cookbox including a bottom wall, a front wall, a rear wall, a right sidewall, and a left sidewall, the front wall, the rear wall, the right sidewall, and the left sidewall extending upwardly from the bottom wall, the cookbox further including a plurality of air intake openings extending though the bottom wall;

a griddle disposed on or above the cookbox, the griddle including a flat top cooking surface and an underside located opposite the flat top cooking surface; and a plurality of burner tubes disposed in the cookbox and located between the bottom wall of the cookbox and the underside of the griddle, the plurality of burner tubes including a linear burner tube having a central axis, an outer wall, a first row of ports extending through the outer wall and arranged parallel to the central axis, a second row of ports extending through the outer wall and arranged parallel to the central axis, a third row of ports extending through the outer wall and arranged perpendicular to the central axis, and a fourth row of ports extending through the outer wall and arranged perpendicular to the central axis, the second row of ports spaced apart from the first row of ports, the fourth row of ports spaced apart from the third row of ports, the third row of ports located between 1.0 and 6.0 inches inwardly from the front wall of the cookbox.

* * * * *